United States Patent
Magee et al.

(10) Patent No.: US 7,072,733 B2
(45) Date of Patent: Jul. 4, 2006

(54) INTERACTIVE SYSTEM AND METHOD FOR DESIGN, CUSTOMIZATION AND MANUFACTURE OF DECORATIVE TEXTILE SUBSTRATES

(75) Inventors: Ronald Magee, LaGrange, GA (US); Kevin D. West, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 424 days.

(21) Appl. No.: 10/054,425

(22) Filed: Jan. 22, 2002

(65) Prior Publication Data

US 2003/0139840 A1 Jul. 24, 2003

(51) Int. Cl.
G06F 19/00 (2006.01)

(52) U.S. Cl. ...................... 700/133; 705/27; 707/104.1
(58) Field of Classification Search ................ 700/132, 700/133, 130, 131, 135; 8/149; 68/205 R; 239/69; 705/1, 26, 27; 707/104.1
See application file for complete search history.

(56) References Cited

U.S. PATENT DOCUMENTS

| | | | |
|---|---|---|---|
| 4,025,946 A | 5/1977 | Casey ........................ 358/81 |
| 4,318,121 A | 3/1982 | Taite et al. .................. 358/22 |
| 4,700,181 A | 10/1987 | Maine et al. ............... 340/747 |
| 4,786,288 A | 11/1988 | Handa et al. .................. 8/495 |
| 4,788,650 A | 11/1988 | Willis et al. ................ 364/526 |
| 4,901,064 A | 2/1990 | Deering ...................... 640/729 |
| 5,016,183 A | 5/1991 | Shyong ....................... 364/470 |
| 5,053,956 A | 10/1991 | Donald et al. .............. 364/401 |
| 5,058,174 A | 10/1991 | Carroll ......................... 381/1 |
| 5,073,818 A | 12/1991 | Iida .............................. 358/80 |
| 5,109,281 A | 4/1992 | Kobori et al. .............. 358/296 |
| 5,128,876 A | 7/1992 | Cox ........................... 364/470 |
| 5,142,481 A * | 8/1992 | Cox ........................... 700/133 |
| 5,250,121 A | 10/1993 | Yamamoto et al. ........... 106/22 |
| 5,255,353 A | 10/1993 | Itoh ........................... 395/126 |
| 5,335,048 A | 8/1994 | Takano et al. .............. 355/204 |
| 5,368,485 A | 11/1994 | Phillips ....................... 434/75 |

(Continued)

Primary Examiner—John J. Calvert
Assistant Examiner—Brian Kauffman
(74) Attorney, Agent, or Firm—Terry T. Moyer; George M. Fisher

(57) ABSTRACT

A system and method for enabling customer specification of images to be used for decorating textile substrates at the economies of mass customization. An automated patterning apparatus is implemented that comprises a plurality of individual colorant substances that are directed through a set of colorant applicators in accordance with predetermined pattern data, the colorant substances capable of being selectively applied to individual pixels on the substrate in accordance with the predetermined pattern data. The system and method particularly implements a device providing an interface for enabling remote access to an image manipulation design tool that enables user customization of the digitized image to form a target image over a communications network. A digitized image of the user's choice is imported into the image manipulation design tool and that image is manipulated according the user's artistic vision. A dithering algorithm may be implemented for generating a dithered image from the digitized target image using a dithering palette of colors that are able to be generated at specified pixel locations on the textile substrate using the plurality of individual colorants. Finally, an order is generated and electronically communicated to the automated patterning apparatus for initiating transformation of the dithered image into a dyed pattern on the textile substrate. Through the use of the automated patterning apparatus, appropriate firing instructions are generated for each of the color applicators necessary to reproduce the dithered image on the substrate.

83 Claims, 40 Drawing Sheets

Order Placement and Fulfillment Process

U.S. PATENT DOCUMENTS

| | | |
|---|---|---|
| 5,416,612 A | 5/1995 | Ingraham et al. ............ 358/501 |
| 5,473,446 A | 12/1995 | Perumal, Jr. et al. ....... 358/523 |
| 5,473,736 A | 12/1995 | Young ........................ 395/131 |
| 5,483,360 A | 1/1996 | Rolleston et al. ............ 358/518 |
| 5,535,315 A | 7/1996 | Itoh ............................ 395/131 |
| 5,555,505 A | 9/1996 | Oosawa et al. ........ 364/470.07 |
| 5,612,795 A | 3/1997 | Dichter ....................... 358/518 |
| 5,910,812 A | 6/1999 | Yamamoto et al. ......... 347/106 |
| 5,917,994 A | 6/1999 | Perumal, Jr. et al. ....... 395/109 |
| 6,005,969 A | 12/1999 | Thomas et al. ............. 382/162 |
| 6,033,066 A | 3/2000 | Koike et al. ................. 347/101 |
| 6,051,036 A | 4/2000 | Kusaki et al. ................. 8/494 |
| 6,115,031 A | 9/2000 | Love et al. .................. 345/199 |
| 6,142,619 A | 11/2000 | Miura et al. ................. 347/101 |
| 6,178,008 B1 | 1/2001 | Bockman et al. ............ 358/1.9 |
| 6,243,110 B1 | 6/2001 | Takahashi et al. ............. 347/5 |
| 6,269,184 B1 | 7/2001 | Spaulding et al. .......... 382/167 |
| 6,394,575 B1 * | 5/2002 | Kent ........................... 347/21 |
| 6,854,146 B1 | 2/2005 | Stoyles et al. ................. 8/150 |
| 2002/0123941 A1 | 9/2002 | Donahue et al. .............. 705/26 |

* cited by examiner

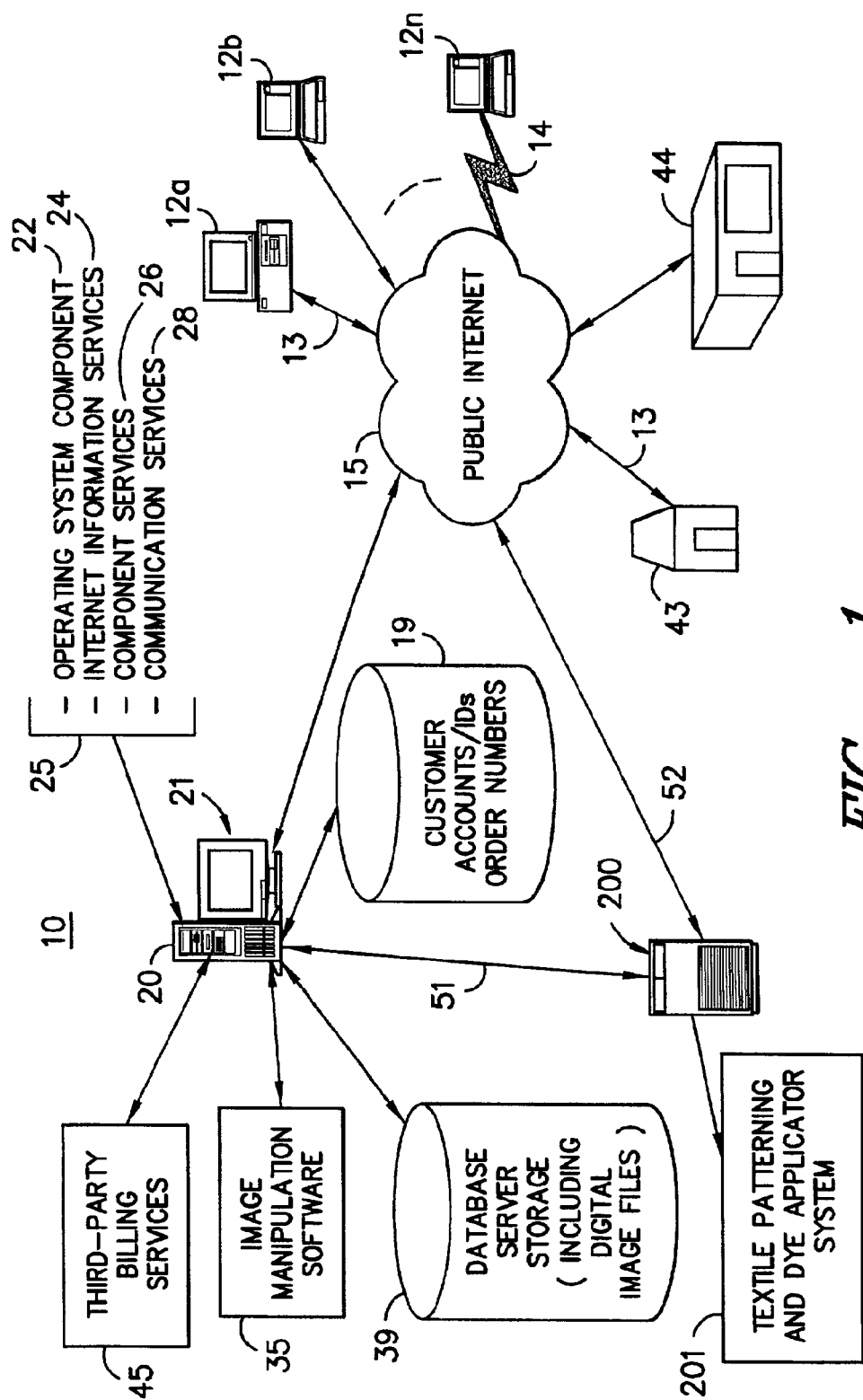
FIG. -1-

Text Option Flowchart

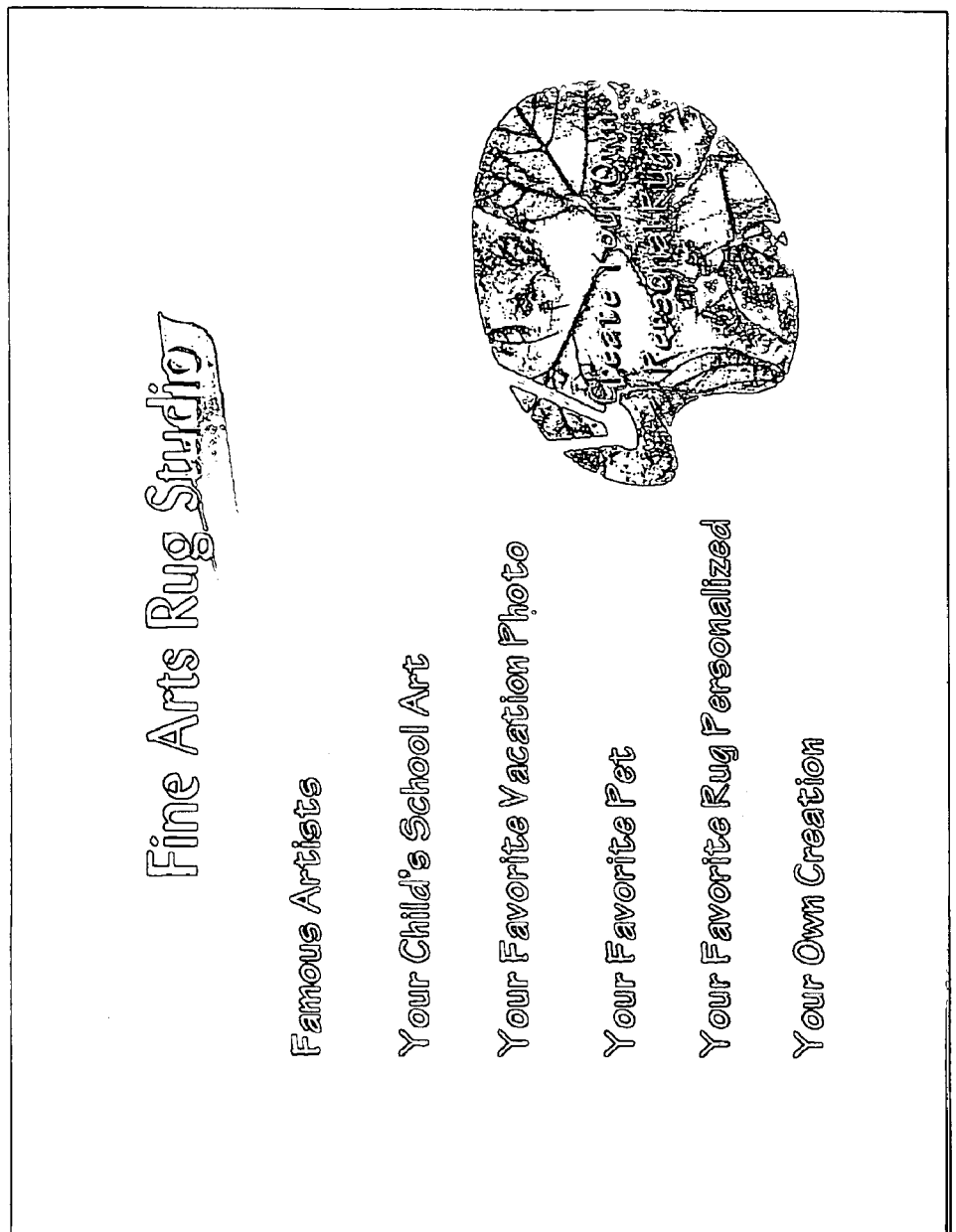
FIG. -3-

Famous Artists

Make a selection of your favorite work of art. First click on the artist by name, then on the painting Cezanne Degas Gaugin Monet Seurat

FIG. -4-

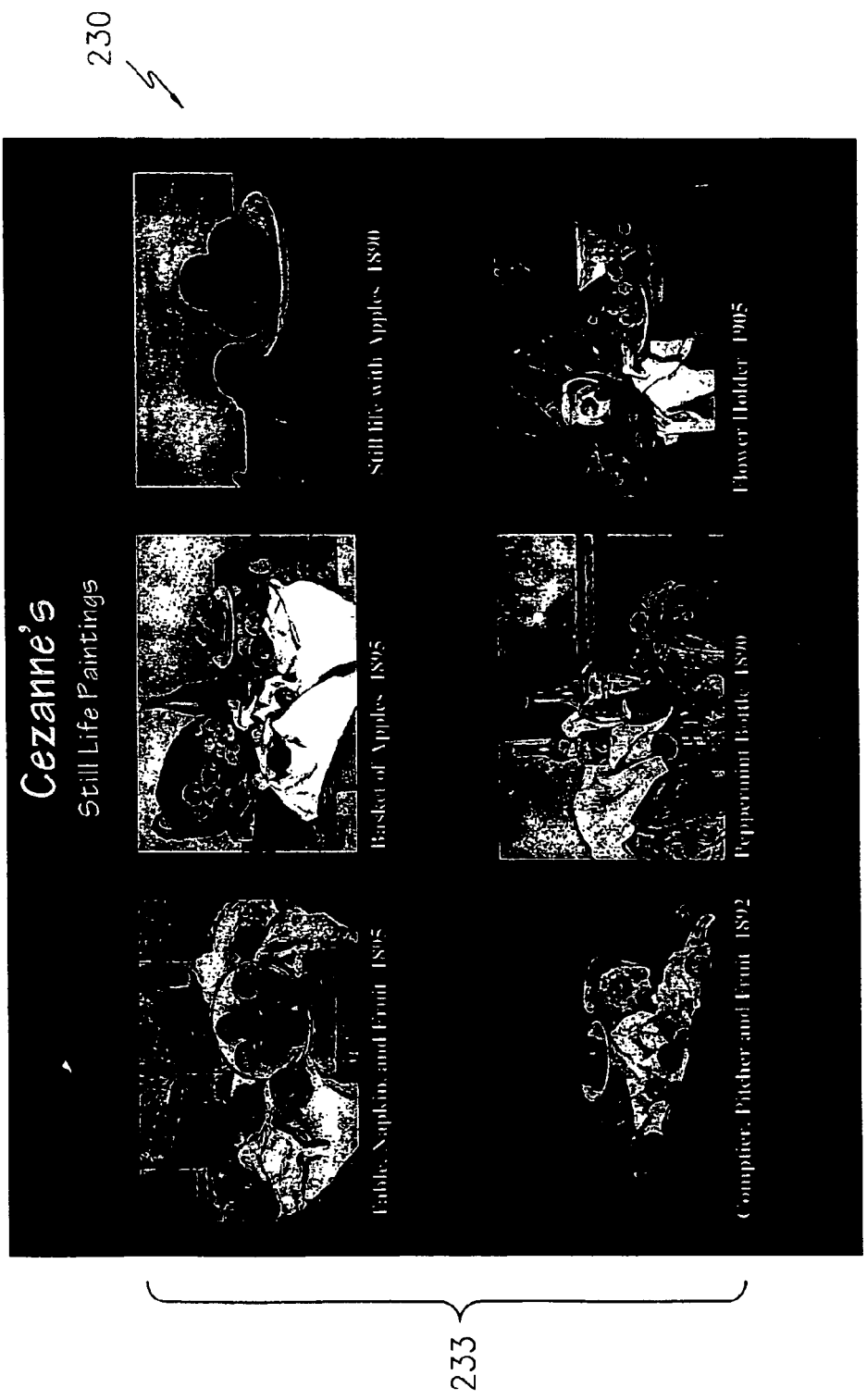
FIG. -5-

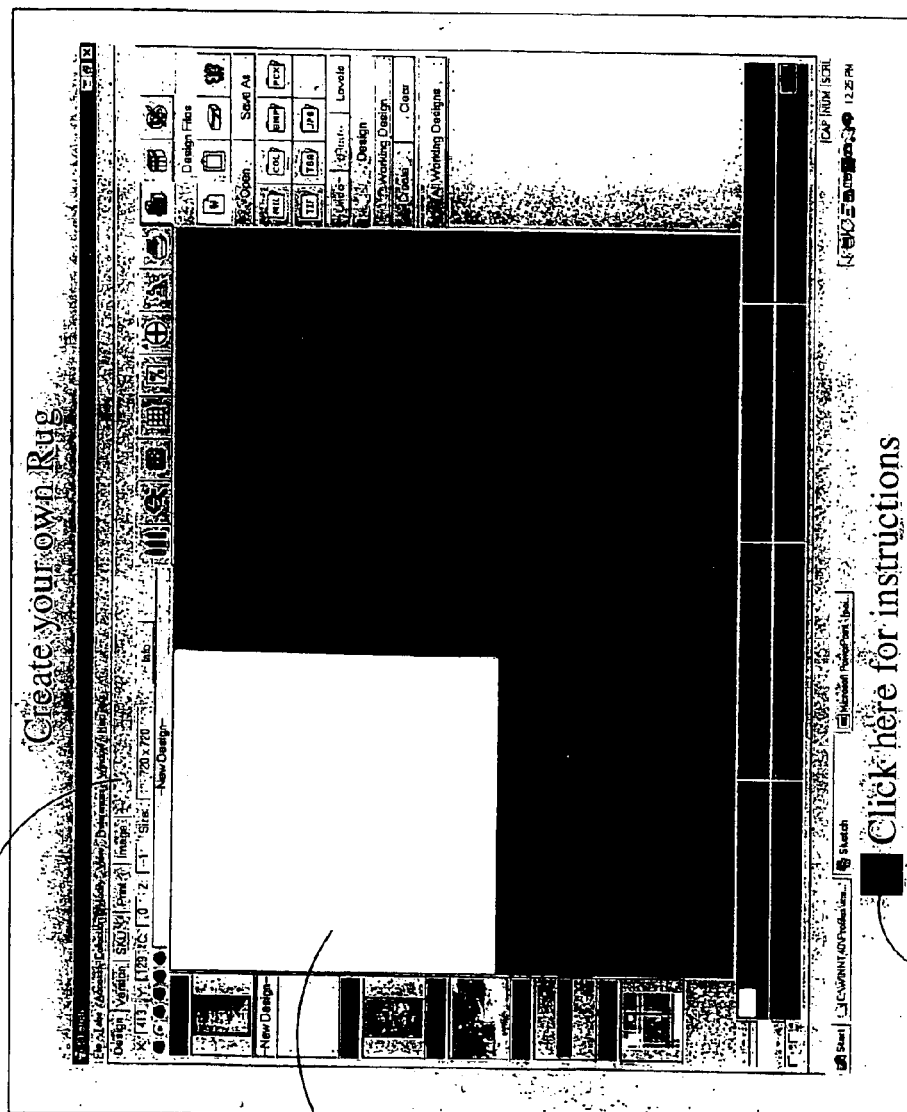
FIG. —6—

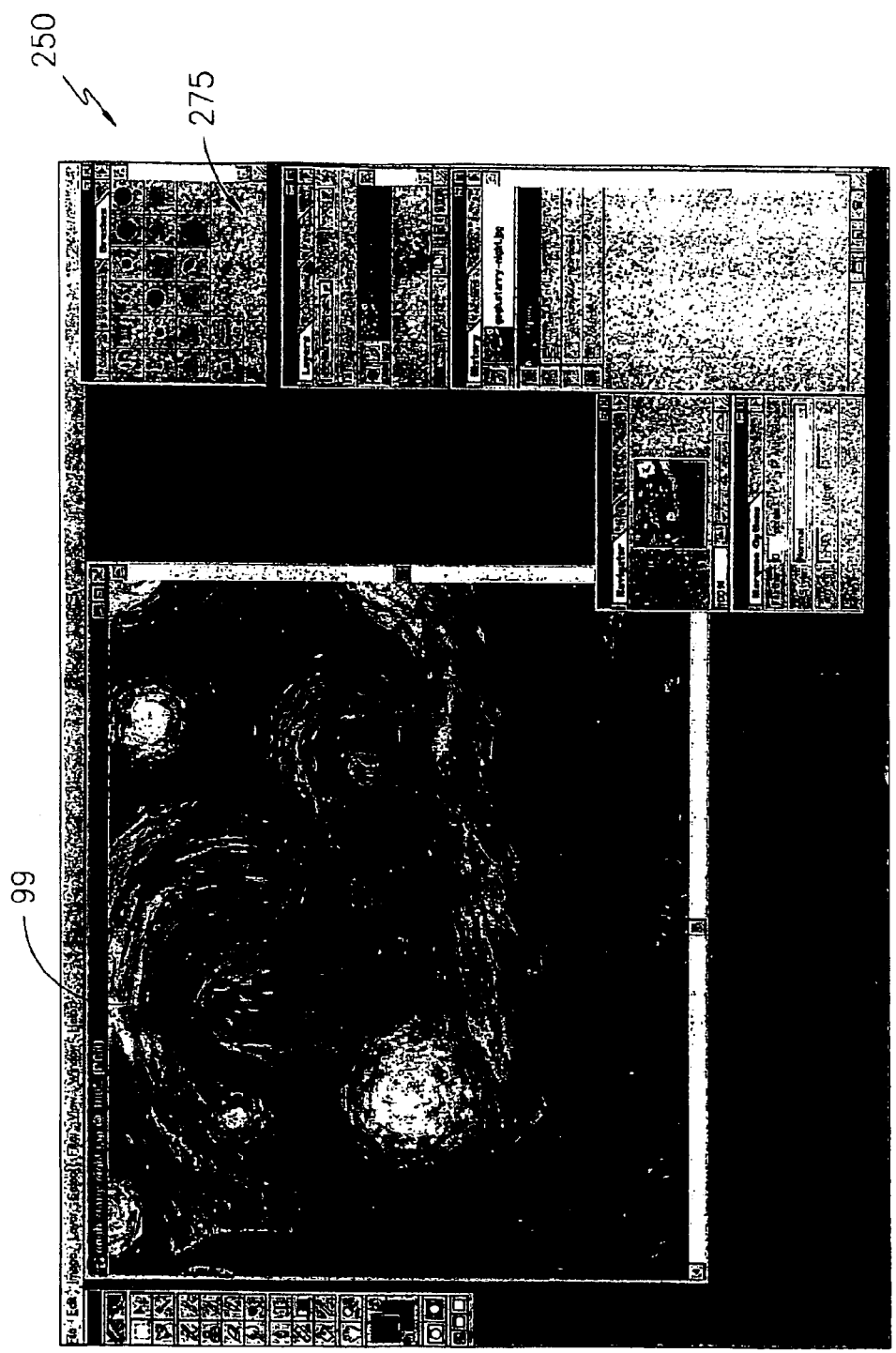
FIG. -7-

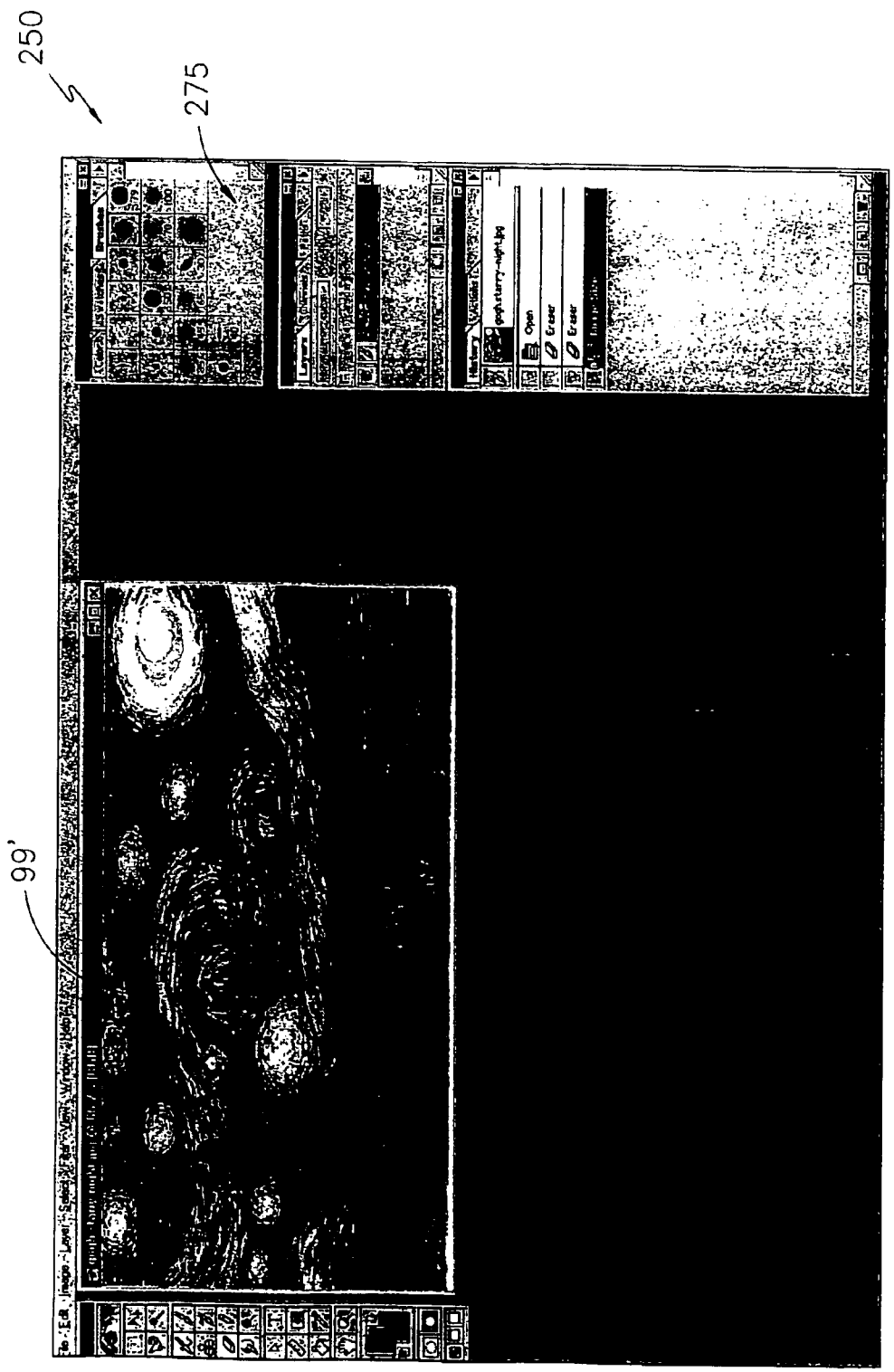
FIG. -8-

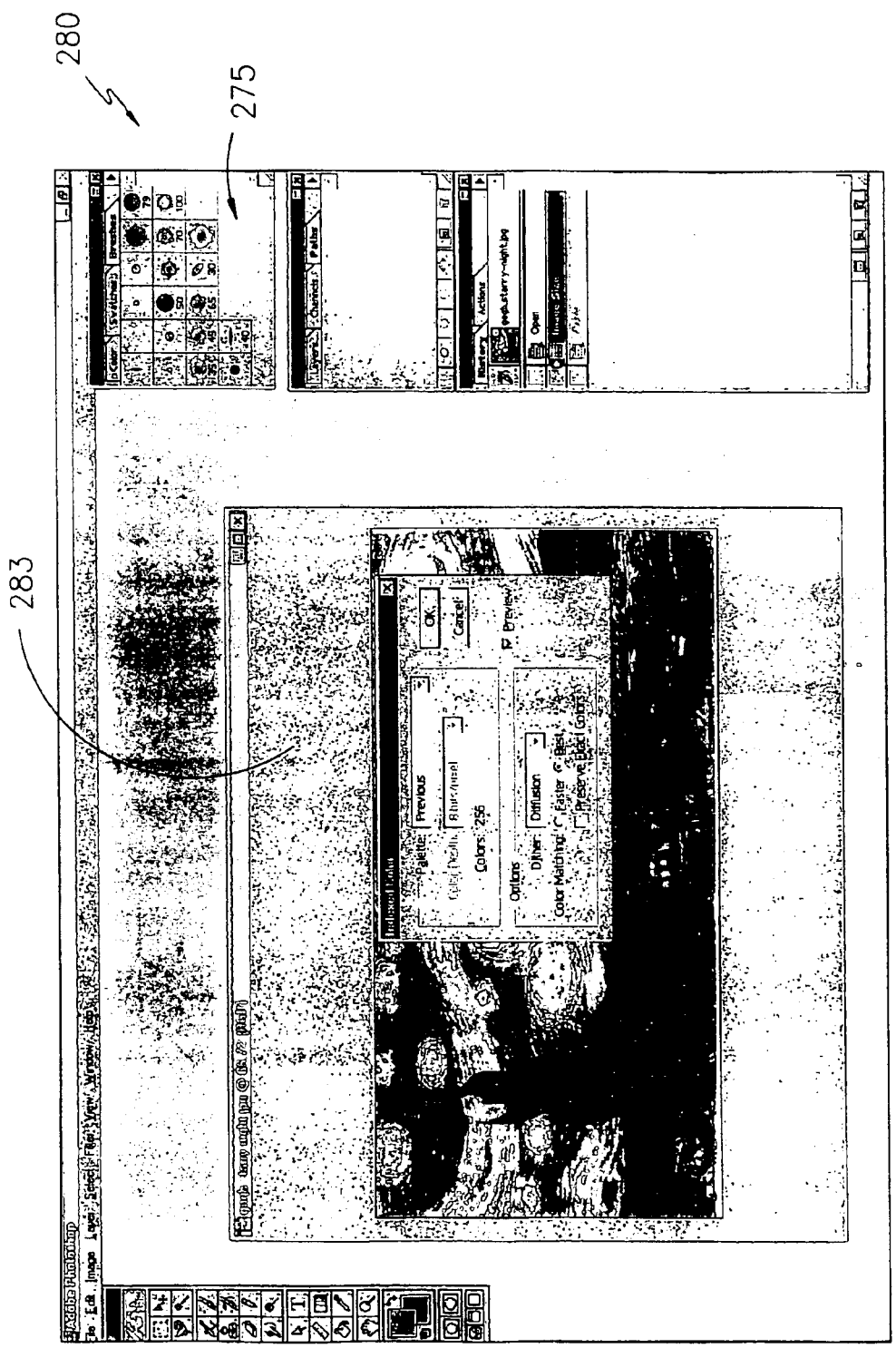
FIG. −9(a)−

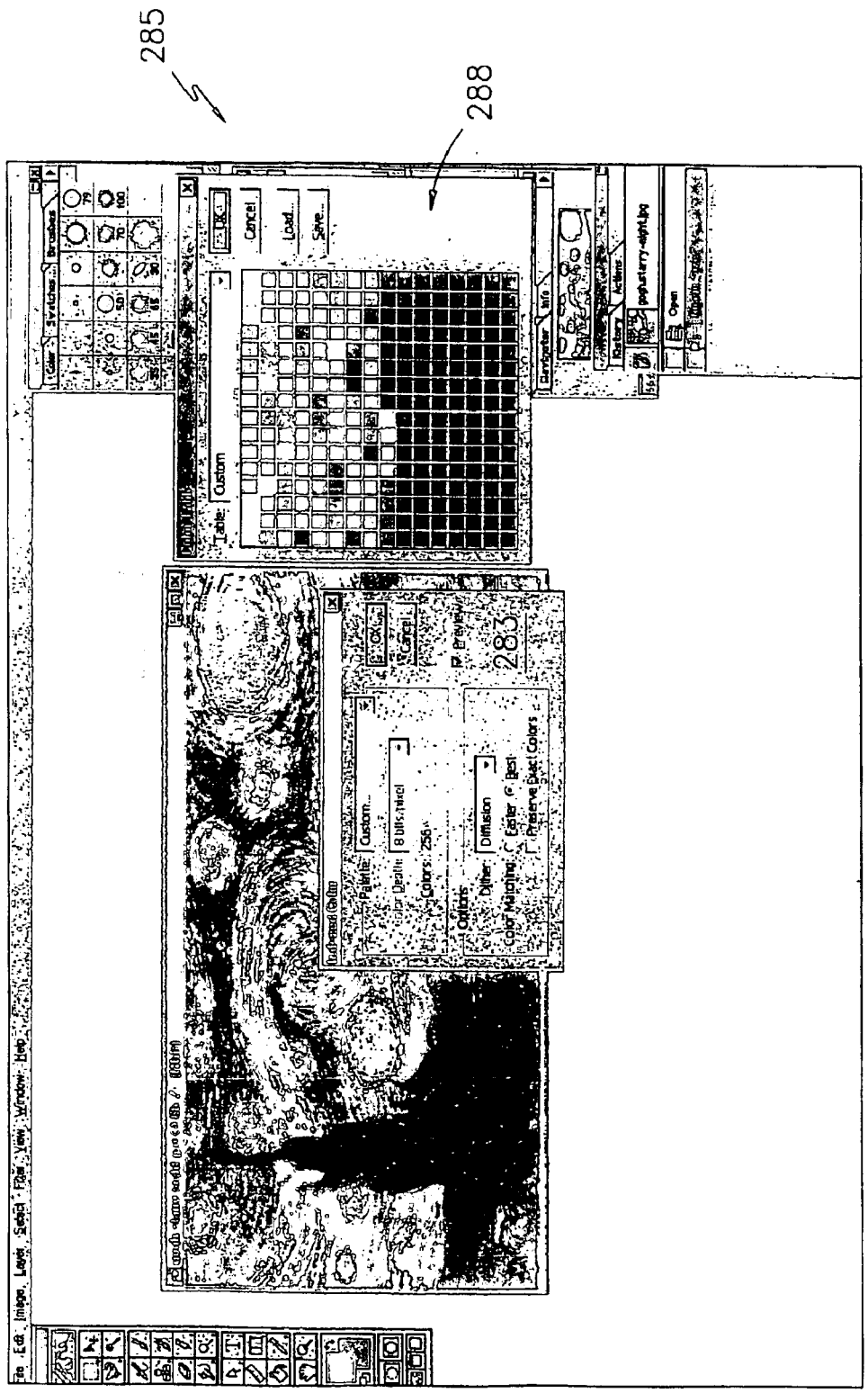
FIG. -9(b)-

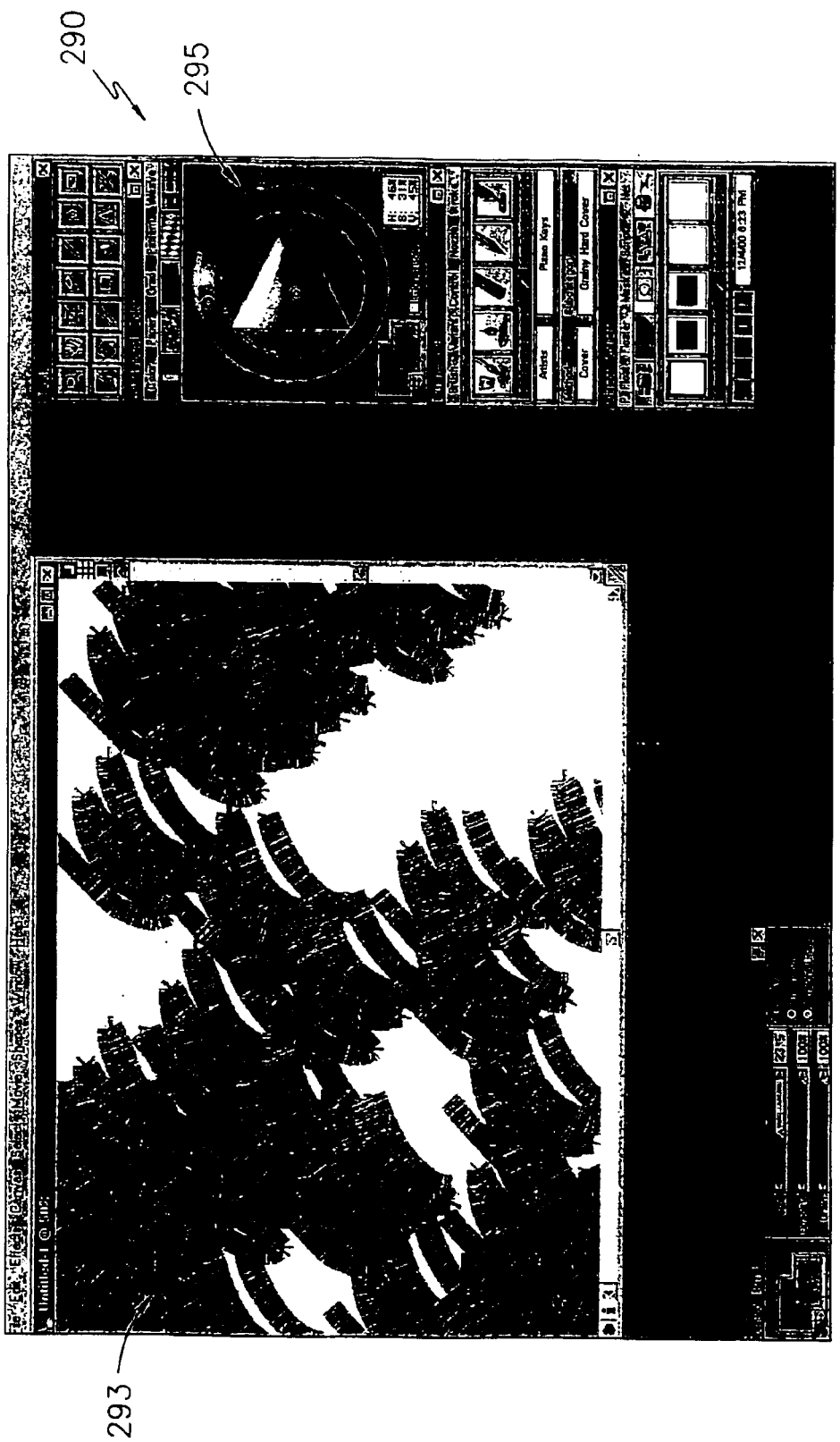
FIG. −10(a)−

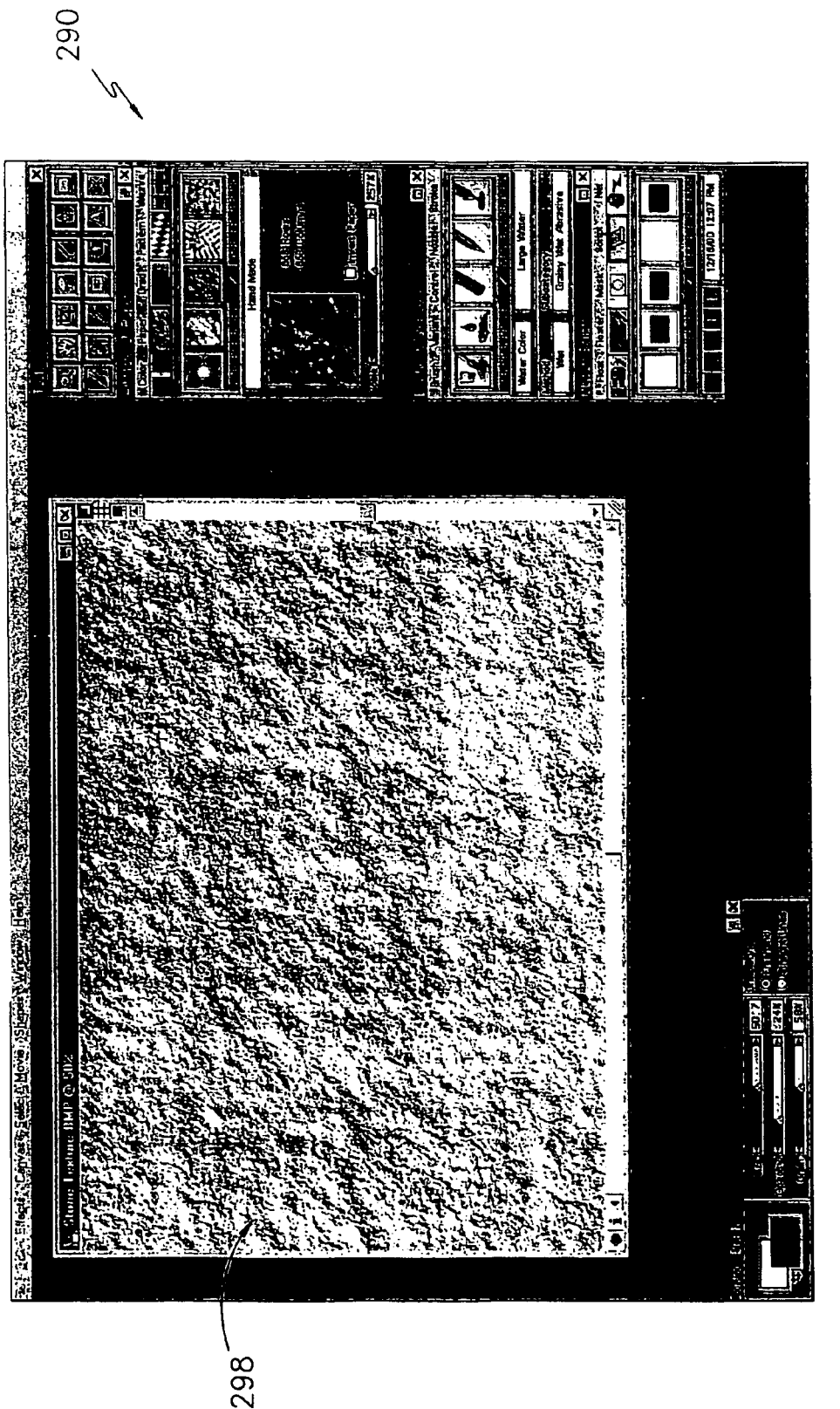
FIG. -10(b)-

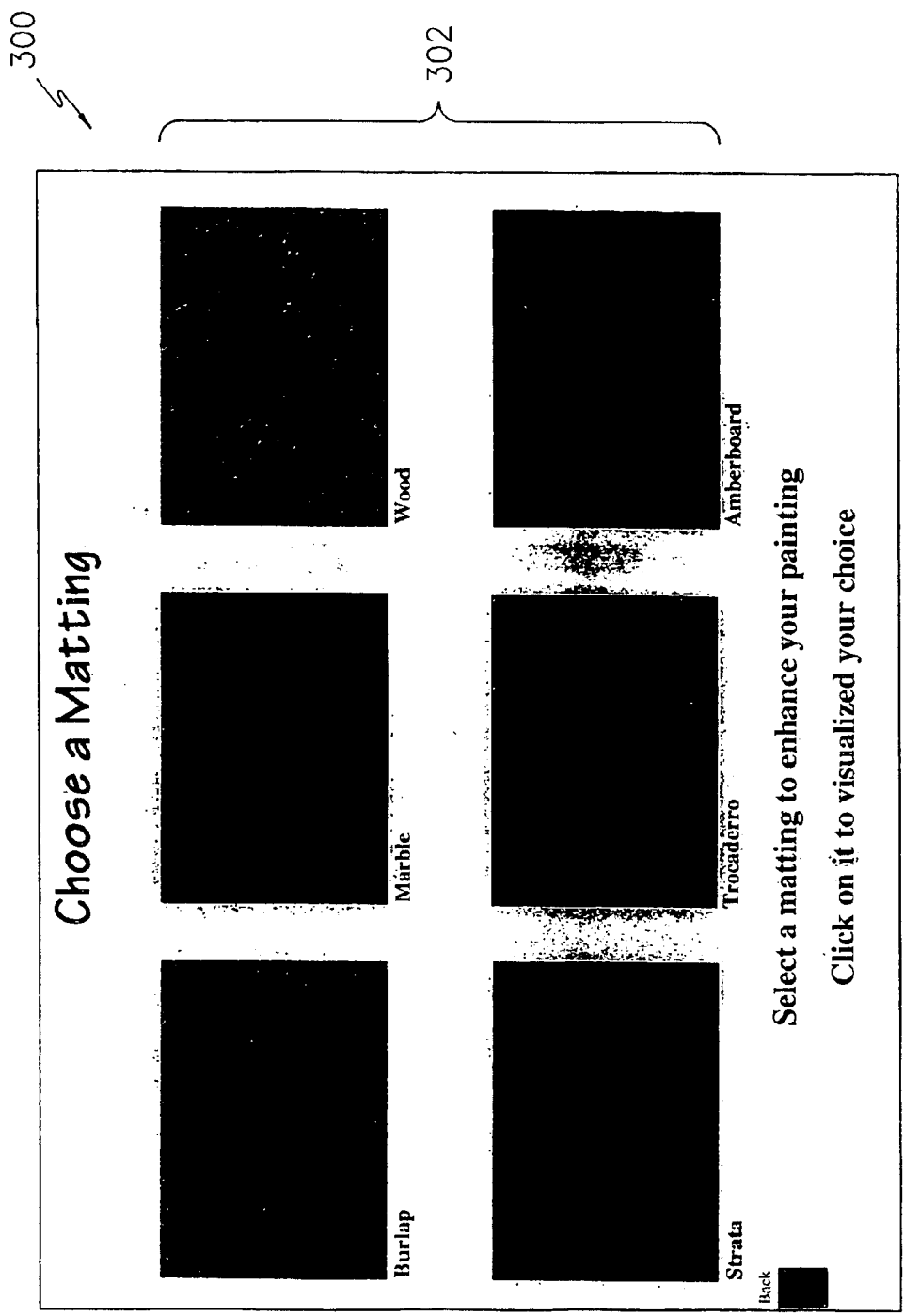
FIG. -11-

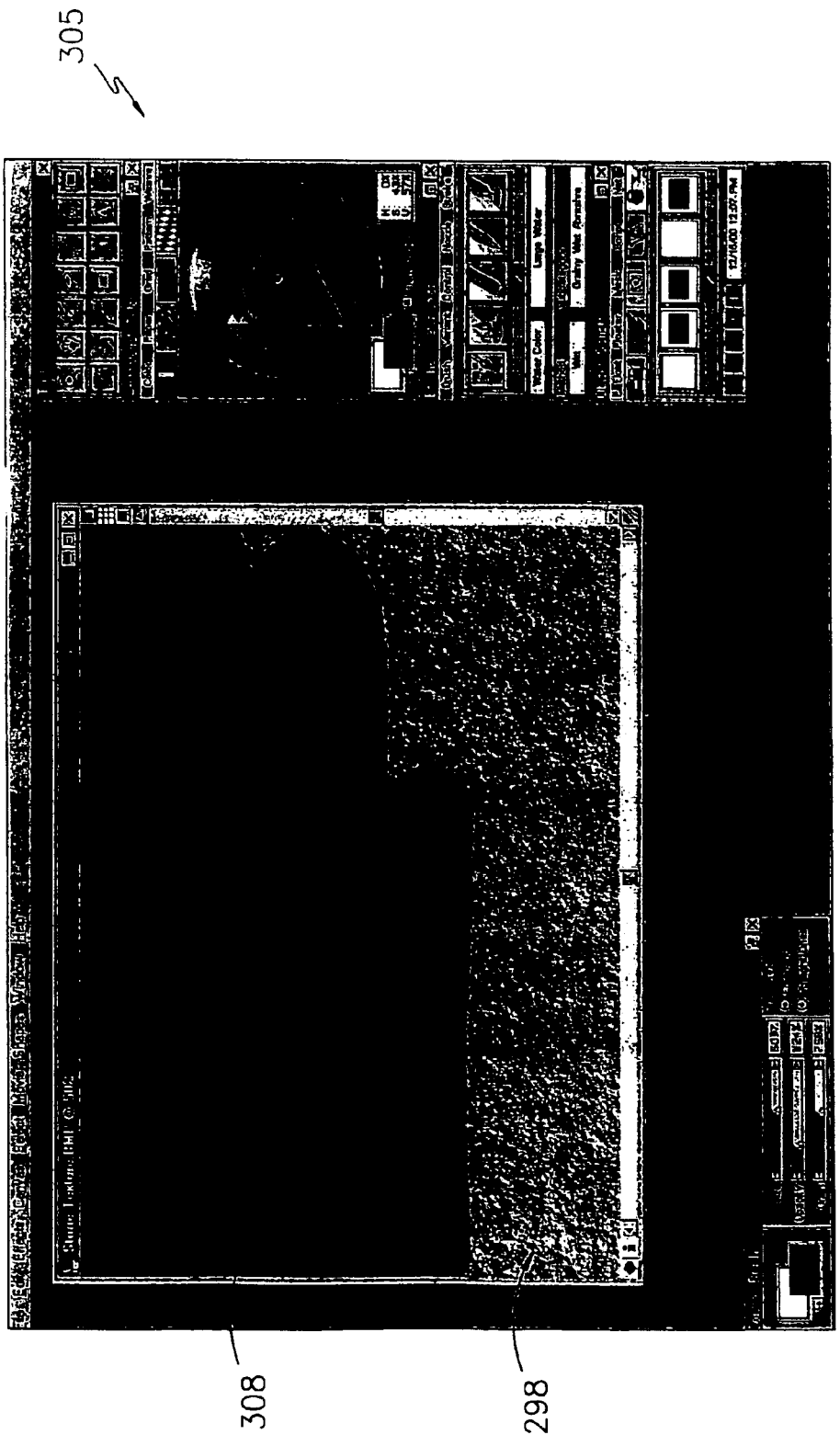
FIG. -12-

FIG. -13-

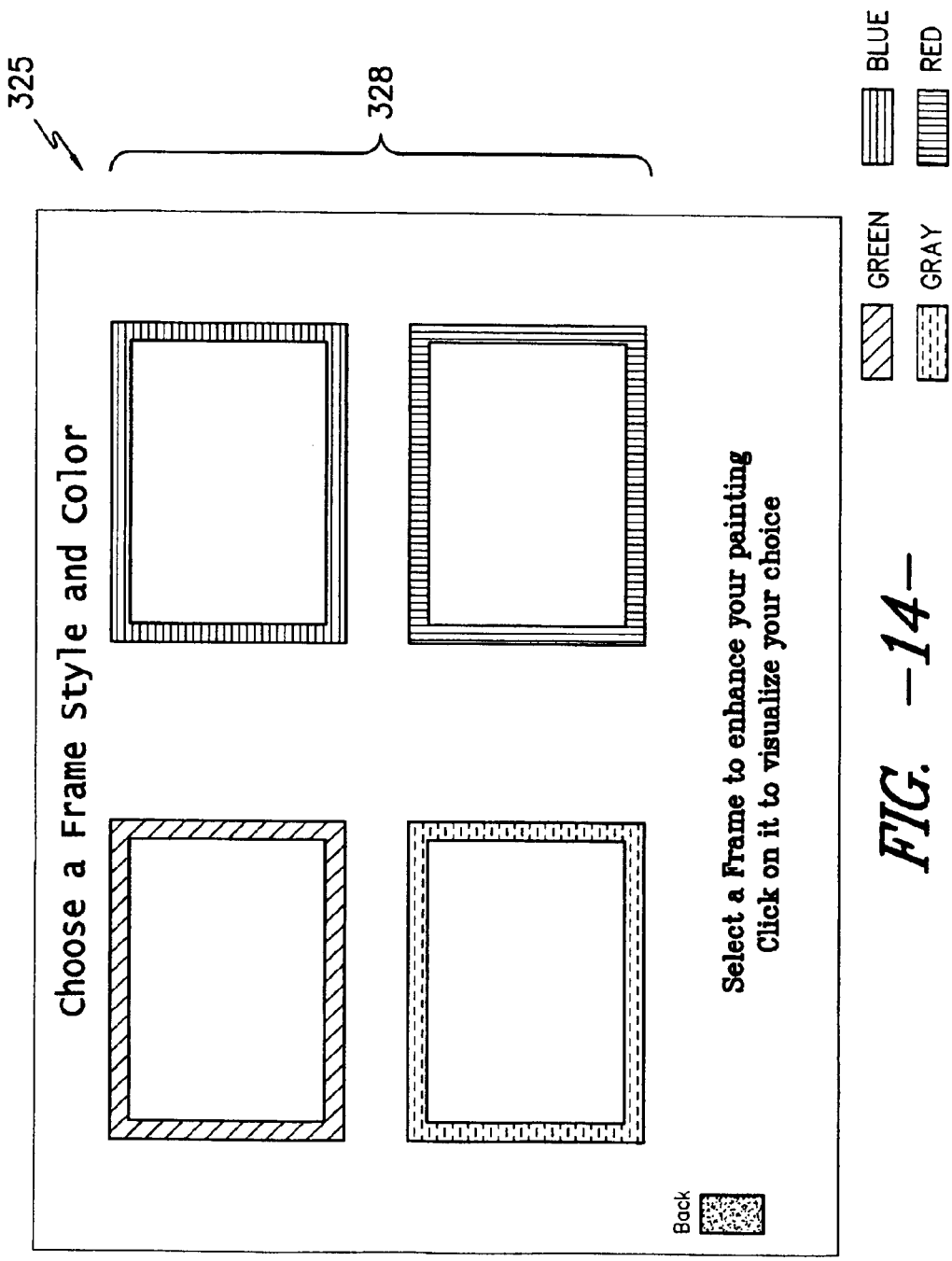
FIG. -14-

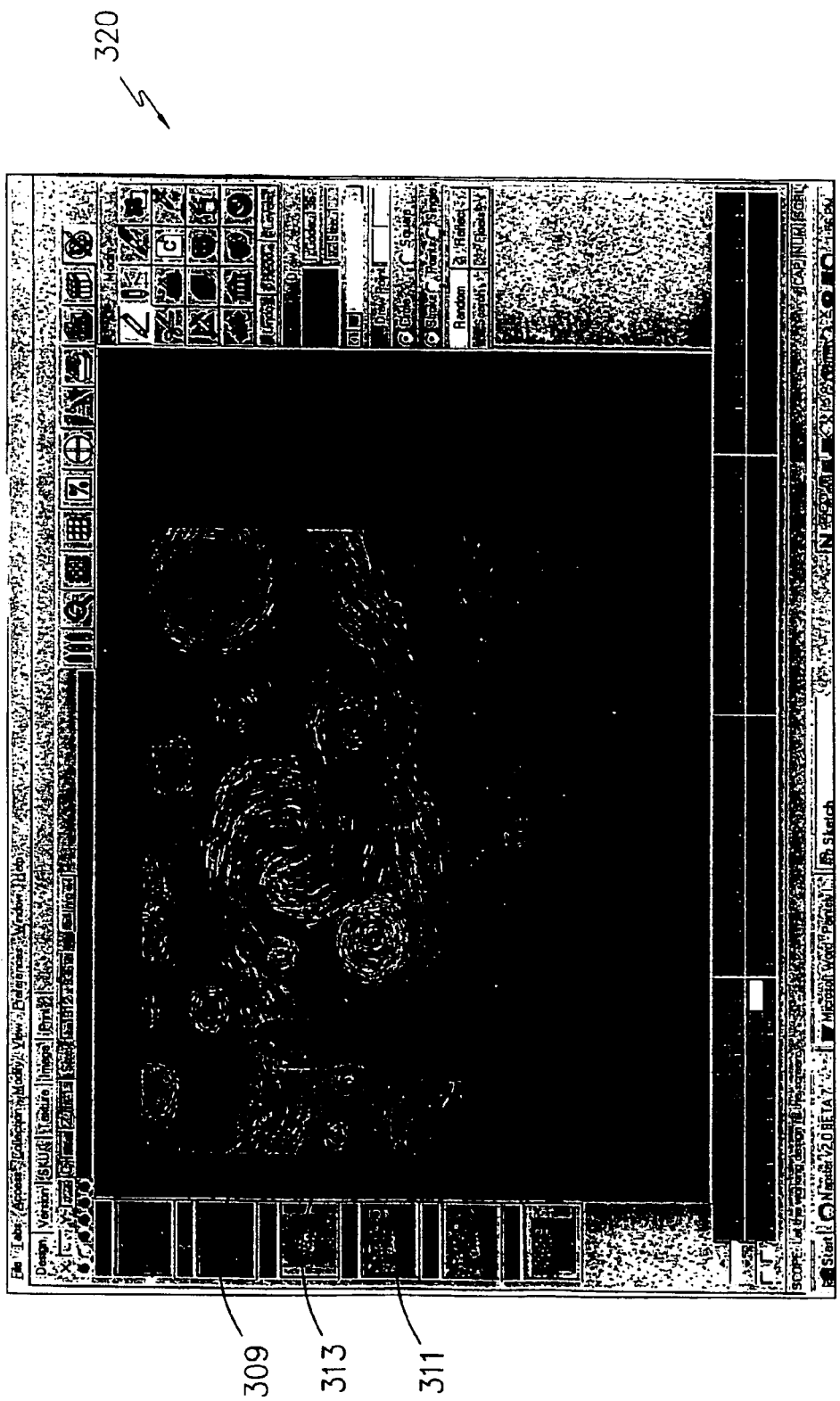
FIG. -15-

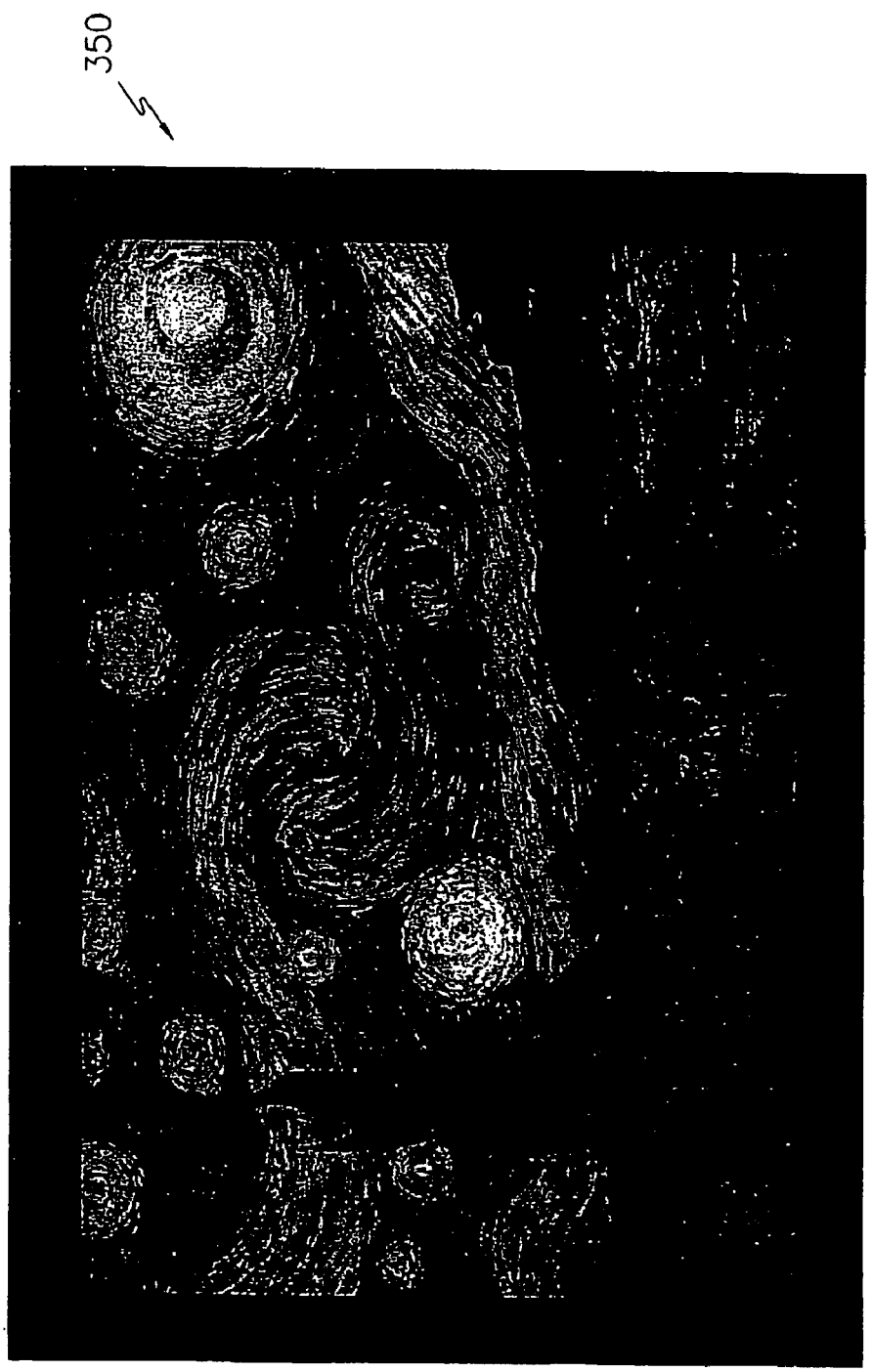
FIG. −16−

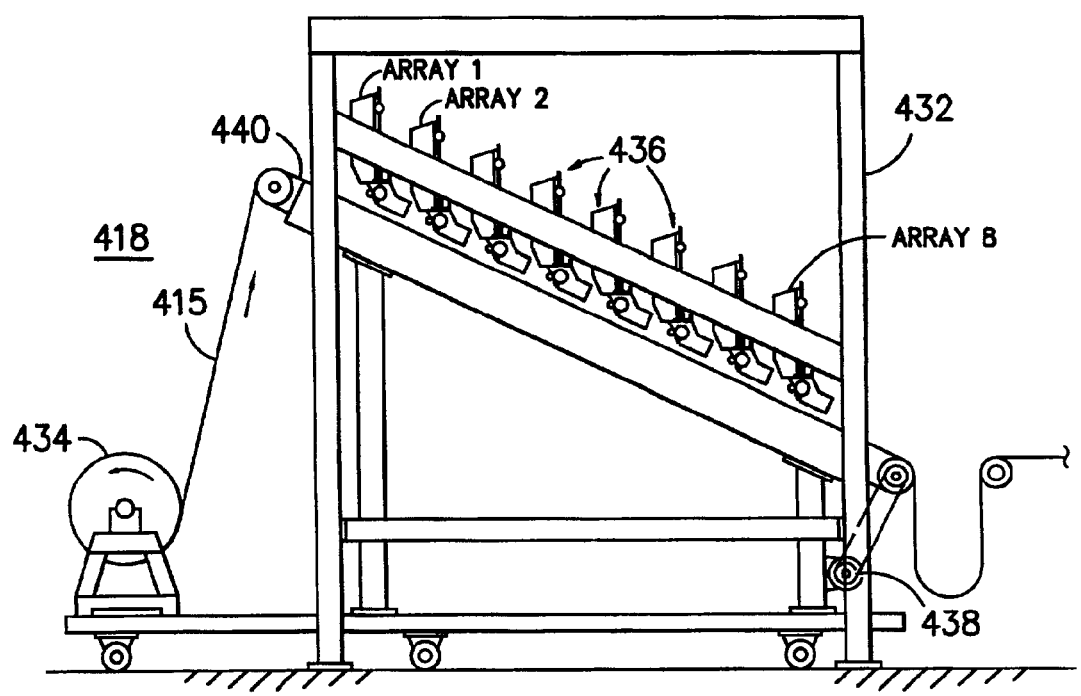
FIG. —17—

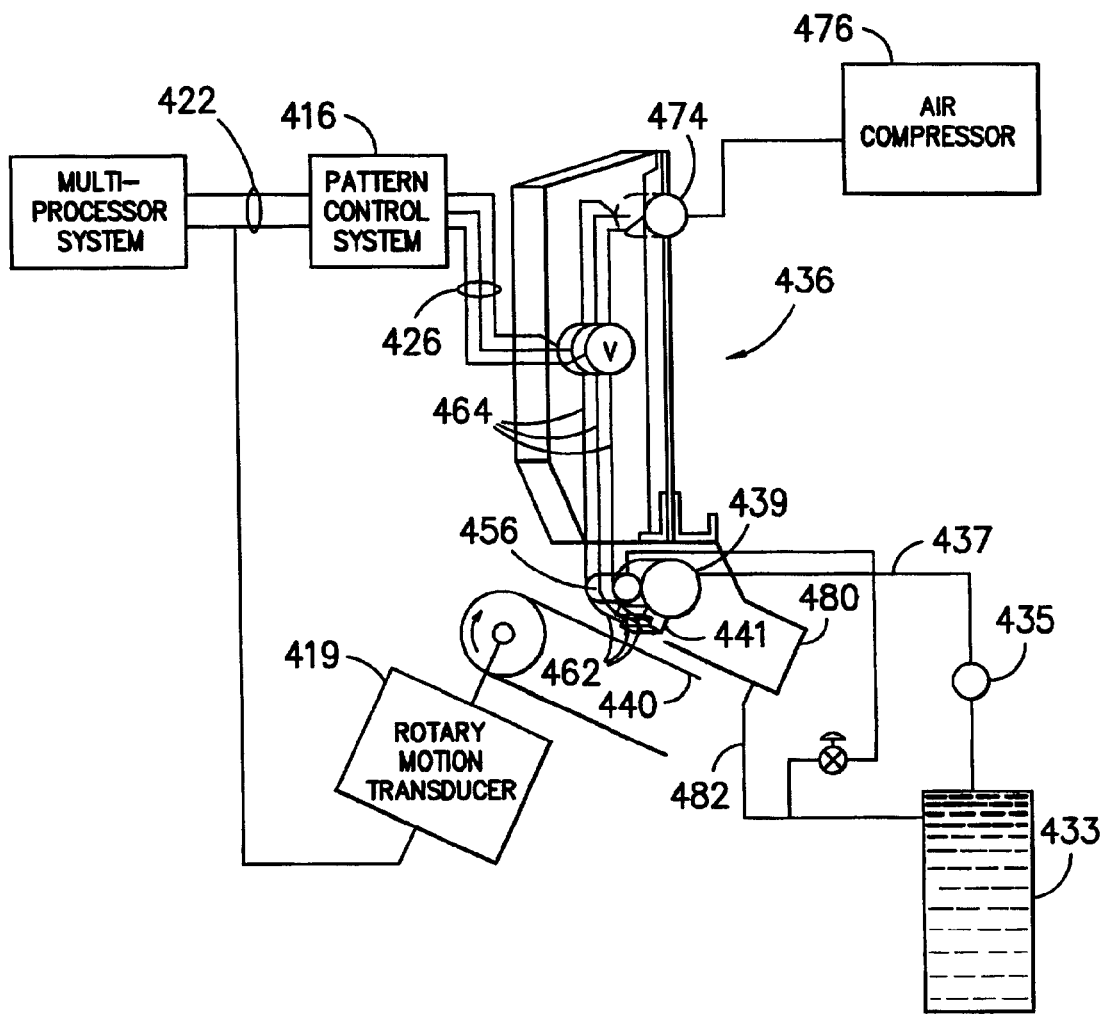
FIG. -18-

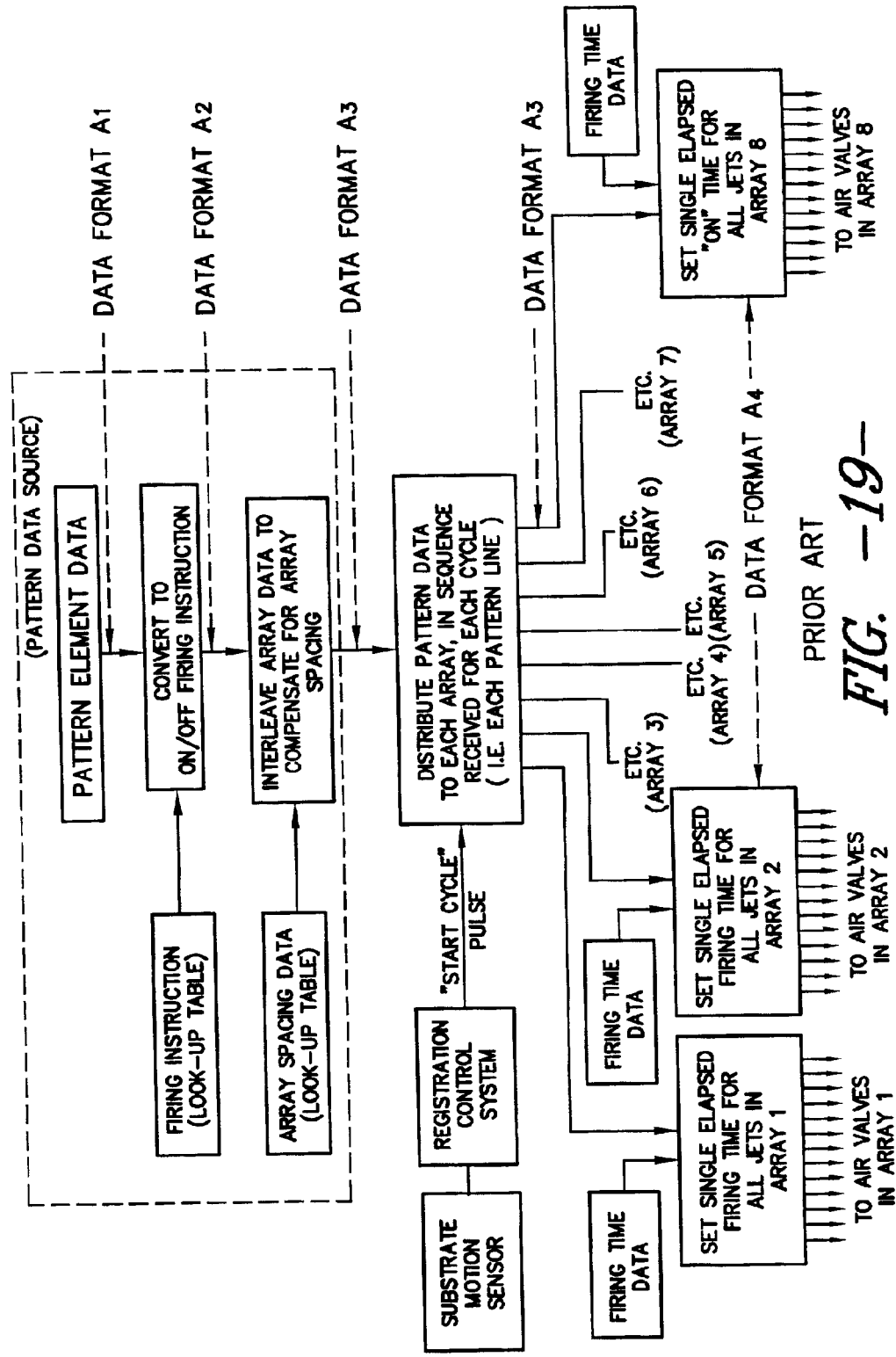
FIG. -19- PRIOR ART

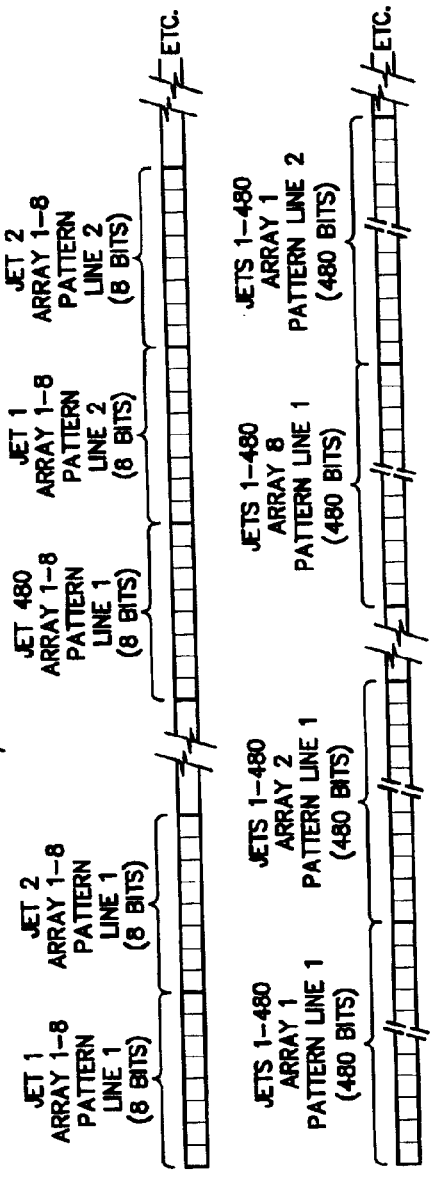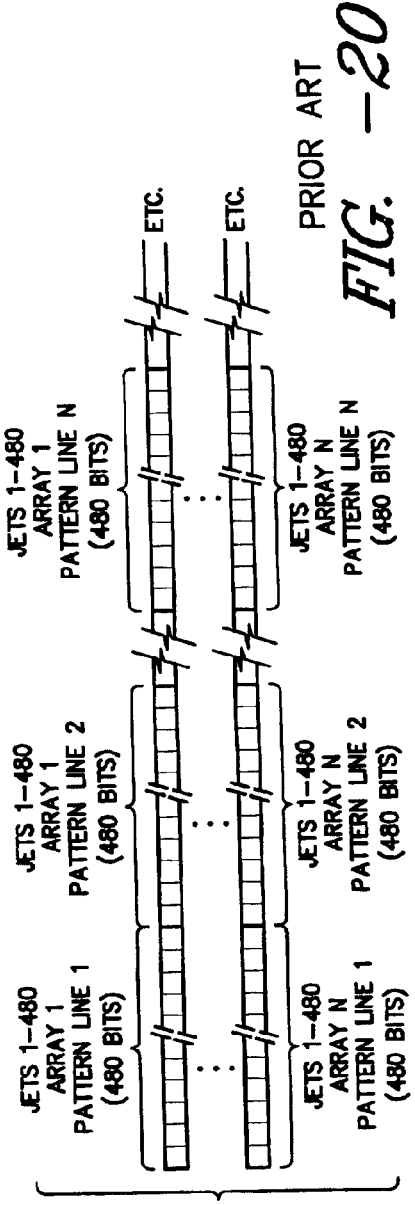

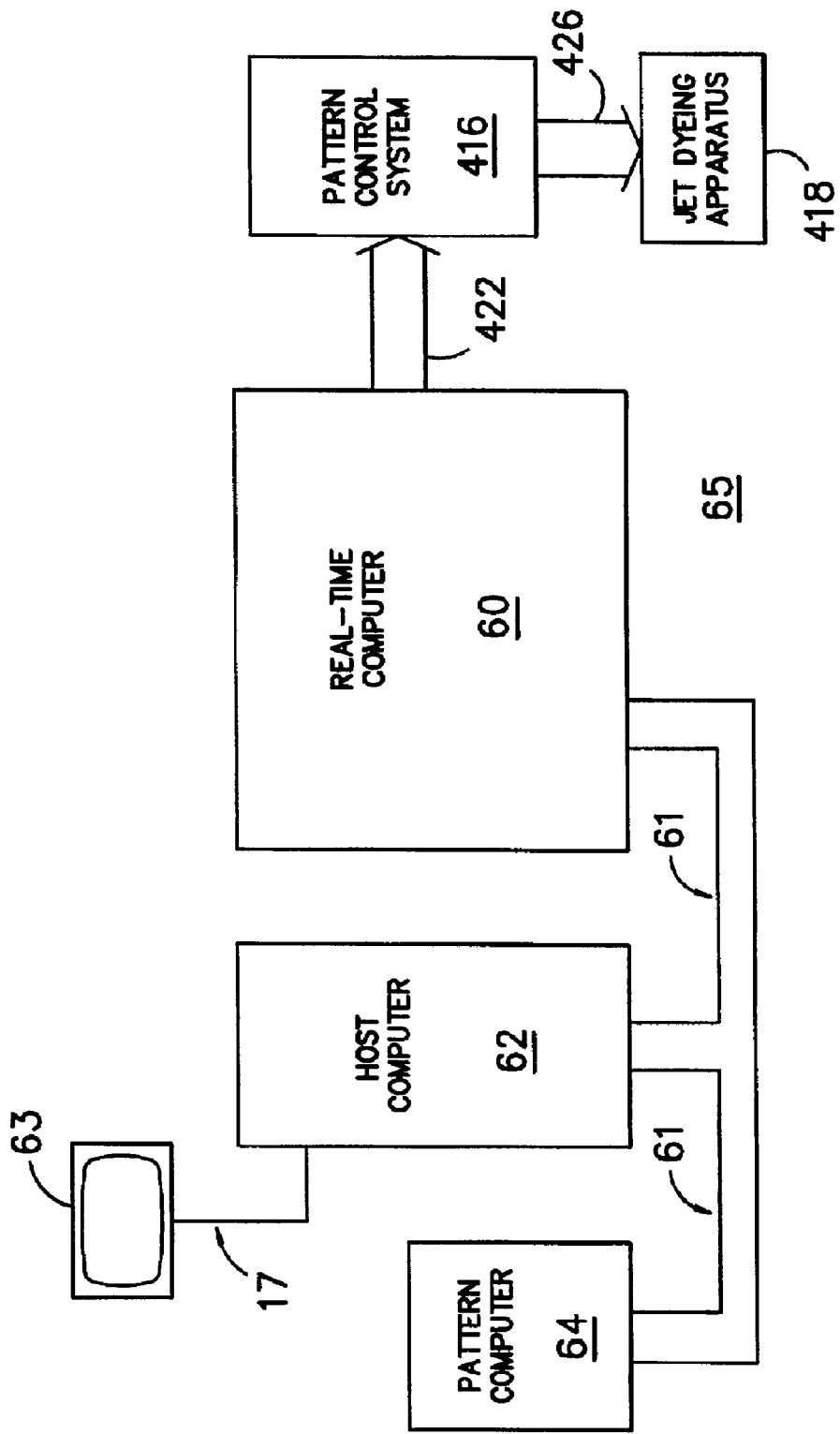
FIG. -21-

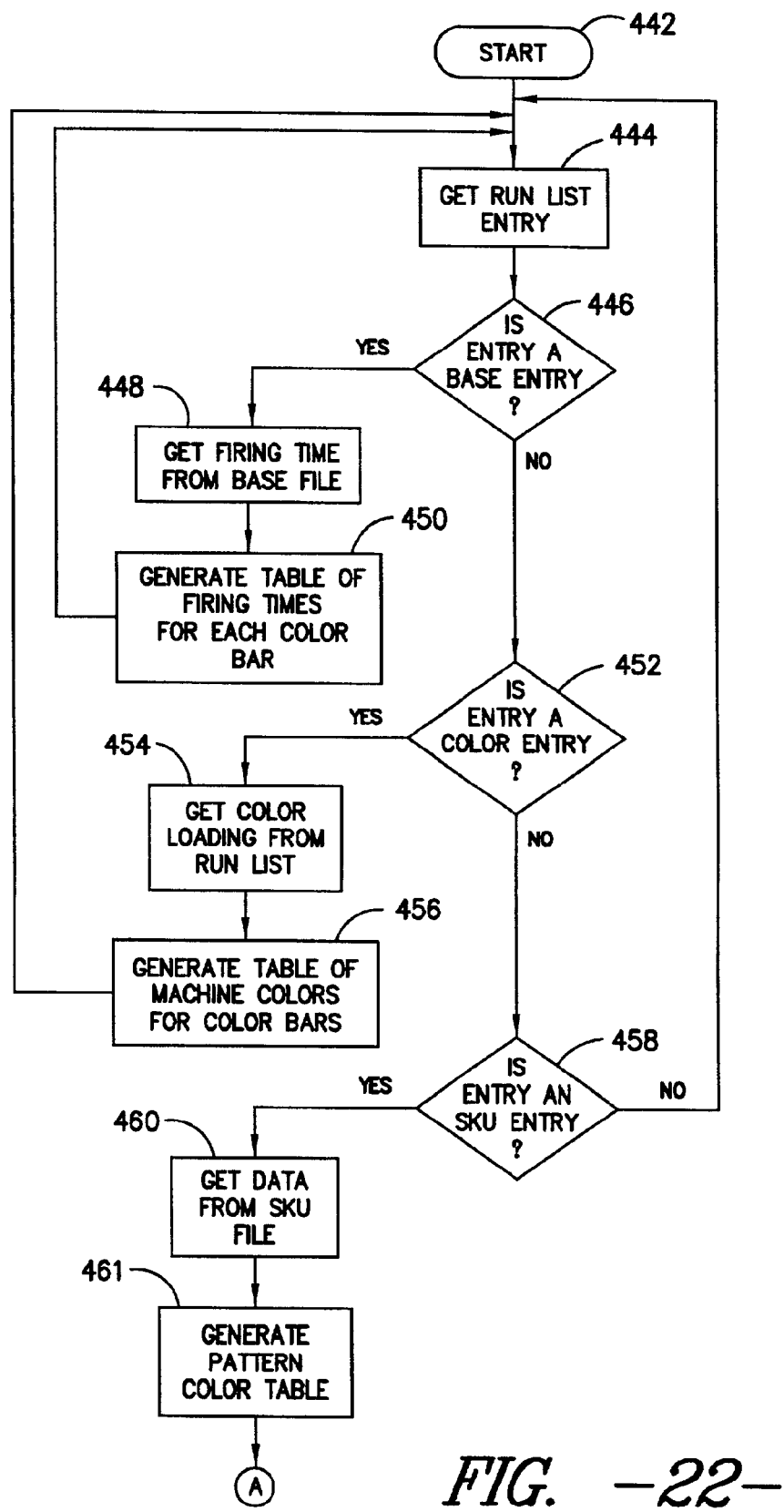
FIG. —22—

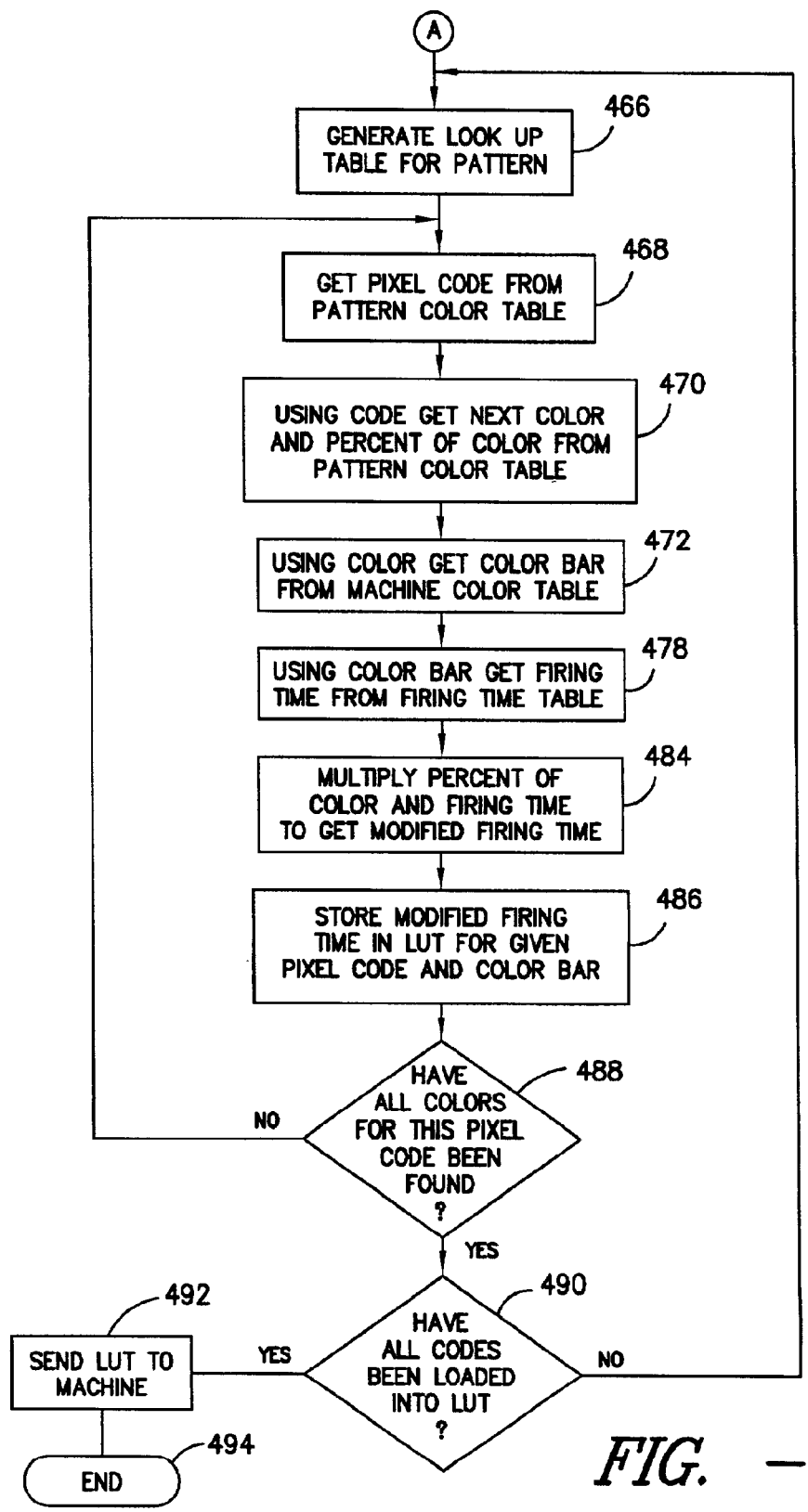
FIG. -23-

FIG. -24A-

BASE WXYZ

| BAR | FT |
|---|---|
| 1 | 10 |
| 2 | 10 |
| 3 | 20 |
| 4 | 15 |

FIG. -24B-

MACHINE CONFIG.

| COLOR | BAR |
|---|---|
| RED | 1 |
| BLUE | 2 |
| GREEN | 3 |
| YELLOW | 4 |

FIG. -24C-

SKU ABC

| CODE | COLOR |
|---|---|
| A | RED |
| B | BLUE |

FIG. -25A-

BASE WXYZ

| BAR | FT |
|---|---|
| 1 | 10 |
| 2 | 10 |
| 3 | 20 |
| 4 | 15 |

FIG. -25B-

MACHINE CONFIG.

| COLOR | BAR |
|---|---|
| RED | 1 |
| BLUE | 2 |
| GREEN | 3 |
| YELLOW | 4 |

FIG. -25C-

SKU ADE

| CODE | COLOR |
|---|---|
| A | 50% RED, 50% BLUE |
| C | GREEN |

FIG. —24D—

LUT'S

| CODES | | 1 | 2 | 3 | 4 |
|---|---|---|---|---|---|
| | A | 10MS | 0 | 0 | 0 |
| | B | 0 | 10MS | 0 | 0 |
| | | | | | |

FIG. —25D—

LUT'S

| | 1 | 2 | 3 | 4 |
|---|---|---|---|---|
| A | 5MS | 5MS | 0 | 0 |
| C | 0 | 0 | 20MS | 0 |
| | | | | |

FIG. —25E—

LUT'S

| | 1 | 2 | 3 | 4 |
|---|---|---|---|---|
| A | 0 | 0 | 20MS | 0 |
| B | 0 | 10MS | 0 | 0 |
| C | 5MS | 2.5MS | 0 | 3.75MS |
| | | | | |

FIG. —25F—

LUT'S

| | 1 | 2 | 3 | 4 | 5 |
|---|---|---|---|---|---|
| A | 0 | 0 | 0 | 0 | 10MS |
| B | 0 | 10MS | 0 | 0 | 0 |
| | | | | | |

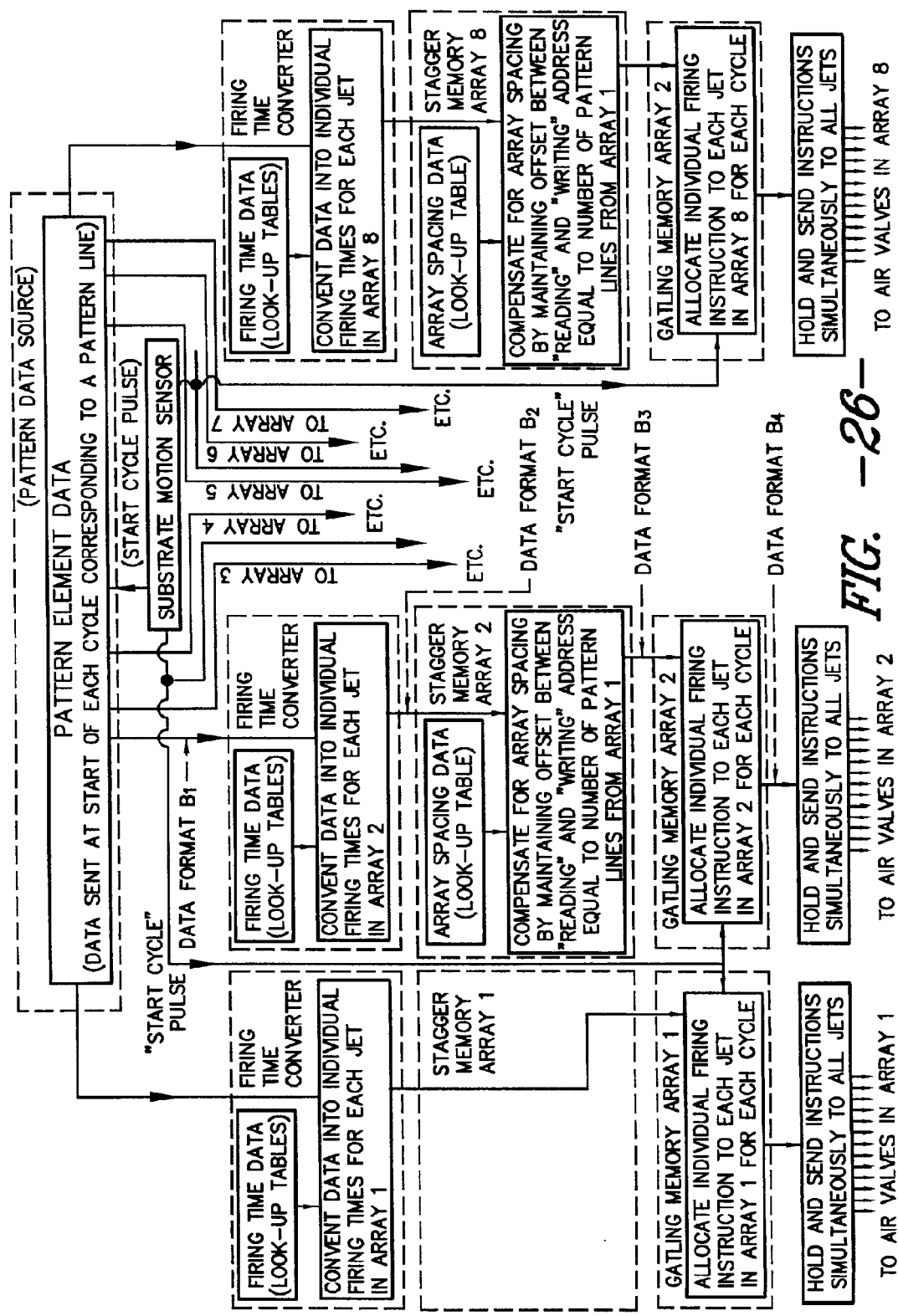
FIG. -26-

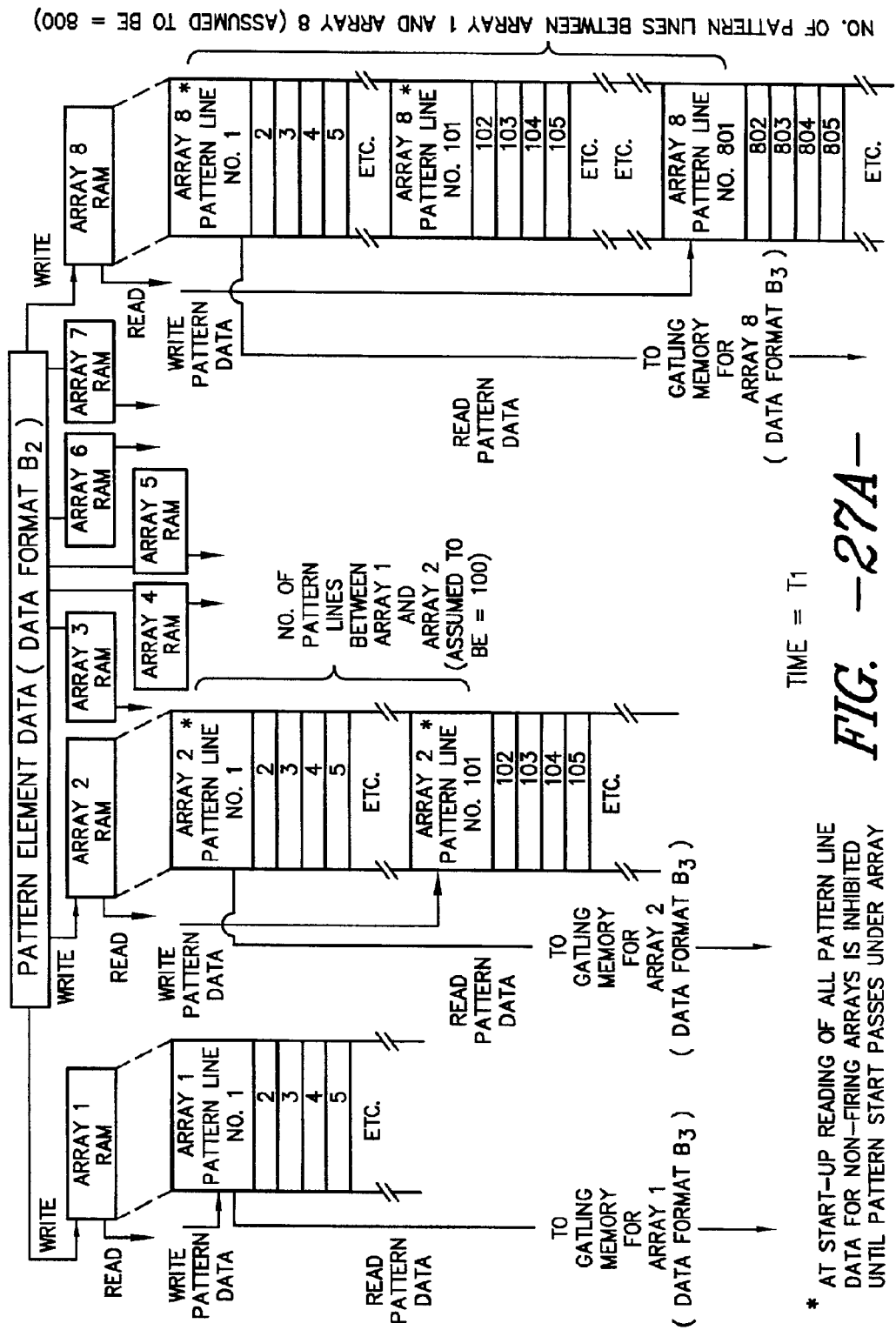
FIG. -27A-

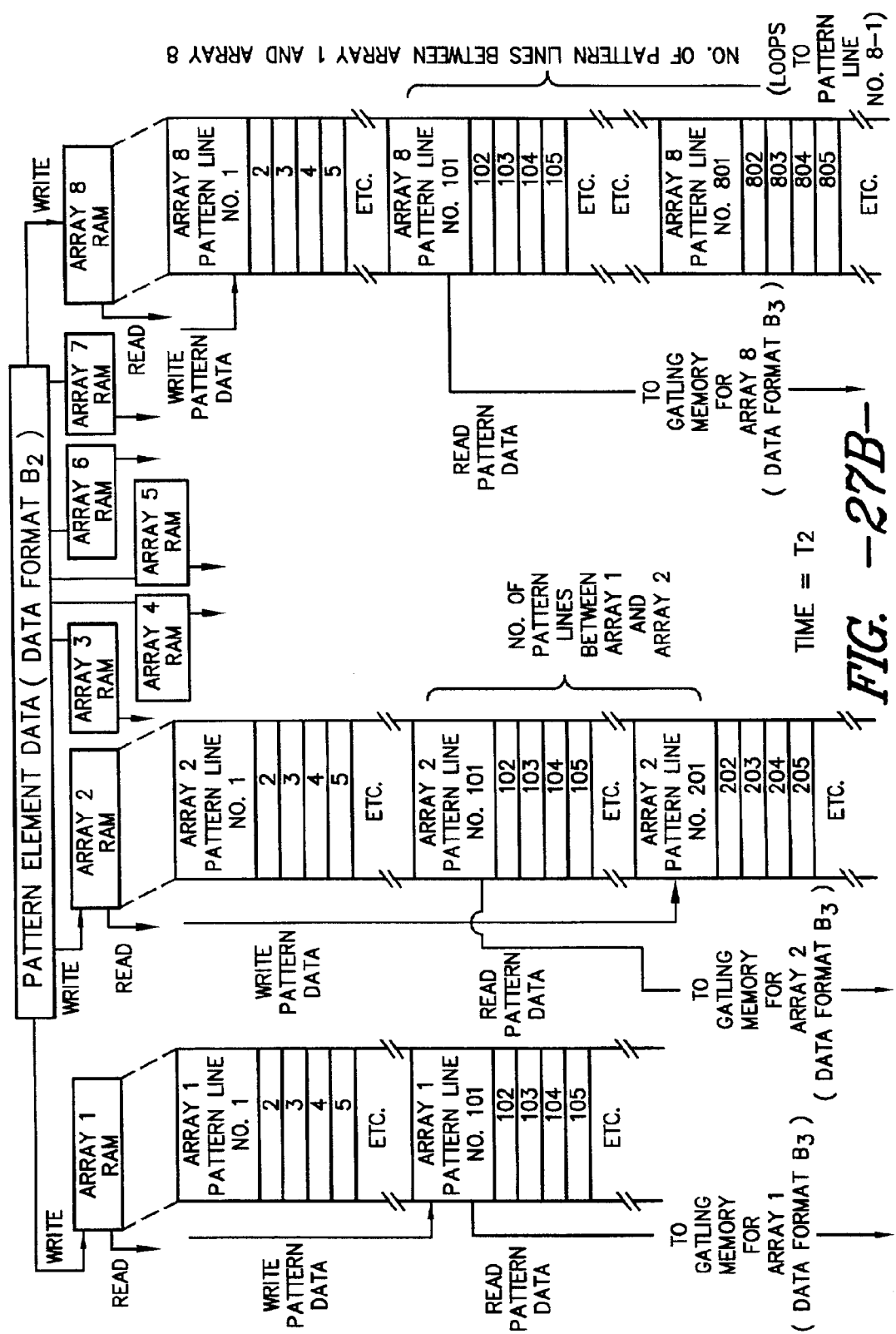
FIG. -27B-

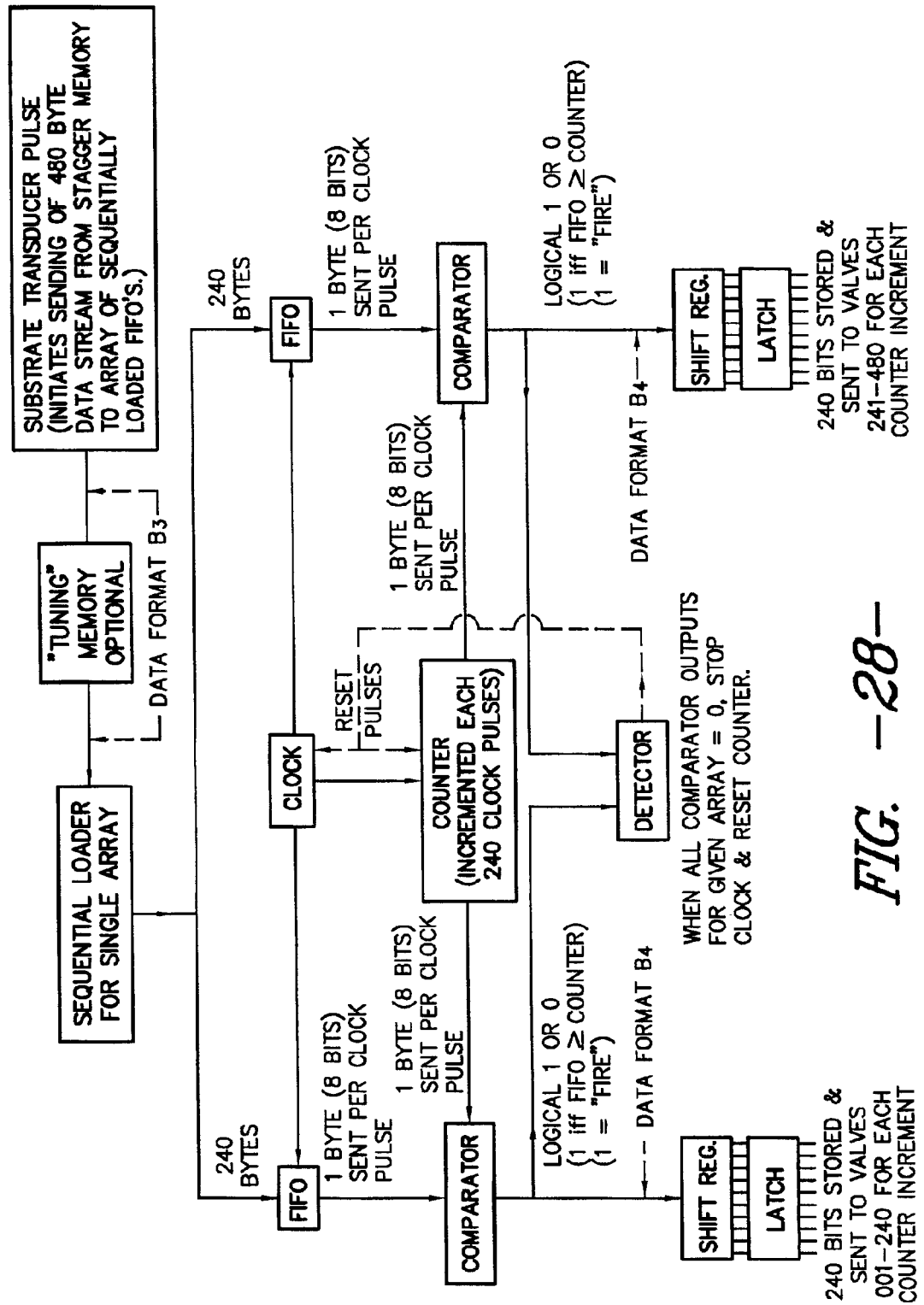
FIG. -28-

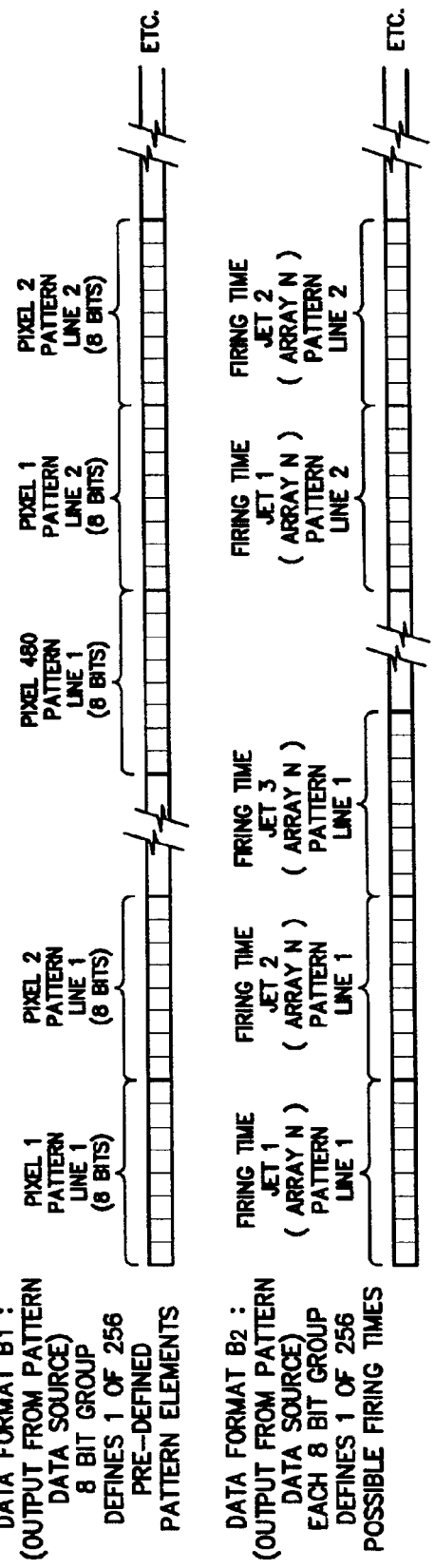
FIG. -29-

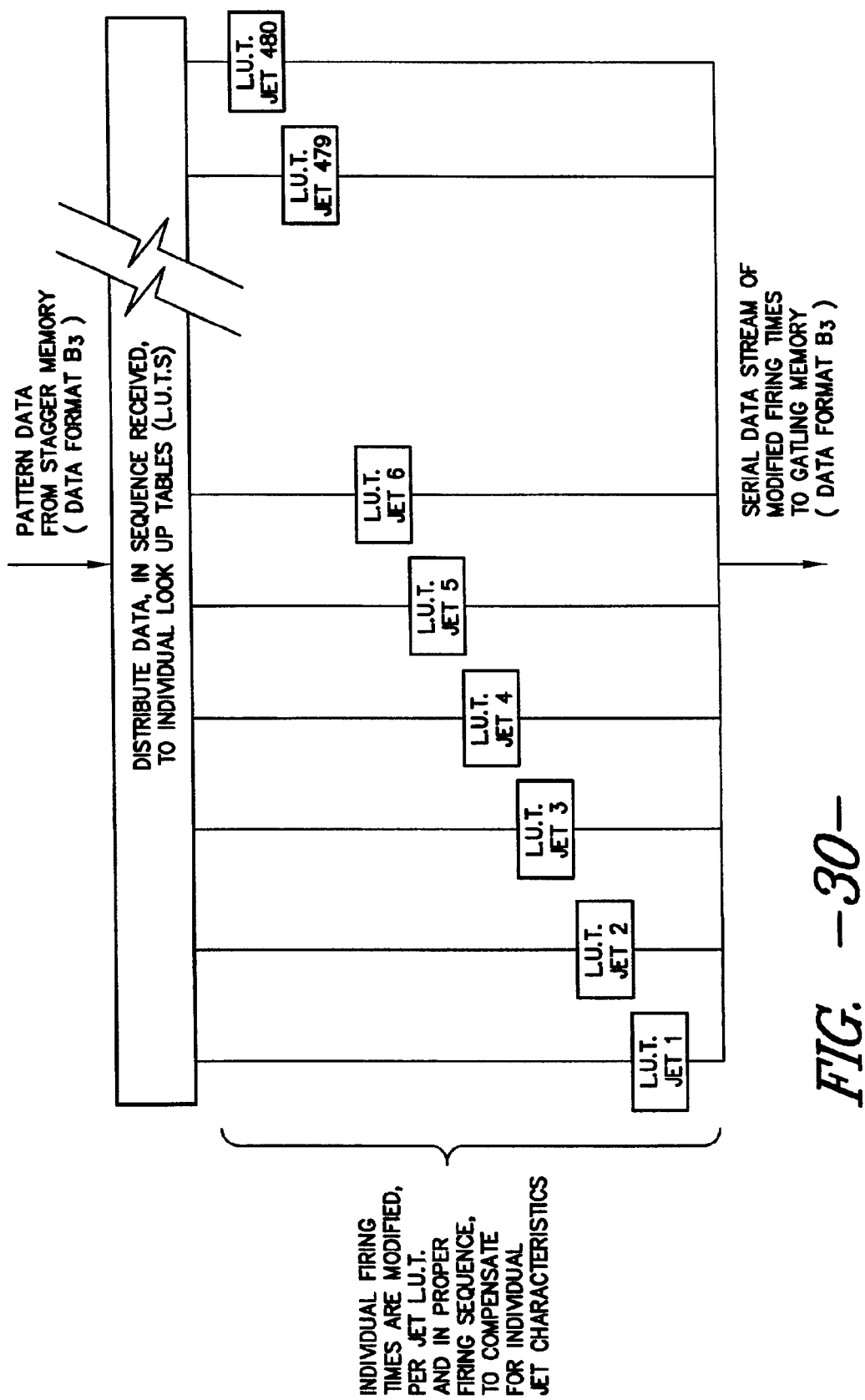
FIG. —30—

INTERACTIVE SYSTEM AND METHOD FOR DESIGN, CUSTOMIZATION AND MANUFACTURE OF DECORATIVE TEXTILE SUBSTRATES

BACKGROUND OF THE INVENTION

1. Field of the Invention

The present invention relates to the manufacture of decorative carpets, rugs, mats, carpet tiles, or other textile substrates, and particularly to an interactive system and methodology that enables users to modify and/or customize a digitized image via a computing terminal, and generate a custom order for initiating the expedient manufacture of a carpet, rug, mat, carpet tile, wall hanging, or other absorbent substrate, including a pile substrate, having the user-customized image dyed accurately thereon.

2. Background

Currently, the manufacture of decorative area carpets, rugs, mats, carpet tile, and other textile substrates is performed by textile patterning processes utilizing various weaving, tufting or printing processes. Among the latter are automated patterning machines in which a plurality of individually controllable color dye jets or ink flow valves are coordinated to receive electronically-defined dye dispensing instructions that render a patterned image upon the substrate. One such machine, described in more detail herein, comprises an array or matrix of stationary color dye applicators, each of which provides a flow of dye material that may be interrupted at precisely-defined times so that the appropriate amount of dye material may be applied to the appropriate location on a moving fibrous pile substrate to accurately render a color pattern thereon. Other machines of somewhat different design provide for the controlled direct application of pre-determined quantities of color dyes (perhaps defined by pattern data or manufacturing experience) to areas of the substrate through the use of one or more sets of dye valves that either are stationary or that traverse across the face of the substrate to be patterned. Yet other machines, specifically various Jacquard or solenoid-actuated weaving machines or graphics tufting machines, are specifically adapted for the detailed patterning of textiles through the use of colored yarns that are placed automatically into pattern-specified, pixel-like locations. While the teachings herein are believed to be applicable to any such patterning device in which colored elements are placed or incorporated, in accordance with electronically-defined, pixel-specific pattern data, in or on a textile substrate, a preferred embodiment employs the selective dispensing of liquid colorants in pixel-wise fashion onto the surface of an absorbent textile substrate by colorant applicators that are actuated in accordance with electronically-defined pattern data.

Currently, customers or users (unless otherwise indicated by comment or context, the terms "customers" and "users" shall be used interchangeably) wanting patterned or decorative carpets, rugs, mats, carpet tile, or other textile substrates refer to a sales brochure or samples, whether off-line, e.g., at a retail store or wholesale entity, or electronically, e.g., via an Internet web site. Whether in "hard copy" (e.g., paper) or electronic form, the sales brochure typically provides a menu of inventoried textile substrates (e.g., carpets or rugs, for purposes of discussion) that are pre-sized, and that have pre-defined patterns, images or decorations from which the customer may select. In some instances, the customer may not have any input to the color scheme of the chosen pattern, image or decoration, or perhaps may only be able to select those patterns/images that are inventoried, i.e., rugs that have already been rendered with images/designs and color schemes. Typically, however, the customer may be provided with some degree of customization. For example, after selection of the design or image that is to form the desired subject of the patterned substrate, the customer may select from among a pre-determined number of choices of color schemes, and, in addition, select a substrate size, if available in the maintained inventory of the supplier. In some circumstances, additional choices may be available, such as special color or design modifications, or the addition of standardized or customized text, perhaps at a higher cost.

Selection and/or customization of decorative textile substrates in this manner may be limited, in that the customer may not be provided with a large number of options from which to choose. Where some degree of customization may exist in the sense of a customer having the ability to supply the subject design or image of his/her choice, this scheme again may be limiting in that the customer may be required to physically provide the image to the manufacturing plant or retail outlet (e.g., by mail or in person), and may also be limiting in that the customer may not provided with the opportunity to view the actual final colors that will be used to render the image in the product prior to its manufacture.

While user manipulation of digitized graphic images is well-known in the photographic and graphic design arts to enable creations that are intended to be printed on paper or other two-dimensional media, e.g., through the use of design software that provides digitized image editing and manipulation functions such as Adobe Photoshop®, Corel Draw®, and the like, such an image edit/manipulation tool has not been used as an aid in the manufacture of decorative area carpets, rugs, mats, carpet tile, interior furnishing fabrics, and other textile substrates, and particularly fibrous pile textile substrates. In particular, there has been a need for a system whereby individual customers with no special training may produce one-of-a-kind or highly customized image creations that can be readily transformed into a decorative area carpet, rug, wall hanging, drapery, or the like, within a cost range normally associated with mass market economies of scale.

It would thus be highly desirable to provide a system and process that enables individual customers with no special training to custom design rugs, carpets, carpet tiles, dust control mats, furniture upholstery, wall hangings, drapes and other window treatments, or other textile substrates, and to initiate the manufacture of such textile products with the economy ordinarily associated with mass production, without the need for the manufacturer to maintain an inventory of such items.

It would also be desirable to provide a system that enables users of such a system, whether they are skilled designers or unskilled in the design arts, to customize an order for initiating the manufacture of carpets, rugs, mats, carpet tiles, dust control mats, furniture upholstery, wall hangings, drapes and other window treatments, or other textile substrates with designs, patterns or images of their choice, in a convenient, expedient manner.

It would be further highly desirable to provide an Internet/web-based system that enables users of such a system, whether they are skilled designers or those unskilled in the design arts, to customize the design of such textile substrates with designs, patterns or subject images of their choice via a standard web browser device, and further that enables such users to view the results of their choices, including color choices, on a computer monitor prior to generating a sample or a production order.

Conventionally, the process of electronically controlled injection of dye into a textile substrate such as a carpet involves the creation of a set of computer data including the specification of the design, the process colors, the desired colors, the substrate, and any textile finishing specifications. This computer data is used to create any number of replicates of the finished product, with all items of the finished product being identical within manufacturing limitations. Currently, there is no mechanism for individualizing single items within the computer data to accommodate the creation of a customized textile item in such a manufacturing process. Such customization could include the addition of strings of text coupled with design elements such as custom colors and customer-specified images strategically placed on the textile surface to create an individualized end product, as communicated by the customer.

Apart from the desirability of enabling a customer to have direct input of customized data in the manufacturing process, it would be highly desirable, from a manufacturing cost perspective, to provide a mechanism for enabling the resulting customization of these textile products to be specified and tracked on an item-by-item basis within the context of a larger, over-arching single product specification.

Methods currently available in the art dictate that all items produced by a single Stock Keeping Unit ("SKU") are identical. In order to produce a customized item such as an area rug, an entirely new SKU and design must be created. The manually intensive operation of creating such custom designs is, in many cases, cost prohibitive. Due to the degree of manufacturing complexity introduced, tracking the large number of individual custom SKUs (in terms of pricing, costing, etc.) is also, in many cases, cost prohibitive. Thus, it would be further highly desirable to provide means enabling automated customization of a product within a single SKU. A single SKU could be used for pricing, costing, etc., yet the ability to specify and track a one-of-a-kind customized product would remain available.

Additionally, it would be highly desirable to provide means for enabling the creation of a customized product without significantly increasing the cost to produce it as compared with the cost of a similar mass produced product.

SUMMARY OF THE INVENTION

Accordingly, it is an object of the present invention to provide a commercial service which facilitates the expedient design generation and customization of decorative fibrous pile material or other textile substrates, such as area rugs, carpets, dust control mats, furniture upholstery, wall hangings, drapes and other window treatments, and the like (collectively, "textile substrates"), by the user, with the economies associated with mass production.

It is another object of the present invention to provide an on-line, Internet-based service that enables users, whether they are skilled designers or those unskilled in the design arts, to customize or personalize the design of such textile substrates with designs, patterns or target images of their choice, and further that enables users to view the results of their design choices, in colors that accurately represent production colors, prior to generating a sample or a production order.

According to at least one embodiment of the invention, there is provided an Internet- or world-wide-web-based system and method for enabling mass customization of decorative textile substrates on an automated patterning apparatus. The automated patterning apparatus comprises a plurality of individual colorant substances that are directed through a set of colorant applicators in accordance with predetermined pattern data, the colorant substances capable of being selectively applied to specific individual pixels on the substrate in pixel-wise fashion (i.e., having colorants applied to the substrate on a pixel-by-pixel basis) in accordance with the predetermined pattern data. In a preferred embodiment, the system and method utilizes a browser device to provide an interface for enabling remote access to one or more image manipulation design tools that enables user customization, over a public communications network, of a digitized image to form a desired target design. A digitized image of the user's choice is imported into the image manipulation design tool and that image is manipulated according the user's artistic vision, allowing for changes to colors, textures, backgrounds, and decorative surrounds (e.g., mattings, borders, frames, etc.), all of which may be electronically displayed as it would appear on a selected substrate. A dithering algorithm may be used for generating a dithered image from the digitized image, as manipulated and artistically augmented by the user, using a dithering palette of colors.

The dithered image, as displayed for user approval, represents the image as it will appear when created on the selected substrate using the process colors available to the patterning device. It is the image that is capable of being generated on the textile substrate using the selective, pixel-by-pixel application of the available process colorants and the available process colorant blending techniques.

Finally, upon approval of this "target" design by the user, an order is generated and electronically communicated to the automated patterning apparatus for initiating transformation of the digitized, dithered target image into a corresponding dyed pattern on the selected textile substrate. Using techniques appropriate for the specific automated patterning apparatus to be used, the pattern data corresponding to the desired target design is then reduced to a series of patterning instructions to be sent to one or more arrays of liquid colorant applicators that selectively deposit the appropriate quantities of liquid colorants in appropriate locations on the selected substrate to reproduce the dithered image on the substrate.

Advantageously, according to another aspect of the present invention, there is provided a mechanism for generating an SKU to-provide for necessary order tracking, costing, billing, etc. that can accommodate the generation of a custom, one-of-a-kind product. The creation of a customized SKU corresponding to a customized product is automated and requires little or no human intervention, which greatly reduces cost.

For purposes herein, the following terms shall have the indicated meanings, unless the context otherwise dictates. "Subject image" shall refer to the initial image which will form the subject of the final desired design, i.e., it is the photograph, painting, design, or other artistic work that is to be recreated on the substrate, perhaps following some customization, as the primary subject or artistic work of primary interest. As contemplated herein, the subject image may originate from a variety of sources, e.g., an on-line data base containing artwork, a scanner used to transform a photograph, drawing or other artwork into a digitized image, the output from a digital camera, or any other source of digitized images having an appropriate output format, and may consist of a single (perhaps composite) image or a series of images, perhaps arranged in the form of a collage. "Presentation enhancements" shall refer to various frames, borders, mats, as well as backdrops and backgrounds, in various widths, combinations, sequences, etc., used to set off, isolate, or provide an aesthetically pleasing environment for the display of the subject image. As a subset of presentation enhancements, the term "decorative surround" shall be used as a collective term specifically to describe one or more borders, mats, frames, and other presentation enhancements that surround the subject image, in any desired number or sequence. For purposes herein, the terms "frame," "border" and "mat" may be used interchangeably, and should be distinguished from the term "backdrop" or background, which shall refer to the field—which may itself be textured or patterned—on which the subject image is placed. It is contemplated that a backdrop on background may, if allowed to extend beyond the edges of the subject image, form a border or mat. It should be understood that a mat, border, or frame need not necessarily be comprised of a solid color, but rather may incorporate a texture, artistic motif, faux effect, etc., perhaps supplied by the user.

"Texture" shall refer to localized patterning within various colored areas for the purpose of imparting visual interest to a specific area or for conveying the sense of a three-dimensional surface. "Geometric alterations" shall refer collectively to cropping (including selective enlargement of a portion of the image), re-proportioning (i.e., modifying the aspect ratio, modifying the relative proportions of features within the image itself, or both), or otherwise adjusting the geometry or scope of the subject image. "Artistic enhancements" shall refer collectively to presentation enhancements, modifications of texture, geometric alterations, and various adjustments in color, texture, and design motifs, in any combination, i.e., it is a collective term intended to encompass nearly all of the customizable aspects of a design that incorporated a given subject image, and is intended to include (but is not limited to) alterations made to the color or texture of the subject image. Unless otherwise indicated, presentation enhancements or artistic enhancements do not necessarily include the addition of text.

The combination of the subject image and any artistic enhancements shall be referred to as the target image or target design, and shall represent the overall desired design to be reproduced on the substrate, reflecting the design choices made by the user or designer up to that point in the design process. In a preferred embodiment, the target image or design will be a digitally-defined and dithered image or design. Unless otherwise indicated by comment or context, the terms "image" and "design" shall be used interchangeably, as shall the terms "Internet" or "Internet" and "web." The term "custom design" is intended to be a broad term referring to the target design or any customized aspects of that design, at any intermediate or final stage of the design process. The term "image processing" shall refer to controlled adjustments to the color balance, image brightness, image contrast, and any other parameters (e.g., color convergence, etc.) relating to the display of an image on a monitoring device. The term "pattern data" shall refer to the electronically-encoded embodiment of the custom design; as one of the last steps in the processes of interest herein, pattern data are transformed into actuation instructions for the various colorant applicators associated with the patterning device of choice, as will be described for an exemplary process below.

BRIEF DESCRIPTION OF THE DRAWINGS

Details of the invention disclosed herein shall be described below, with the aid of the Figures listed below, in which:

FIG. 1 is a diagram illustrating an Internet- or web-based communications environment providing for user customization of orders for manufacturing decorative textile substrates according to one embodiment of the invention;

FIG. 2(a) is an overview of the initial flow of decisions made by the user regarding the degree of customization desired and the level of assistance available.

FIG. 2(e) is an overview of representative process steps associated with the Backdrop Option of FIG. 2(d) at step 121a.

FIG. 3 is intended to be conceptually illustrative of an Internet-based display 200 that enables users to import a pre-defined or user-generated subject image into a selected Internet-based image manipulation tool for customization.

FIG. 4 is intended to be conceptually illustrative of an Internet-based display 225 that enables user selection of the works of a famous artist that may be selected as a subject image for import into a selected Internet-based image manipulation tool.

FIG. 5 is intended to be conceptually illustrative of an Internet-based display 230 providing thumbnailed image views of the various paintings or works of art by the artist selected from FIG. 4, and enables user selection of a particular work of art as a subject image for import into the selected Internet-based image manipulation tool.

FIG. 6 is intended to be conceptually illustrative of an Internet-based display 240 that enables users to access and upload a subject image of the user's choice directly into a predefined area 243 of the selected image manipulation tool display interface 245.

FIG. 7 is intended to be conceptually illustrative of an Internet-based display 250 providing an image manipulation tool interface and showing, as an example, a user-selected archived image 99 (Van Gogh's "Starry Night") imported thereto.

FIG. 8 is intended to be conceptually illustrative of an Internet-based display 250 showing the selected archived subject image 99' as cropped with an aspect ratio tool and re-sized to the desired proportions.

FIGS. 9(a) and 9(b), respectively, are intended to be conceptually illustrative of Internet-based displays providing an interface 283 for enabling the indexing of the colors present in the digitized subject image 99' (FIG. 9(a)) and the generating of a dithered version of that subject image according to a conventional dithering algorithm (FIG. 9(b)).

FIG. 10(a) is intended to be conceptually illustrative of an Internet-based display 290 depicting acquisition of image textures 293 for creating a decorative backdrop that ultimately may serve as the matting for the selected artwork.

FIG. 10(b) is intended to be conceptually illustrative of an Internet-based display 290 depicting acquisition of a stone texture 298 for use as a backdrop.

FIG. 11 is intended to be conceptually illustrative of an Internet-based display 300 depicting a menu of user-selectable pre-defined matting texture choices 302.

FIG. 12 is intended to be conceptually illustrative of an Internet-based display 305 as it might appear with the application of color to the stone texture image depicted in FIG. 10(b).

FIG. 13 is intended to be conceptually illustrative of an Internet-based display 310 illustrating the positioning of the dithered target image 309 of FIG. 9(b), on the colored stone texture image of FIG. 12, thereby creating a decorative matting 311.

FIG. 14 illustrates a conceptually exemplary Internet-based display 325 depicting a menu of user selectable pre-defined frame styles and patterns (indicated generally at 320) for use as part of a decorative surround (together with matting 311).

FIG. 15 is intended to be conceptually illustrative of an Internet-based display 320 illustrating the final assembly of a completed target image including matting 311 and finishing frame 313.

FIG. 16 depicts the completed target image, complete with frame and matting, as it might appear at the conclusion of the design process (as depicted on a sample or a computer monitor or design station display), or as the finished patterned article might appear following the generation of patterning instructions and the completion of the manufacturing process.

FIG. 17 schematically depicts one example of a computer-controlled dye injection patterning device that is suitable for patterning textile substrates in accordance with the teachings herein.

FIG. 18 is a schematic side elevation view of the apparatus of FIG. 17 showing only a single dye jet array or color bar 436 and its operative connection to a liquid colorant supply system as well as to several electronic subsystems associated with the apparatus.

FIG. 19 is a block diagram disclosing, in overview, an electronic control system for the computer-controlled dye injection patterning device.

FIG. 20 schematically depicts the format of the pattern data at the data processing stages indicated in FIG. 19.

FIG. 21 is a block diagram illustrating an exemplary multiprocessor and pattern control system environment in which the present invention may operate.

FIG. 22 is a flow chart relating to one prior art method by which look-up tables may be generated for using the patterns developed herein to direct a patterning device.

FIG. 23 is a continuation of the flow chart of FIG. 22.

FIGS. 24A–24D illustrate a firing time table, process color table, pattern color table and look-up tables, respectively, for a method by which the patterns developed herein may be implemented by the patterning device disclosed in detail herein.

FIGS. 25A–25F illustrate further examples of prior art look-up tables that may be used in connection with the patterns developed according to the teachings herein.

FIG. 26 is a block diagram disclosing, in overview, an electronic control system known in the art that may be used in connection with the patterning device disclosed in detail herein.

FIGS. 27A and 27B are diagrammatic representations of the prior art "stagger" memory disclosed in FIG. 26. FIG. 27A depicts a memory state at a time T1; FIG. 27B depicts a memory state at time T2, exactly one hundred pattern lines later.

FIG. 28 is a block diagram describing the prior art "gatling" memory described in FIG. 26.

FIG. 29 schematically depicts the format of the pattern data at various data processing stages as indicated in FIGS. 26 through 28.

FIG. 30 is a diagram showing an optional prior art "jet tuning" function which may be associated with each array, as described herein.

DETAILED DESCRIPTION OF THE PREFERRED EMBODIMENTS

Figure 2A:
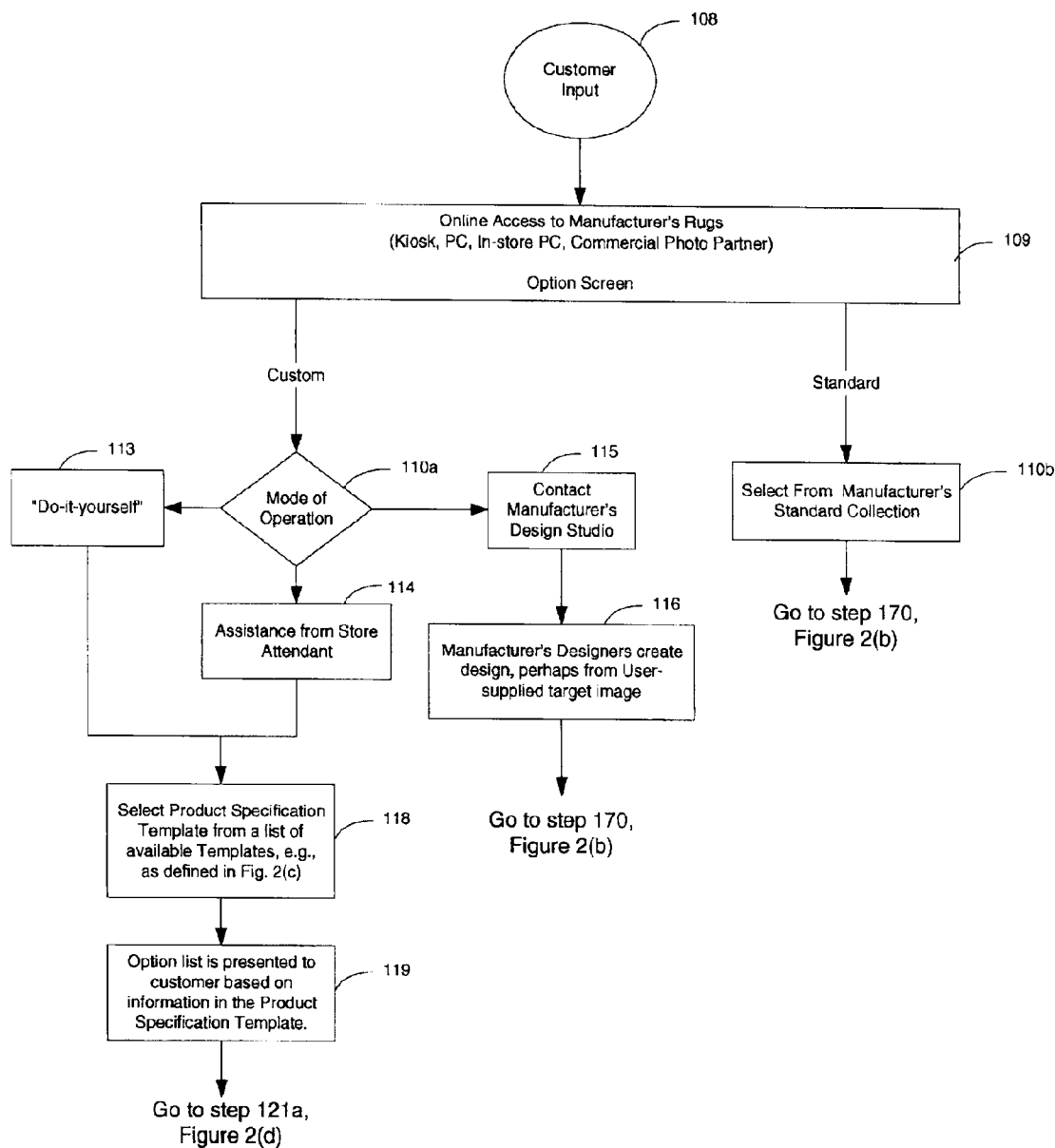
FIG. 2(a) is the first of several flow diagrams depicting the steps for enabling user customization of orders for manufacturing decorative textile substrates, including the generation of a unique SKU for product tracking purposes, according to the invention. Specifically.

In accordance with an exemplary embodiment, the present invention may be implemented as a service, implemented either through an Internet connection or through some other suitable data link, that enables on-line user customization of orders for manufacturing decorative textile substrates, including, but not limited to: carpets, area rugs, broadloom, carpet tile, mats, rubber-backed rugs, vulcanized (washable, non-slip, anti-fatigue) accent rugs, and other forms of soft and hard surface floor coverings, as well as wall hangings, upholstery fabrics, or the like, (collectively referred to as "textile substrates") in a variety of textures, including, but not limited to: woven, bonded, non-woven, cut-pile tufted, loop pile tufted, cut and loop pile tufted, sisal-like tufted, and the like, and including hand-made and printable substrates. The term "fibrous pile substrates" is understood to define all such textile substrates having a pile surface comprised of textile yarns or fibers. The "instant rugs" concept, as referred to herein, provides the ability to start with a subject image, provide for significant artistic augmentation of that image, and pattern a textile substrate with that image in a matter of minutes or hours, rather than days. For purposes of discussion, it will be assumed that the data links suggested by the following disclosure are Internet-based. It should be understood that other suitable data links, not necessarily associated with the Internet may also be used, e.g., dedicated or hard-wired links, as appropriate.

Implementing conventional techniques, the Internet-based service enables both customers unskilled in the design arts and designers alike (hereinafter collectively and interchangeably referred to as "customers" or "user(s)," except where comment or context indicates to the contrary) to load digital images in the format of their choice, for example: *.bmp (bitmap), *gif, *.tiff, *.jpg, *.pcx, and the like, from any source, into a design/image editing tool. That editing tool provides a number of formatting and processing options that enables the user to customize the image and generate a target image to be transferred or printed onto any appropriate textile substrate or fibrous pile substrate at a remote manufacturing facility.

As part of the customization process and prior to generating an order, the target image optionally is generated in dithered form and displayed in a manner that allows the user to view the image in the color scheme that the manufacturing facility is capable of rendering onto the substrates. In this manner, the user is provided the opportunity to view the target image in the actual colors (to the extent permitted by individual variations in monitor color response, monitor calibration history, etc.) that will be transferred to the substrate. In one embodiment, the user may print out the displayed image to form a sample. The Internet-based service additionally enables the rapid generation of an order file, in the form of a Target SKU, comprising the target image and customer identification and tracking information, so that the product may be rapidly manufactured and all necessary administrative functions (planning, order tracking, billing, shipping, etc.) may be efficiently executed.

FIG. 1 is a diagram illustrating an Internet/Web-based system 10 established for enabling on-line user customization of orders for manufacturing decorative textile and fibrous pile substrates, according to one embodiment of the invention. As shown in FIG. 1, the invention comprises a computer system that implements web site 21 providing the on-line decorative rug customization and manufacture service over the public Internet 15. That computer system includes one or more Internet/database servers 20 comprising various application and database software components as will be described in greater detail herein. Visitors to the web site 21 depicted in FIG. 1 are provided access remotely via wired connection 13 such as a telephone line or digital cable to the Internet/Web 15 conveniently from their home personal computers (PCs) 12a, 12b, . . . , 12n, through use of implementing web browser functionality, which may be provided through, for example, Netscape® (published by Netscape Communications Corporation, Mountain View, Calif.) or Internet Explorer® (published by the Microsoft Corporation, Redmond, Wash.). Additionally, however, web site access may be facilitated through web browser devices provided at facilities including, but not limited to: stand-alone kiosks 43 located at shopping malls, airports, museums, venues such concert halls or sports stadiums, etc., in-store or retail outlets implementing workstation or PC devices 44, or via facilities established with commercial partners such as remote photographic print shops provided by major suppliers of photographic film, for example (not shown). It is understood that communications between the web site 21 and the public may be via the public Internet in accordance with standard TCP/IP protocols and optionally, over a secure communications link, e.g., secure socket layer ("SSL"), or similar protocol. It is further understood that customers may access the Internet via wired (e.g. telephone lines) or wireless connections, including satellite links, as depicted in link 14, using a computer or a personal digital assistant or like device having display and web browser functionality.

As further depicted in FIG. 1, the web site server 20 employs hardware, software and other database storage components 25 including, but not limited to: 1) domain controllers including: an Operating System (OS) component 22, e.g., such as Microsoft Windows®, to be utilized in all computers in the production network to provide a basic software platform upon which all other software mechanisms operate, as well as a database 19 of user accounts, customer identifications, and order numbers for tracking and billing purposes; and, 2) application server components including: Internet Information Services (IIS) 24, a mechanism enabling files on a computer to be read by remote computers, and which particularly may be used to house, secure and present a web site to either the Internet or an intranet (private network); Component Services 26, which functions as a repository of custom Dynamic Link Libraries (DLL's) that allow custom applications to perform actions in data sources foreign to the application, e.g., enabling a web page to query data on a database, or create a new user account, etc., and Communication Services 28 which includes a server application that enables various electronic communications such as e-mail or other robust messaging infrastructure. Additionally provided is database server and storage component 39, configured for retrieving and storing archived digital image files and associated product manufacturing instructions, as well as temporary files for storing information such as a user-specified target image and associated customization information.

Further provided is image manipulation or design software 35 for enabling user customization of the images themselves, in the manner as will be described in greater detail herein. This may be provided through Internet-accessible software functionality similar to that found in existing commercially available software such as, for example, Adobe Photoshop®, published by Adobe Systems Incorporated, San Jose, Calif., Corel Draw®, published by Corel Corporation and Corel Corporation Limited of Ottawa, Ontario, Canada, or Fractal Painter 5.5®, published by Viewpoint Corp. of New York, N.Y. It is contemplated that a screen display in the form of a simplified user interface (not shown) may be presented, to provide the user who has little or no training in the use of such software with functional access to such conventional software tools. Alternatively, such image manipulation maybe achieved through the software described herein (with the understanding that, in some applications, it may be advantageous or desirable to employ portions of both kinds of software in order to achieve the desired level of flexibility, operating convenience, etc. that is appropriate for the intended user base and level of designer intervention). In general, such software enables user customizing and formatting of scanned and/or loaded images and the selecting of colors, in addition to other functions, as will be described.

Broadly speaking, the preferred software functionality is comprised of (1) computer-assisted design capability, with which images may be imported and manipulated in various ways, (2) computer-assisted generation of patterning instructions, which would include the ability to render the desired image in the colors available to the patterning device (i.e., the colors of the image following dithering using only process colors and process color combinations) and to generate "on/off" actuation commands necessary for the selected patterning device to reproduce those colors when and where required on the substrate, and (3) computer assisted identification and tracking (perhaps to include shipping, etc.) of each individual patterned substrate, acting in an appropriately coordinated manner. Software of the first kind is readily available in off-the-shelf form, or can be generated in custom form in a straightforward manner in accordance with the teachings herein. Software of the second kind also may be generated in custom form in a straightforward manner, using the teachings herein in combination with (a) off-the-shelf dithering algorithms to adapt the design to the colors available to the patterning device and (b) look-up tables to specify the particular colorant quantities and combinations necessary to reproduce a given "dither palette" color on the selected substrate. Software of the third kind may be readily generated by one of ordinary skill in the art in light of the teachings herein, including the generation of a Target SKU, as described hereinbelow. It is contemplated that, to the extent a portion of the process described herein does not require user interaction, a preferred approach would be to automate (via software), to the extent practical, all such non-interactive process steps.

The web site 21 is further shown provided with a dedicated or telephone-based communication link 51 for communication with a manufacturing facility 200 having, for example, a textile patterning system and dye injection system 201 for applying images to a textile substrate such as a carpet or rug, or with a secure communication link 52 that enables communication with the manufacturing facility 200 via the Internet 15. It should be understood that, in preferred embodiment, the customized orders generated by users via the web site are electronically communicated to the manufacturing facility via links 51, 52, where the orders are processed by the dye patterning apparatus 201 and the associated production tracking, accounting, and shipping software in an expedited fashion, although, as will be discussed in greater detail below, it is contemplated that the physical transfer (e.g., via mail or courier service) of a computer readable data structure on appropriate media could be used to provide additional flexibility in providing such manufacturing capacity.

Figure 2B:
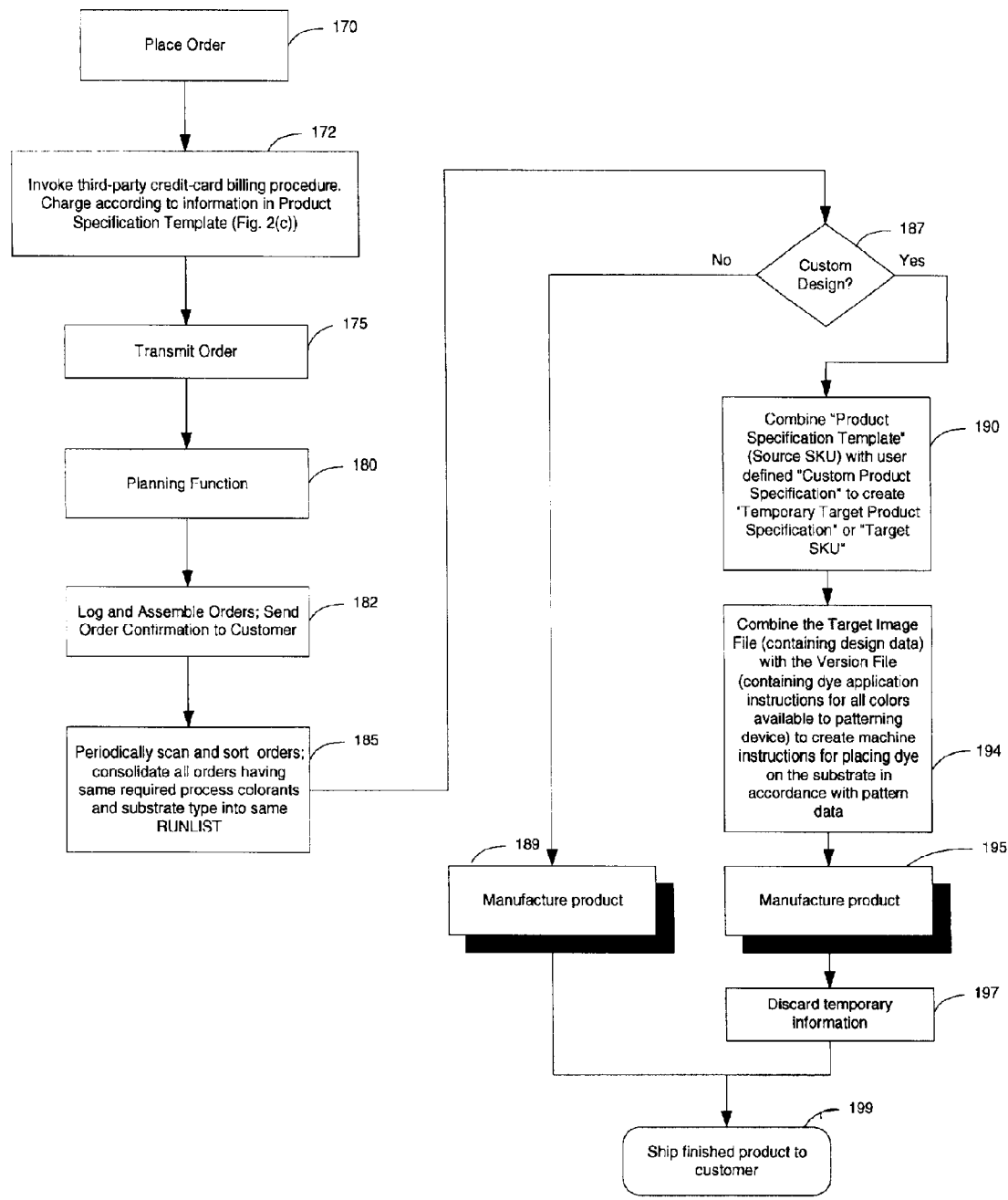
FIG. 2(b) is an overview of the steps to be taken, following customer approval of a finalized design, to place an order, generate a unique SKU, and manufacture and ship the product.
Figure 2C:
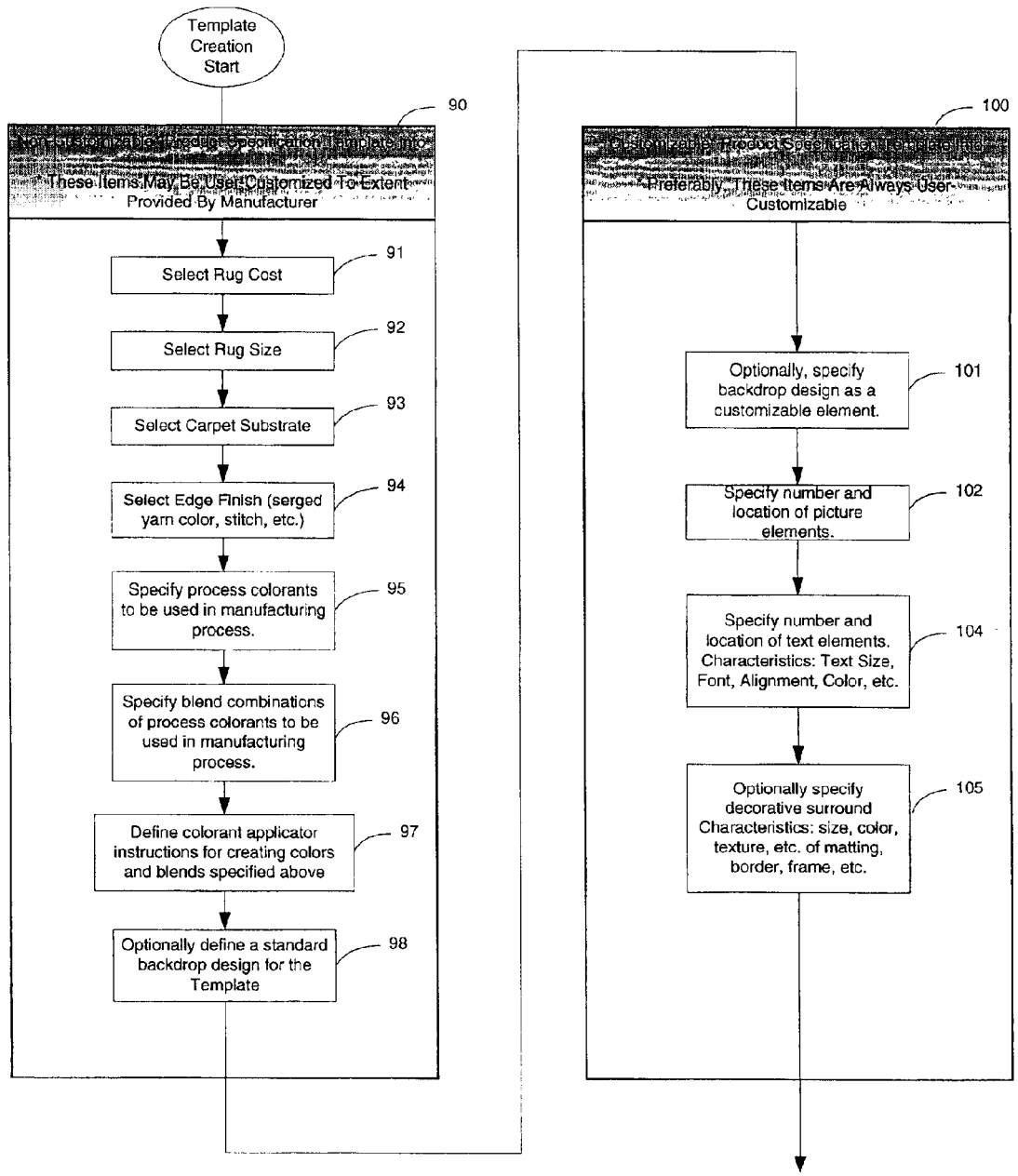
FIG. 2(c) is an overview of the process for creating a Product Specification Template, delineating "customizable" and "non-customizable" information that collectively comprises a Product Specification Template.

The system 10 depicted in FIG. 1 includes the process shown in FIG. 2(c) and described in detail with respect to FIGS. 2(d)–2(h), through which the user-customized pattern for the selected textile substrate may be generated. For purposes of explanation, the invention will be described in the context of user customization of a rug patterned with a subject image, e.g. a digitized image of a photograph. It should be understood, however, that the custom patterning of other textile substrates in accordance with the teachings of this invention would be performed in a similar manner, perhaps with modifications as would be apparent to one of ordinary skill.

In describing the principles behind the user customization of orders for manufacturing such decorative textile substrates, several terms shall de defined. A "Product Specification Template" shall be defined as an information set that accumulates and defines all the various parameters that must be specified prior to manufacturing in order to define the rug and the pattern that is to be placed on the rug. It may be thought of as a "master list" from which (a) certain items may be pre-specified by the manufacturer (example: the fiber composition and weight of the textile substrate comprising the rug), (b) other certain items may be specified by the customer from a list of pre-defined options (example: the dimensions of the rug, or the colors of available serge yarns ), and (c) yet other certain items may be specified freely by the customer, without having to select from a limited list of options (example: the selection of text to be placed within a "text box" area of the pattern, the selection of the subject image forming the focal point of the pattern, or the "ship to" address).

To further clarify the foregoing, a "Product Specification Template" includes two distinct sets of information: non-customizable and customizable, as depicted in FIG. 2(c). Non-customizable information includes those certain characteristics that have been identified by the manufacturer as being characteristics that normally cannot be changed through customization, while customizable information includes those characteristics that may be customized by the customer through a controlled interactive process. In a preferred embodiment, the set of non-customizable information, although insufficient to allow for manufacture of a rug (in the absence of default values for at least some of the customizable information), is sufficient to generate cost and pricing data, raw materials tracking, product line sales, etc., and therefore this information set can be used in the manner of a conventional SKU.

Accordingly, the term Source SKU shall refer to a Product Specification Template, as that Template exists prior to the entry of customizable information by the customer, or at some intermediate stage of customer customization. The term Target SKU shall refer to a Source SKU (or Product Specification Template) after all customer customization has occurred, and the product is fully specified (i.e., all default values have been applied, except where overridden by customer inputs), as will be discussed in more detail below. Conceptually, one may think of a Product Specification Template as a catalog of all information categories describing the desired rug, as well as all information categories necessary to manufacture and ship that rug. At the beginning of the design process, prior to any user design input, the Product Specification Template is referred to as a Source SKU. Following all design input from the user, all information categories contained in the Product Specification Template contain values that reflect either design choices made by the user or default values supplied by the manufacturer, and the "completed" Product Specification Template is referred to as a Target SKU.

A primary component of the Product Specification Template is a collection of data referred to as the Version File, which is a computer file that specifies the dither palette that will be used in the patterning of that product. It should be noted that the Version File defines not only the process colorants to be applied to the substrate by the patterning device, but also defines the spectrum of colors that can be constructed through the in situ blending of various combinations of these process colorants following their application to the substrate. In a preferred embodiment, these combinations are defined in terms of a look-up table that associates a given color with applicator actuation times for the various component colorants of the desired blended color, thereby providing a "recipe" of dispensing times and/or quantities by which that part of the dither palette comprised of non-process colors can be reliably reproduced on the substrate surface. Typically, most parameters comprising the Version File are non-customizable, except for the option, if provided by the manufacturer, of selecting a different dither palette (which might require the use of a different set of process colors).

Another component of the Product Specification Template is a data file known as the Design File. Initially, the Design File contains, in digitized form, the background or backdrop on which the subject image or pattern will be placed, as it will appear on the substrate. This File is comprised of, for example, an array of points or pixels that collectively define the entire area of the substrate on which design elements such as the subject image may be superimposed. At the end of the design process, little, if any, of this background or backdrop may be visible, having been "covered" by user-selected design elements. The content of the Design File changes with each design choice made by the user; the Design File contents at the end of the design process define, on a pixel-by-pixel basis, the target image in dithered form (including any decorative surrounds or other artistic enhancements) to be placed on the substrate. Each pixel is assigned a numerical value that corresponds to one of the colors defined in the Source Version File (i.e., one of the colors of the dither palette).

In addition, the Product Specification Template may contain various manufacturing instructions, which may or may not be user-customizable, depending upon the nature of the specific data and the degree of customization provided by the manufacturer, including, but not necessarily limited to, (a) instructions defining the nature and characteristics of the textile substrate that is to be used for this item, e.g., when ordering a rug that is to go on a wall as a wall hanging, rather than on the floor as a floor covering, a customer may be able to choose a different substrate or "base," (b) instructions specifying the manufacturing processes to take place after dyeing, such as shearing, edge treatments, and the application of various chemical treatments such as anti-static treatments, stain resistant treatments, etc., and c) any other miscellaneous information or instructions necessary for the manufacture and shipping of the desired product, including shipping address and carrier information, etc. (such shipping information would comprise customizable data in most situations).

A "Custom Product Specification" shall be defined as a subset of the Product Specification Template that contains those parameters or categories of information comprising the customizable portion of the Product Specification Template. Typically, the Custom Product Specification includes manufacturer instruction sets (a), (b) and (c) above, as well as various artistic or design choices, such as color, text, choice and position of design elements, decorative surrounds (e.g., frames or borders), etc. as found in the Design File. The values for the parameters comprising the Custom Product Specification are determined through, for example, on-line customer input or, alternatively, through the selective application of one or more default values that may be used in the absence of specific customer input. A "Target Product Specification" is simply a Product Specification Template at the end of the user customization process, i.e., a Product Specification Template having a fully completed Custom Product Specification, in which all customizable parameters, as well as all non-customizable parameters, have been specified (either with user-supplied values or with manufacturer-defined default values). Accordingly, the Target Product Specification can serve as a temporary, surrogate SKU for this specifically patterned rug during the manufacturing process and, accordingly, the Target Product Specification can be used, and shall be referred to, as the Target SKU.

FIG. 2(c) illustrates the process for creating a Product Specification Template, which is comprised of two types of characteristics: (1) characteristics 90 that are non-customizable, or are customizable to a limited extent and (2) characteristics 100 that are fully customizable by the user. A plurality of such Templates, perhaps corresponding to the type product desired (e.g., small rug, large rug, wall hanging, etc.) may generally be specified ahead of time by a designer and made available as selectable options for the customer when customizing an order via an on-line system. As shown in FIG. 2(c), the non-customizable (or partially-customizable) characteristics 90 for a generated rug product might include, for example, a selection by the user (from among a menu of alternatives) 91 concerning the cost of the rug product to be manufactured and a selection 92 (from among a menu of alternatives) for the rug size capable of being manufactured. Preferred area rug sizes may include, for example, the following: 3'×4', 4'×6', 6'×9' and 9'×12', or may be any other dimension or shape, depending upon the substrate, the desired end use, and the degree of flexibility offered to the user by the manufacturer. For example, carpet tiles of 12"×12" or 36"×36" may be patterned, as well as "runners" of any appropriate size (e.g., 3'×10', etc.). Additional characteristics 90 might include a selection (from among a menu of alternatives) 93 for the type of carpet substrate i.e., construction and fiber content (choice of a different substrate—a user option—likely would result in the assignment of a different Product Specification Template and a different SKU), a selection 94 (from among a menu of alternatives) for the type of edge finish (serge yarn color, stitch style, etc.), as well as perhaps a selection 95 (from among a menu of alternatives) of the process colors to be used in the manufacturing process and, optionally, a selection 98 defining a backdrop design for the template. The specification 96 for the blend combinations of process colors to be used in manufacturing and the specification 97 defining the actuation time instructions for creating the colors associated with those specified in steps 95, 96 preferably would be generated by the manufacturer.

As further shown in FIG. 2(c), fully customizable characteristics 100 for the Product Specification Template may include: an optional specification 101 defining a backdrop design as a customizable element, an optional specification 102 defining the number and location of picture elements, i.e., where, within the rug product, the digitized images are to be rendered (regardless of whether the picture/image is user-defined or selected from a library archive of pictures), an optional specification 104 defining the number and location of textual elements to be rendered on the rug product including text characteristics such as text size, font, alignment, color, etc., and an optional specification 105 defining the decorative surround to be used, including characteristics such as the number, sequence, and size of mats, borders or frames, the color and texture of each, etc. Each of these processes will be discussed in further detail below.

In order to provide maximum flexibility in the selection of patterning devices that may be used with the product design and manufacturing process described herein (and, additionally, provide the user with an archive electronic copy of his or her artistic creation), it is contemplated that the customized orders, generated using the various design tools described herein, could be merely stored in a computer-readable data structure on appropriate media (e.g., a CD-ROM, a magnetic diskette, a scanable or otherwise readable paper form, etc.), providing the alternative of physically (rather than electronically) sending the necessary data to a manufacturing facility for processing. This data structure for example, would contain values for the various manufacturer-specified or user-customizable elements of the Product Specification Template, and could also contain other data. At a minimum, the data structure would contain a set of data that specify the selections available to the user (if any) concerning the size and nature of the substrate to be patterned, as well as a set of data that specify the pattern (i.e., the subject image) and any desired presentation enhancements (e.g., the Design File). Optionally, data associated with the specific patterning device to be used (e.g., the Version File) and data associated with product specifications or design elements that are not user-selectable or user-customizable would not need to be included with this media, but instead would be specified as part of the processing done at the manufacturing facility, thereby allowing for the use of a variety of different patterning devices to generate the same target design.

As will be explained, one or more Product Specification Templates are input and stored in the system database 39 (FIG. 1) by the manufacturer, and made available for user selection when the user wishes to customize an order. Specifically, in a preferred embodiment, these template options are displayed for the customer as an option screen via his/her web browser after accessing the appropriate Internet site of the manufacturer, as will be explained in greater detail. It should be understood that, in addition to customized products, the system may allow for the creation and storage of a "standard" collection of products, providing for little, if any, user customization, as depicted, for example, at step 110b in FIG. 2(a).

Turning to FIG. 2(a), there is illustrated an overview of the initial customer interaction with the system 10 (FIG. 1) for customizing a rug order according to the principles of the invention. As shown in FIG. 2(a), there is depicted steps 108, 109 whereby user access is provided to the Internet-based service that enables on-line user customization of orders for manufacturing decorative textile substrates through a series of option menus and screen displays. The option screens may be made available to the customer in any number of methods, including, but not limited to, on-line access from the user's PC at home (i.e., a residence) via the Internet or, as mentioned, via a terminal located at a remote location. Such location could be any commercial or retail shopping environment such as a shopping mall, an airport, a concert hall, a sports stadium, a golf course, or similar location, including specialty shops such as museum shops or art galleries (perhaps featuring museum pieces or art being exhibited at that location as candidate subject images), bookstores (perhaps, at college bookstores, featuring school emblems including, for example, logos and mascots as candidate subject images), pet stores (perhaps featuring various pet species or the opportunity to input a photograph of a specific pet), stores specializing in sports wear or other articles bearing sports designs (including, for example, sports team logos or emblems as candidate subject images), stores specializing in collectibles, memorabilia, etc., so long as the location has access to a workstation or PC device equipped with a web browser or some other means to access the necessary product design and product ordering tools.

Accordingly, it is foreseen that an appropriate terminal can be located at a location in which the sale of floor coverings (e.g., carpets or rugs) or interior furnishings (e.g., wall hangings) is a primary business (i.e., where most store revenue is derived, directly or indirectly, from the sale of such items), or at locations where most store revenue is derived from other sources. Other foreseen locations for providing this capability include stand-alone or satellite locations such as a kiosk located in a shopping area, or facilities established with commercial partners such as remote photographic print shops provided by major suppliers of photographic film (for the purpose of encouraging use of such film).

It is also foreseen that candidate subject images that could be made available as a pre-generated or archived image (which nevertheless could be made available for customization by the manufacturer) could include non-copyrighted or appropriately licensed images of subjects such as famous works of art or architecture, pet species, heraldry (including genealogy matters, and including family crests, family trees, or the like) various landscapes (including cityscapes, seascapes, or the like) or other nature or outdoor scenes (wild or domestic animals, flowering plants, trees, golf course locations, or the like), modes of transportation (including automobiles or race cars, trains, airplanes or gliders, ships or sailboats, or the like), famous personalities (including athletes, entertainers, actors, musical artists, and characters from games, motion pictures, or literary works), various holiday or festive motifs, collectible or hobby-related articles, maps, and the like.

Upon access to the Internet site, the user is presented with an Internet-based communication, including a display providing a menu of user options including, at step 109, the option of selecting a customized product at step 110a or a product from the available "Standard Collection," as indicated at step 110b. As will be described in further detail herein, user selection of the standard option 110b enables navigation to a standard e-commerce catalogue (not shown) that includes a standard collection of carpets, included standard patterns, designs, sizes and color schemes, through which the user may browse and select without any further interaction, as users are now currently able to do using prior art techniques. Thus, for instance, upon selection of the standard or archived collection as indicated at step 110b in FIG. 2(a), the user may be presented with a web page that enables users to access and select an image already provided in the "standard," or "archived" image collection, e.g., famous works of art, preferably already assembled by the manufacturer for this purpose. Following such selection by the customer, the process moves to the order placement phase, as depicted at 170 in FIG. 2(b).

User selection of the customized option 110a enables the user to initiate a custom order requiring user interaction in accordance with one of three options as to modes of operation: an interactive "Do It Yourself" first option 113 provides for customization of the rug order without any assistance, e.g., as when accessing the system from a home web browser, for example. Alternatively, a second option 114 may be used if the user is located on site at a retail store and can receive customization and ordering assistance from a store attendant or sales person. For options 113 and 114, the user will respectively load or import (from any of several sources, such as manufacturer-supplied on-line files, from a user-supplied photograph or drawing, etc.) and customize an image of his/her choice for the rug to be manufactured, or may solicit the services of a store attendant for assistance in loading or selecting a desired image (again, from any of several sources) and in customizing the image.

As indicated, a third option 115 allows the user to contact a professional design studio directly and engage a professional designer to design and initiate manufacture of the carpet at step 116, without further user interaction. In this latter option 115, the user may, for example, communicate a target image to the design studio, as indicated at step 116, and have no further creative involvement. At that point, the design resulting from the process of steps 115 and 116 preferably is treated as a "Standard Collection" item for order placement purposes, and the process moves to step 170 of FIG. 2(b).

Upon user selection of the full interactive option at step 113 or customer-assisted option at step 114, the user (i.e., the customer or assistant) is presented with an Internet-based display at step 118, prompting the user to make choices concerning rug size, shape, price, and other parameters that will serve to identify the appropriate template from among the plurality of available Product Specification Templates established by the manufacturer. It is understood that the Product Specification Templates could contain data representing a variety of parameters or characteristics including, but not limited to, a simple picture with a decorative surround (perhaps comprising a matting, border, and/or frame, in some combination) or a simple picture with a decorative surround and with a text field that would allow labeling of the picture. For example, the picture could be that of a pet and the text could contain the name of the pet; or, in place of the picture, one could select a manufacturer-supplied backdrop image with various text fields placed strategically against the backdrop. For example, the backdrop could contain a "wedding motif" comprising wedding bells, etc., and the text fields could include the family name, marriage date, husband and wife names, location, etc. Once a template is chosen, the user-customizable options defined by the manufacturer that are available for the selected template are presented to the user or sales assistant as indicated at step 119, and described herein with reference to FIG. 2(d).

Figure 2D:
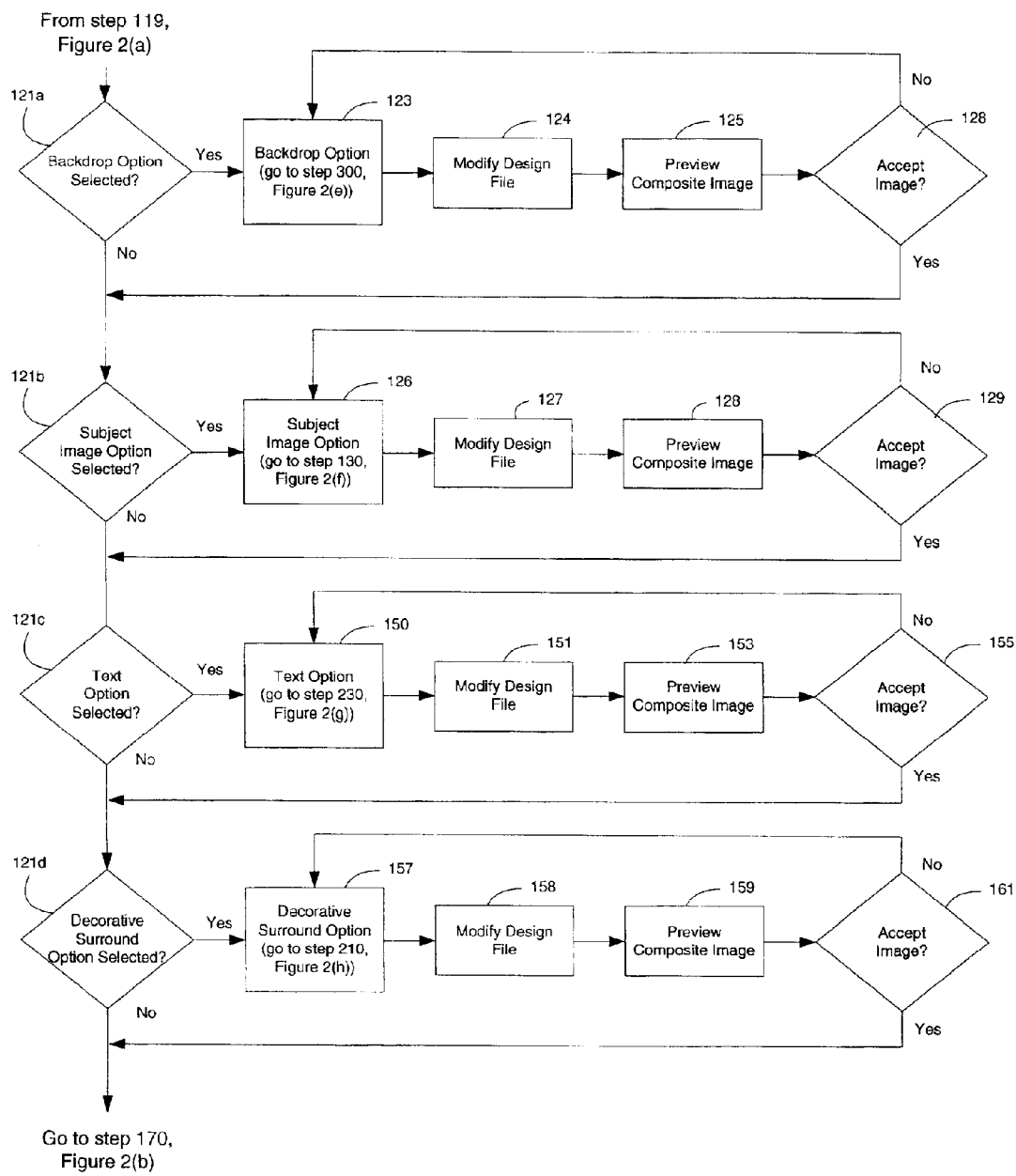
FIG. 2(d) is an overview of the continuation of the process described at step 119 of FIG. 2(a), describing various process options available to the user for customizing various aspects of the design via artistic enhancements to the subject image.

FIG. 2(d) is a flow chart depicting, conceptually, the process options 121a–121d available for a selected template. As shown in FIG. 2(d), the process options 121a–121d available to users may include, but need not be limited to, the following: 1) an option 121a for selecting a backdrop on which the desired subject image may be placed, details of which are given in FIG. 2(e); 2) an option 121b for selecting and customizing a subject picture or image (which provides for the input of a user-supplied image such as a photograph, original artwork, etc., details of which are described below, with reference to FIG. 2(f)); 3) an option 121c for selecting and inputting text (details of which are set forth in FIG. 2(g)); and 4) an option 121d for selecting a decorative surround (details of which are set forth in FIG. 2(h)). These customer-interactive options may be specified by the manufacturer to be executed in a pre-defined sequence, or in a manner convenient for the customer. Further, as each option is specified, the computer displays the results of the customer choices made in the form of a corresponding color image of the carpet or rug, preferably displaying all customer choices made up to that point in the process, on the computer screen for customer verification.

Figure 2E:
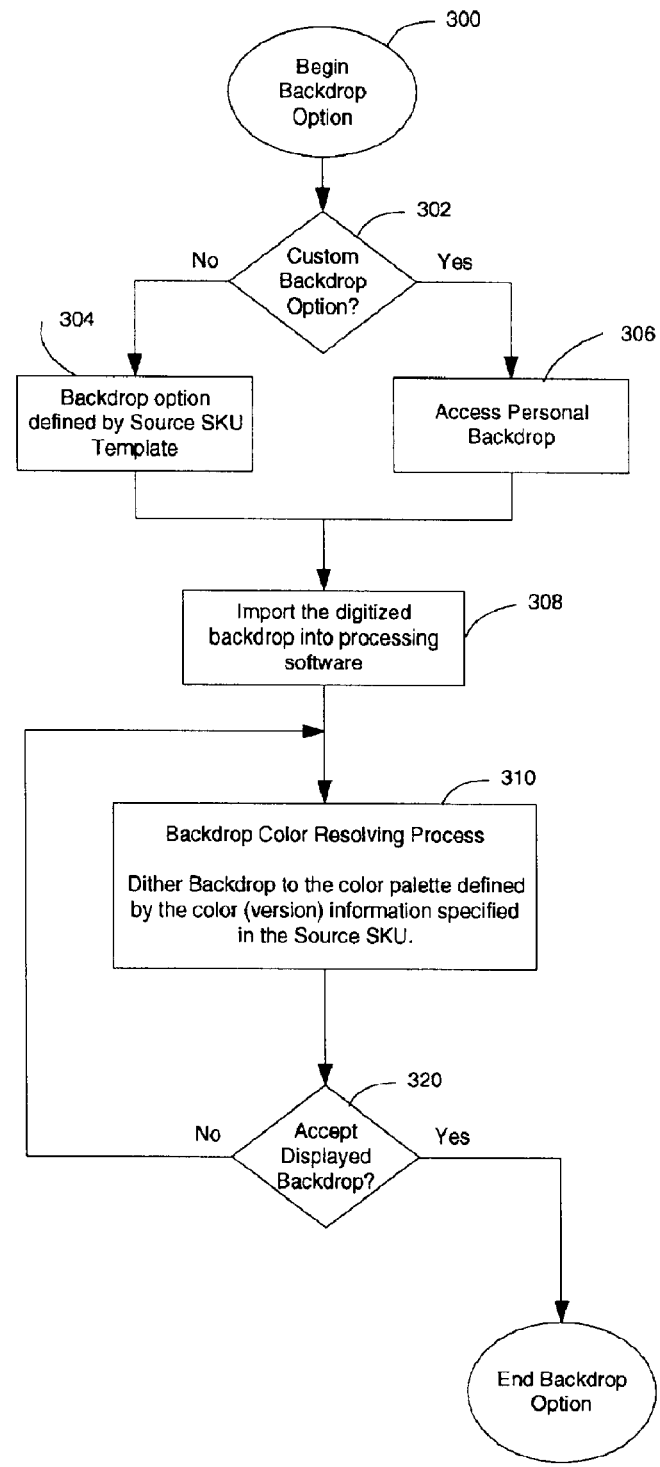

For instance, as shown in FIG. 2(d), upon user selection of option 121a, the user will be presented with a display in connection with step 122 for selecting a particular backdrop to be loaded and customized, as set forth in further detail in FIG. 2(e). Preferably, the user may select from a pre-defined palette of backdrop colors and texture types, and a process is initiated for importing a desired backdrop into the image processing software of choice (e.g., Fractal Painter® 5.5, Adobe PhotoShop®, or a software program of similar functionality) (step 308), dithering the selected backdrop (step 310 of FIG. 2(e)), appropriately modifying the Design File (step 123) to reflect the user-selected design changes (a step that optionally could occur after image acceptance, if desired), and displaying (for acceptance by the user) the resulting image (step 320 of FIG. 2(e)). As indicated at step 124, the user is presented with an additional opportunity to view and accept or reject that design choice, in the form of the image as it appears at this point in the custom design process. Selection of the backdrop happens to be the aspect of the design appearing as the first process option in FIG. 2(d)—the sequence of process options may be modified as desired—and, therefore, step 320 of FIG. 2(e) may be somewhat redundant in light of steps 124 and 125. If the user does not accept the image, the user may return to steps 122 through 124 to select and preview another backdrop selection.

In accordance with the indicated flow of FIG. 2(d), once the backdrop is selected, the process returns to the main menu where the user may select option 121b. Upon selection at step 121b, the system generates an interface display that enables user selection or input of a subject image, e.g., the digitized image/text to be loaded and customized, as set forth in further detail in FIG. 2(f). In a preferred embodiment, the user is presented with a display at step 126 (FIG. 2(d)) for selecting or inputting a particular candidate "subject image", for example, from among a plurality of "thumbnailed" image views, or load an image of his or her choice. After selecting or loading the target image, the Design File may be modified to reflect that choice (step 127), and the user is presented with an opportunity to view that subject image, as seen against the selected backdrop if one was previously selected, as indicated at step 128 (FIG. 2(d)). Preferably, the user is presented with an opportunity to accept the image at step 129 or return to steps 126 through 128 to select and preview another candidate subject image.

It is contemplated that an alternative, and perhaps preferred, optional sequence would place selection of the subject image (step 121b) as the initial option, followed by the backdrop option, etc.

Details for selecting the customizable characteristics 100 (FIG. 2(c)) for a particular subject image are now described with reference to FIG. 2(f), which describes the subject image option flow process comprised of steps 130 through 148. It is to be understood that all of the indicated custom input information for a selected template is stored in the system database (39 in FIG. 1), e.g., as a part of a Custom Product Specification, and is ultimately merged with the non-customizable characteristics to form a Target SKU prior to generating the final product.

Figure 2F:
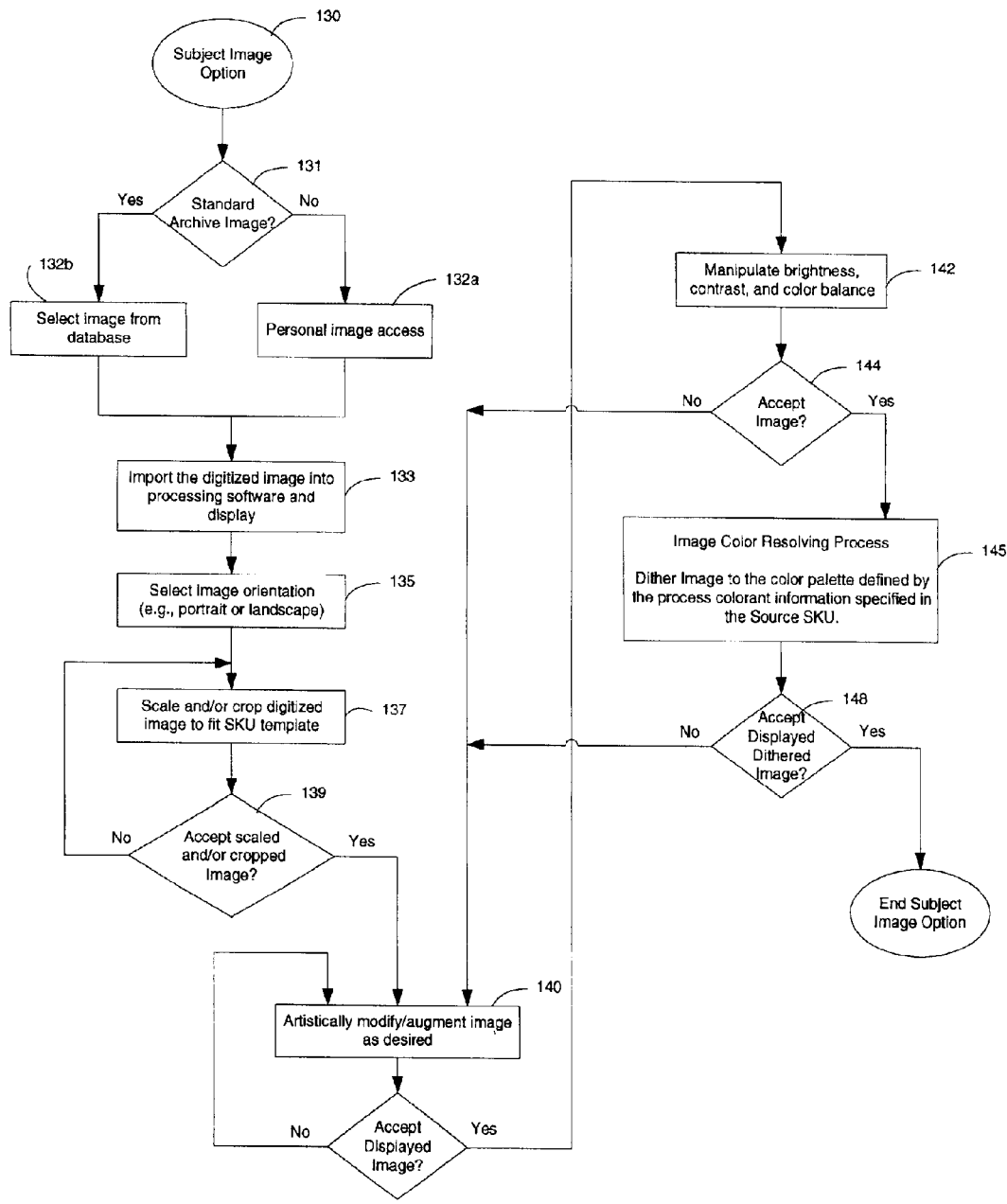
FIG. 2(f) is an overview of representative process steps associated with the Subject Image Option of FIG. 2(d) at step 121b.

As shown in FIG. 2(f), a first step of the subject image option flow process 130 is the presentation of a user option 131 for selecting either a previous non-copyrighted or appropriately licensed "archived" or "standard" image, or enabling the user to load and customize a different digital image of the user's choice. For instance, upon selection of the standard or archived collection, as indicated at step 132b, the user may be presented with a web page that enables users to access and select an image from a digital image file database (e.g., 39 in FIG. 1) or like storage device that stores digital image files already provided in a "standard" or "archived" image collection, e.g., famous works of art.

FIG. 3 illustrates a conceptually exemplary Internet-based display 200, (in which the patterned substrate is a rug), that enables users to access and download an image already stored according to various categories into an Internet-based image manipulation tool of choice, as will be described. Exemplary categories include, but are not limited to, famous artists 201, children's photographs 204, vacation photos 208, favorite pets 212, and, optionally, a personalized rug with user-defined text or logos 215. As an example, upon user selection of the "Famous Artists" category 201, Internet-based displays 225, 230 such as shown in the example displays of FIGS. 4 and 5, respectively, may be presented that provide for user selection of images from a famous artist 227, e.g., Cézanne, Degas, or (not shown) Van Gogh (FIG. 4), and, in response to clicking on a particular artist, the user may navigate to a web page (FIG. 5) providing thumbnailed image views 233 of the various paintings by the selected artist with which a substrate such as a carpet or rug may be decorated. By clicking on the desired painting, the digital image of that painting can be imported into the Internet-based image manipulation software (see FIG. 2(f), at 133). Alternately, the user may select option 219, which provides a web screen with instructions and links to tools that enable the user to be totally creative and literally design a rug pattern from scratch. In this instance, a voice-over or AVI clip may be downloaded to walk the user through the rudiments of designing.

Assuming selection of the standard (e.g., archived) collection as indicated at step 131 in FIG. 2(f), the user may be presented with a web page that provides for loading and customizing a digital image of the user's choice from the standard collection into the Internet-based image manipulation software. FIG. 6 illustrates a conceptually exemplary Internet-based display 240 that enables users to access and download a standard image of the user's choice directly into an image area 243 of the image manipulation tool display interface 245. Optionally, the image area 243 may be predefined to be appropriate for the rug size indicated in the selected Product Specification Template.

Alternatively, if the user does not wish to use a standard image, a process and instructions may be provided enabling the user to acquire an image of his or her choice for import into the software (FIG. 2(f), at 132a) via conceptually exemplary Internet-based display 240 and link 248 (FIG. 6). These instructions may include how to acquire an image from any source which will yield a digitized electronic file that can be readily displayed on a computer display device. It is understood that such sources of digitized images include, but are not limited to: scanned images of prints, pictures or photographs, a digital image file obtained from another web page via the Internet (e.g., an image at a web site specified by the user), the digitized output of a digital camera or other source, the digital output of a video frame grabber, etc. It is also understood that the digitized images may include, but are not limited to: paintings, photographs, video frames, etc., and may be in any type of digital file image format (e.g., bitmap, *.gif, *.tiff, *.jpg, *.pcx) that can be recognized by the appropriate image manipulation software. Such software can be as embodied in the software described in FIGS. 2(d) through 2(h), or, alternatively, as embodied in readily available image manipulation software such as Adobe Photoshop® or Corel Draw® or the like. It should be further understood that the selected or acquired image may be a collage, combination, or composite of two or more separate images that are spliced, overlaid, or otherwise integrated to form a desired image using any conventional means or software.

Referring to FIG. 2(f), after acquiring the image at step 132a or selecting an image at step 132b, the process proceeds to step 133 where the selected or specified target image is imported into the image manipulation software for customization by the user. For purposes of description, FIG. 7 illustrates an example web page display 250 showing an example selected standard image 99 (the example depicted is Van Gogh's "Starry Night") that has been imported into, or otherwise functionally acquired by, the image manipulation software of choice, e.g., the software described in FIG. 2(f), or, alternatively, Adobe Photoshop®, Corel Draw®, etc., that provides image manipulation functions via interface 275.

The process steps 135 to 144 depicted in FIG. 2(f) represent the interactive steps enabling artistic modification of the desired standard or custom image according to the user's preferences. All such modifications are alternatively available through the use of readily-available commercial software well known to computer-based graphics arts designers. Using such software, via interface 275 or an alternative interface, the user or designer optionally may modify the displayed selected image 99 in various ways. For example, the user optionally may orient or rotate the image (step 135), scale and/or crop the image (step 137), and artistically modify and augment the image (step 140). Optionally, the user may also elect to make adjustments to the selected image to enhance color balance, brightness, or contrast (step 142). All of these adjustment or enhancement steps are intended to provide the ability to implement the user's or designer's artistic vision, using the tools available in such software. It should be understood that, before or after the image is imported, the user may be prompted to modify the pixel resolution settings (e.g., 1024% 768, 800% 600, etc.) according to standard recommendations so that the proper screen display images may be generated for the user in subsequent processing steps. Details of some of the steps set forth in FIG. 2(f) shall now be discussed.

As it is unlikely that the pixel size of the imported picture will correspond to the pixel size required by the user-selected "Product Specification Template", the image may need to be scaled and/or cropped. For example, when selecting a 4'% 6' rug size, the software may compute an SKU template having a resulting image proportion, e.g., 1312% 936 pixels, that allows room for a matting and/or frame while allowing for accurate display at the user terminal. That is, for a 4'% 6' area rug of 1312% 936 pixels, an actual image size may comprise1152% 776 pixels, allowing for a 4" margin surrounding the image to accommodate a 1 inch frame and 3 inch matting, for example. Preferably, a fixed aspect ratio tool may be provided when enabling image cropping.

FIG. 8 illustrates an exemplary web page display 250 showing the example selected standard image 99' after it has been cropped with a fixed aspect ratio tool and re-sized to the desired proportions. Returning to FIG. 2(f), at step 139, the cropped (re-sized) image is displayed and the user is prompted either to accept the image or re-size it. If the user wishes to select another image size, the process returns to step 137 to enable re-sizing and re-displaying of the resultant image. If, at step 139, the user accepts the sized image, the process proceeds to step 140 to enable further manipulation of the image according to the artistic vision of the user. At step 140, the image may undergo the operations available from commercially available image manipulation software such as Adobe Photoshop®, or from customized software having generally similar functionality e.g., colors may be changed, objects may be added, removed, or re-positioned, lighting and shading adjusted, selective blurring may be introduced, etc.

In addition, at step 140, it is understood that images of textures may be generated or imported and incorporated as part of the selected image. Various natural or artificial textures (tree bark, stone, water surface, concrete, etc.) or images that can serve as textures, striae, or faint background motifs (i.e., analogous to conventional paper-based watermarks)—for example, enlargements of microscopic images that can be superimposed on the image, perhaps as a repeating motif—may be incorporated into the selected image. Such images may be imported into an image editing design tool such as the software depicted in FIGS. 2(d) through 2(h), or, alternatively, commercially available software such as Fractal Painter 5.5®, and may be processed and superimposed onto the displayed image so as to give the image a perceived textural or other decorative effect. All of these artistic augmentations may be accomplished using commonly-available software modules, incorporated in accordance with various aspects of FIGS. 2(d) through 2(h), or, alternatively, through commercially available software such as Adobe Photoshop®, Corel Draw®, or other software having similar functionality, perhaps with the assistance of a user interface that effectively simplifies the process (and perhaps limits the options available to those most likely to be needed) for users unfamiliar with the operation of such software, and that makes whatever readily apparent adaptations may be necessary to use such software in an Internet environment. It should be noted that the use of textures may also be introduced as part of the development of the backdrop (steps 306 and 308 of FIG. 2(e)).

As discussed above, it may be determined that the overall image requires enhancement in the areas of brightness, contrast, and/or color balance ("image-related enhancements"). Conventional software methods, e.g., as embodied at step 142 of FIG. 2(f), or as embodied in software such as Adobe Photoshop®, may be used to implement improvements to the patterned product in one or more of these areas.

At this point, the desired result (which can be thought of as the output from step 142 of FIG. 2(f)) is a displayed digitized version of a target image, derived from the original selected image, that is defined in terms of individual pixels or picture elements and that fully embodies the artistic vision of the artist. Thus, proceeding to step 144, the user is prompted to confirm that the adjusted/augmented image is acceptable. If, at step 144, the user indicates the image is not acceptable, the process flow returns to step 140 where further adjustments/augmentations may be made by the user. Otherwise, if, at step 144, the user confirms that the image is acceptable, the image is ready to be resolved into the palette colors defined by the Product Specification Template or Source SKU using conventional dithering techniques and the processing will proceed to step 145 where a color resolving or "dithering" algorithm is implemented.

"Dithering" of the desired image is a computer-generated pixel-by-pixel reconstruction of the image, using only pixels having colors found in a pre-defined "dithering palette". Preferably, the colors of the dithering palette correspond to those SKU colors capable of being created by the specific patterning system and set of process colorants in use. One example of such system is the textile patterning system generally disclosed in commonly-assigned U.S. Pat. Nos. 4,116,626, 5,136,520, 5,142,481, and 5,208,592. Preferably, as shown in conceptually exemplary Internet-based displays 280, 285 of FIGS. 9(*a*) and 9(*b*), respectively, a dithering algorithm is implemented that provides an interface 283 for resolving the colors present in the digitized image 99 using only the colors from a pre-defined palette of "dither colors" 288. The dithering software works by generating, in pixel-wise fashion, an image in which each pixel is assigned a color from the dither palette that, when the image is viewed from a distance, best approximates the color at that location within the image being dithered.

There are many software algorithms available to accomplish dithering, such as those found in Adobe Photoshop®, Adobe Illustrator®, Corel Draw®, etc. or those based upon the work of Thiadmer Riemersma, as described in "A Balanced Dithering Technique," appearing in the December, 1998 issue of C/C++ User's Journal, or, often preferably, those based upon Floyd-Steinberg dithering and described, for example, in the an article appearing in "PC Magazine" at Page 253 of the Mar. 28, 1995 issue. In any case, the image to be dithered is analyzed and re-constructed using only pixels having colors found in a predetermined dithering palette.

The colors that comprise the dithering palette 288 may be those colors comprising the "primary" or process colors directly available for dispensing by the patterning system to be used, for example, cyan, magenta, yellow, and black, if the patterning system uses a conventional four color system. In the patterning system disclosed herein, the number of process colors used is typically the same as the number of arrays, typically eight or more. If the printing system allows for the in situ blending of colors, in which different colors may be generated by the mixing or migration of colors after the colors have been applied to the substrate, the dithering palette may be augmented by the addition of various combinations of process colors, as applied to the same or adjacent pixels, thereby forming in situ mixtures or blends of process colors on the substrate surface.

In a preferred embodiment, the colors of the dithering palette are comprised of the colors of the available liquid colorants to be used in the printing process, and some or all of pre-selected proportional blends of those colors. Such blends may include colors that would appear if applied in sequence to the same pixel and allowed to mix on the substrate, one color superimposed on the other, to achieve an in situ blend of the applied colors, as well as colors in which such proportional blends are intended to migrate and mix across pixel boundaries in a controlled, predictable way, in accordance with the teachings of commonly assigned U.S. patent application Ser. No. 08/834,795, the teachings of which are hereby incorporated by reference.

The above-referenced U.S. patent application describes a special case in which a potential limitation in the colorant delivery system may be overcome when attempting to generate mixtures of colors on a substrate. It is known that colors that are not available as process colors—process colors being those colors that are directly represented by the liquid colorants in the patterning device—may be generated by blending specific combinations of process colors on the substrate, i.e., two or more different colorants are applied to the same area on the substrate and are allowed to mix, thereby forming a new color. A potential problem arises when the relative proportion of a constituent colorant that must be delivered to a specified pixel is less than the delivery system of the patterning device can accommodate.

For example, assume that a pixel having a specific shade of green is desired, and must be generated from a combination of process colorants of blue and yellow. Assume further that the specific shade of green desired is achievable only if the relative proportion of those colorants, individually applied to the same pixel-sized area of the substrate, is 2 parts blue and 8 parts yellow. The valve response of the patterning device may be unable to deliver the blue colorant to the designated pixel in such a small quantity—assume, for example, that a 30% saturating quantity (based on a baseline quantity of 100%, i.e., that quantity that is sufficient to fully saturate, but not oversaturate, the substrate at that location) is the smallest quantity of colorant that can be reliably delivered to an individual pixel. In that case, it is possible to form the desired shade of green by forming a multiple pixel structure, generally comprised of between two and sixteen or more individual, contiguous pixels that may be used within the image in the same manner as a single pixel. The number of pixels to be used depends upon a number of factors, including the ratio of colorants forming the desired blended color and the desired relative granularity or "heather" that is artistically acceptable in the pattern.

This multiple pixel structure, referred to as a "metapixel," is characterized by the formation, within the metapixel, of individual pixels that are relatively oversaturated with colorant and adjacent pixels that are relatively undersaturated with colorant, thereby encouraging the migration of colorant from the oversaturated areas to the undersaturated areas. As a consequence, minimum colorant delivery limitations can be overcome by calculating and delivery a quantity of colorant within the metapixel that, on average, meets the proportional blending requirements of the desired color. In this instance, the blue and yellow colorants are applied to the group of contiguous pixels forming the metapixel in a way in which the average quantity of blue colorant contained throughout the metapixel is 20% and the average quantity of yellow colorant contained throughout the metapixel is 80%, yielding an average quantity of colorant that is 100%, i.e., that quantity that saturates, but does not oversaturate, the substrate at that location. This can be achieved using several combinations or arrangements of pixels to which various individual colorant quantities—but never less than 30% of any single colorant—have been applied.

An elementary metapixel can be imagined by thinking of four contiguous pixels, arranged in a square (e.g., 2×2) array, intended to reproduce a shade of green. Assume that two of these pixels, perhaps arranged along a diagonal, each contains 40% of a saturating application of blue colorant, as well as 80% of a saturating application of yellow colorant. While each of these applications of colorant would be undersaturating if considered individually (because each is less than 100%), the combination of colorants in each of these two pixels results in a 120% level of saturation (40%+80%), and therefore results in an oversatuating condition within those two pixels. Assume that Into the remaining two pixels comprising the square array is placed an 80% saturating application of yellow colorant. The resulting combination averages to a 20%/80% proportion of blue colorant to yellow colorant within the four pixel array, which presumably is the appropriate ratio needed to reproduce the desired shade of green. Given the absorbent nature of the textile substrates to which this technique is applicable (which substrates tend to promote inter-pixel blending of colorants, and, particularly, the migration and blending of colorants from oversaturated areas into undersaturated areas), the overall effect is that of a four pixel array in which the overall color is similar to that which would have been obtained by the application of a 20% quantity of blue colorant and an 80% quantity of yellow colorant to each of the four pixels comprising the array.

Alternatively, this same overall colorant average within the metapixel array could have been achieved by the same 40% application of blue colorant to the same two pixels within the array, but with the remaining two pixels each receiving all of the necessary yellow colorant (i.e., an oversaturating, 160% application). Generally, because this latter distribution of colorants must rely more heavily upon unrestricted colorant migration on the substrate, the first described colorant application process (i.e., creating the individual pixels having a 40%/80% blue/yellow colorant distribution, and therefore constructing an array in which the yellow colorant is more uniformly applied within the array) will be preferred under most conditions. Of course, metapixel arrays comprised of other configurations of oversaturated and undersaturated pixels can be constructed—for example, 3×3 arrays, or irregularly shaped arrangements of pixels—so long as (1) the average proportion of colorants within the metapixel array reflects the proportions of colorants desired, (2) overall average saturation level within the metapixel does not appreciably exceed 100% (to avoid drying and other problems), and (3) the minimum colorant delivery limitations of the patterning device are observed.

Having appropriately defined the colors to be included in the dithering palette to be used and following the application of the desired dithering algorithm at step 145 (see FIG. 2(f)), the results in the form of a dithered image may be displayed on the user's display device so the user may review and approve (or reject) the dithered version of the desired image (step 148) prior to further processing. If the user does not accept the image, the process will proceed back to step 140 to allow the user to make further adjustments or augmentations of the image, ultimately resulting in the construction of an acceptable image (step 129 of FIG. 2(d)).

Once the dithered target image is generated and accepted, the process returns to the main menu where the user may select option 121c of FIG. 2(d). Upon selection of option 121c, the system generates an interface display for enabling user selection or input of any textual content, including parameters such as text size, font type, color, etc. Particularly, the user is presented with a display at step 150 for entering text, for example, a name or phrase, in accordance with the exemplary software process steps set forth in FIG. 2(g). In one embodiment, for example, customer specified text may be designed into the manufactured product and the selected Product Specification Template may be modified to include one or more temporary fields enabling entry of user-desired text according to the Template specification. As an example, the following properties may be defined for each of the text fields:

XPNT: XPNT specifies the x coordinate of the text key point within the design. The x coordinate is found by counting the number of points or pixels from the left edge of the design array.

YPNT: YPNT specifies the y coordinate of the text key point within the design. The y coordinate is found by counting the number of points or pixels from the top edge of the design array.

TYPE: TYPE specifies the horizontal position of the text with respect to the key point. Possibilities may include LEFT justified, RIGHT justified, and CENTER.

VERT: VERT specifies the vertical position of the text with respect to the key point. Possibilities may include TOP, CENTER, and BOTTOM.

FONT: FONT specifies the style of text to use. An example of a font would be the Microsoft Windows© True Type font "Arial".

SIZE: SIZE specifies the size of the text to use as interpreted by a Microsoft Windows© True Type font.

BOLD: BOLD is a flag that causes the text to be added in Bold (or heavy) mode.

CAPS: CAPS is a flag that causes the text to be added in all capital letters.

ITAL: ITAL is a flag that causes the text to be added in Italics mode.

COLOR: COLOR specifies the color numerical value to use when adding text to the design file.

ROTA: ROTA is a flag that causes the text to be rotated by a specified amount.

The "key point" (as defined by XPNT and YPNT) is used together with the TYPE and VERT flags to position the text in the design. The FONT, BOLD, CAPS, and ITAL flags are used to specify the appearance of the text in the design. The COLOR flag is used to define the color of the text. The ROTA flag is used to rotate the text.

Figure 2G:
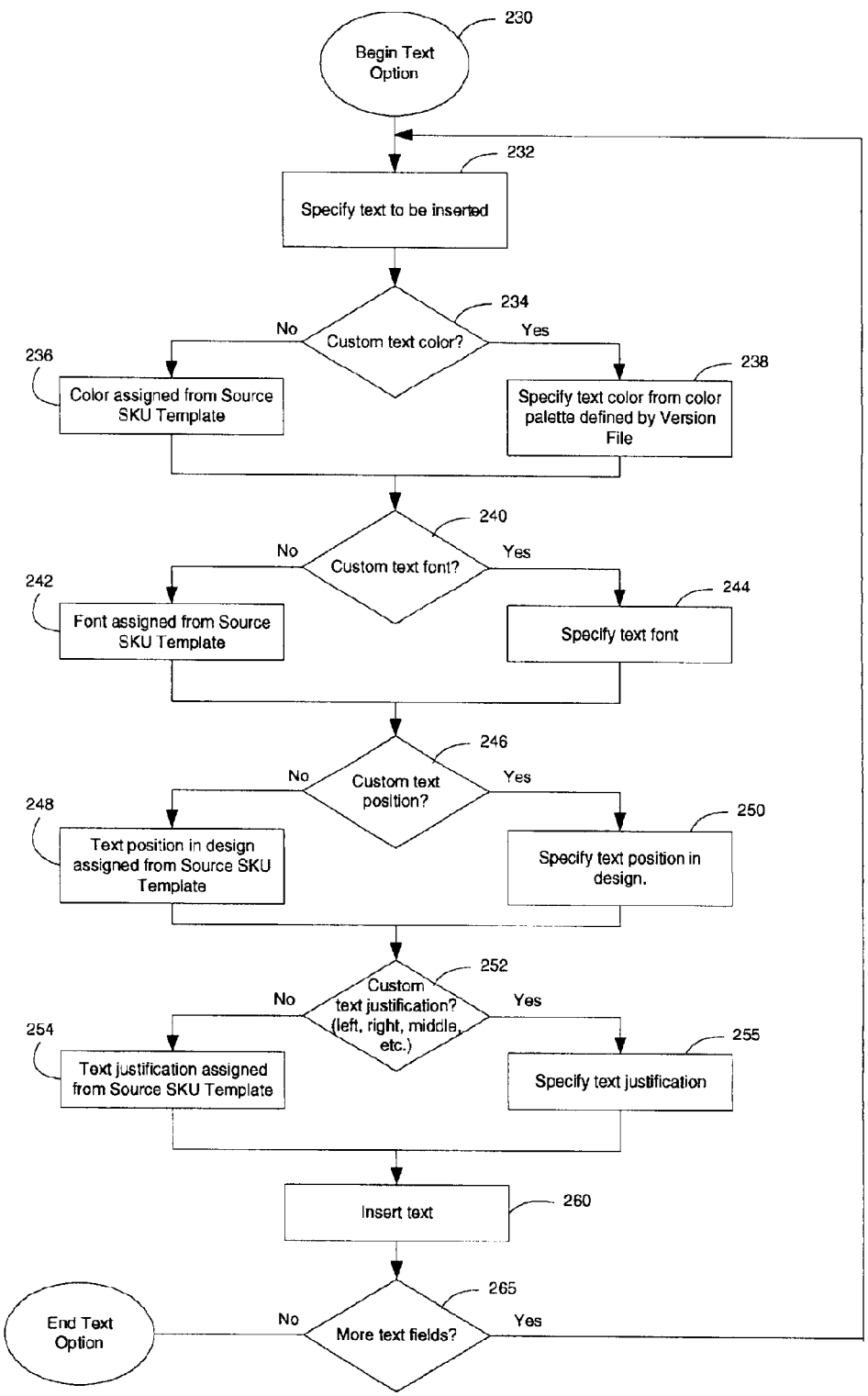
FIG. 2(g) is an overview of representative process steps associated with the Text Option of FIG. 2(d) at step 121c.
Figure 2H:
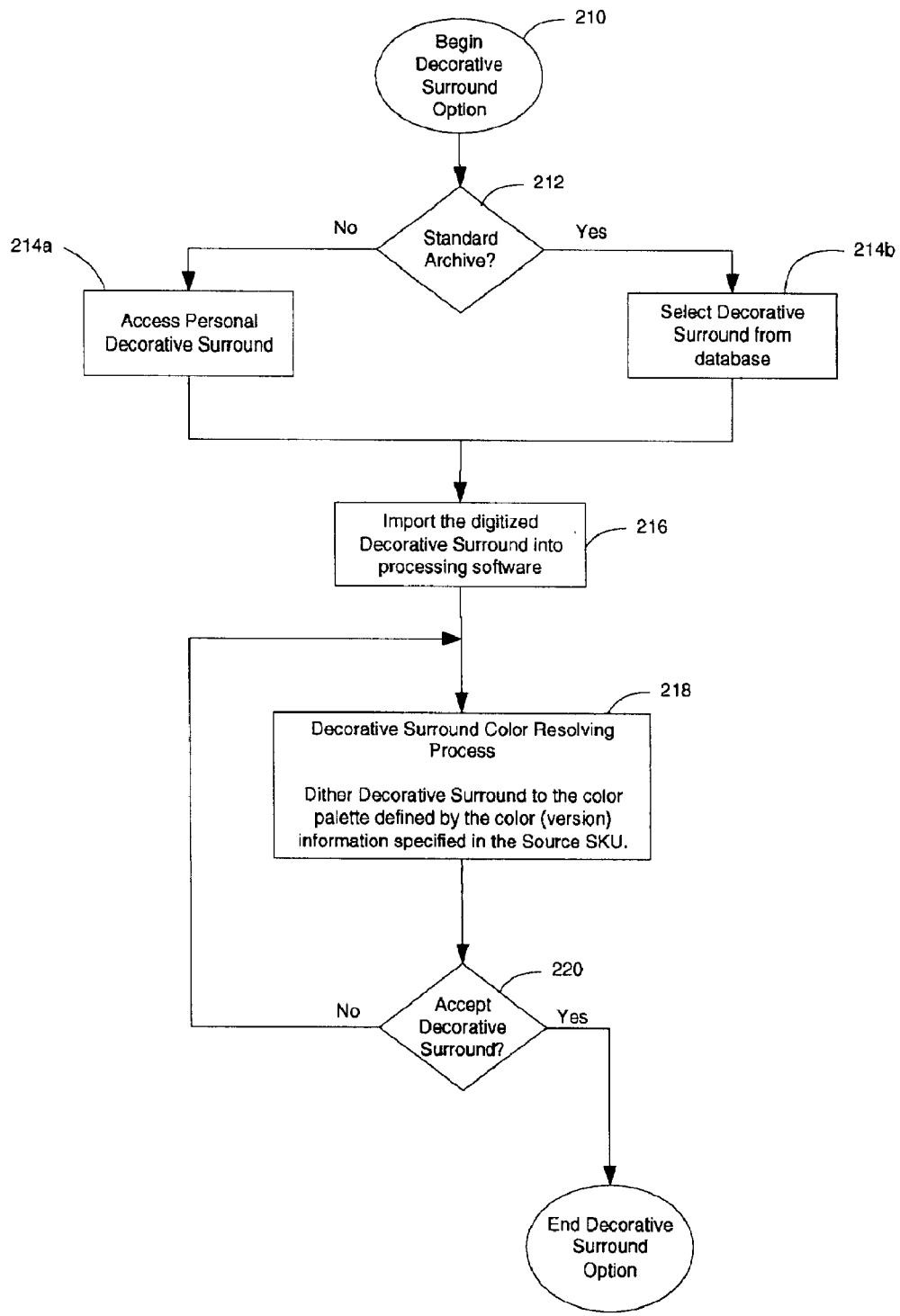
FIG. 2(h) is an overview of representative process steps associated with the Decorative Surround Option of FIG. 2(d) at step 121d.

After inputting the text in accordance with, for example, the software process steps set forth in FIG. 2(g), a process is initiated to generate the candidate target image with any overlaid text, the Design File is appropriately updated (step 151), and present the user with an opportunity to view the candidate target image with the overlaid text as indicated at step 153 of FIG. 2(d). Preferably, the user is presented with an opportunity to accept the image at step 155 or, return to the steps of FIG. 2(g) to enter different text and again preview the resulting candidate target image at step 153. Once the resulting image and optional text portion are accepted, the process returns to the main menu where the user may select option 121d of FIG. 2(d). Upon selection of option 121d, the system generates a display, at step 157, that enables user selection of a decorative surround for the candidate target image, as will now be described.

As referred to herein, the term "matting" generally will be used to refer to the relatively narrow border which immediately surrounds the subject image. Such matting may be relatively plain, or may appear textured and may, for example, comprise a trail leaf design or leather appearance. The term "frame" generally will be used to refer to an outer, relatively wide border surrounding the matting and which may contain various artistic overlays or textures, as shown in FIGS. 13–15. However, because these terms, as well as the term "border," all refer to various artistic treatments that are associated with the perimeter of the subject image, and that may be used in various widths, combinations and sequences, these terms may be used somewhat interchangeably, and collectively shall be referred to as "decorative surrounds." It should be understood that rugs contemplated for creation in accordance with the present invention do not require such decorative surrounds, e.g., the image may simply extend to the edge. Alternatively, the rugs created in accordance with the teachings herein may include more than one matting, frame, or border, in any desired sequence, arrangement, width, shape (e.g., uniform, sinusoidal, etc.), or embodying any desired artistic motifs, as described in more detail below.

Referring to step 157, FIG. 2(*d*), a desired decorative surround may be constructed using the exemplary software process steps shown in FIG. 2(*h*) or, alternatively, using another paint program of conventional design, such as exemplified by Fractal Painter 5.5®, Adobe Illustrator® or Adobe Photoshop®. Preferably, a separate file in the selected paint program software is opened, having an interface 295 such as depicted in the conceptually exemplary Internet-based display 290 of FIG. 10(*a*), which illustrates the acquisition of image textures 293 for creating a decorative matting for the selected image.

It is understood that textures 293 may be of any decorative art form, including those found in nature, including, but not limited to: paper, tree, bark, concrete, water surface effects, magnified images from the microscopic world of nature, and any textural image from nature, such as the stone texture 298 depicted in the conceptually exemplary Internet-based display 290 of FIG. 10(*b*). Optionally, or in addition, as depicted in the conceptually exemplary Internet-based display 300 of FIG. 11, the user may select a decorative surround in the form of a matting or backdrop from a pre-defined menu of textures 302 or decorative art motifs (e.g., fleur-de-lis, spirals, etc., not shown). The selected decorative surround image may be imported into the decorative surround-generating program in a convenient digitized file format, at which point the user preferably is provided the opportunity to modify the color or other artistic aspect of the matting. FIG. 12 depicts a conceptually exemplary Internet-based display 305, which happens to depict the colorization 308 of a texture image 298 in the software tool Fractal Painter® 5.5. As depicted in steps 218 and 220 of FIG. 2(*h*), the user may be given the option of reviewing the dithered image of the matting for approval.

Following the generation of the selected artistic matting, the dithered version of the subject image and any accompanying textual content may be positioned on the preferred design or backdrop, using, for example, the software mentioned above. That is, as depicted in a conceptually exemplary Internet-based display 310 of FIG. 13, after processing the images, the matting and dithered target image, whether artistically augmented or not, may be assembled so that the subject image 309 (with text, if any) is superimposed on the selected or created backdrop design 311 (e.g., from choices 302 of FIG. 11), thereby forming a matting for the subject image that is preferably, but not necessarily, of some desired uniform width.

As depicted in a conceptually exemplary Internet-based display 320 of FIG. 14, after accepting the subject image as superimposed on the matting backdrop, a finishing frame image 313 may be added, preferably, but not necessarily, between the matting 311 and the outer edge of the subject image 309, to form a completely assembled target design that will be transferred to the textile or fibrous pile substrate.

As depicted in the conceptually exemplary Internet-based display 325 of FIG. 14, the user may select from among a choice of pre-defined frame styles and patterns 328 that can be imported into the design software in a recognizable digitized file format to enable the user to attribute color and texture to the frame. It should be understood that the frame may be of any style, plain or patterned, and of any desired color and may be custom-generated by the user. It is contemplated that, where the colors selected for the matting or frame (or both) do not correspond to process colors, a dithered image of the matting and/or frame may be generated.

Returning to FIG. 2(*d*), after the subject image is superimposed on the selected matting (with appropriate updating of the Design File at step 158), the user is then given an option to view, in dithered form, the resultant composite image, reflecting all of the user's customization choices up to that time at step 159 and to accept the image at step 161. Optionally, the user may elect to return to step 210 of FIG. 2(*h*) to select and preview another matting or frame. Otherwise, at this point, all customizable parameters comprising the Custom Product Specification portion of the Product Specification Template will be considered complete, and a completed target image, including any text, associated backdrops and decorative surrounds (e.g., mattings and frames), may be transferred onto the surface of a sample and/or the selected substrate, such as a rug, using the Target SKU that has been generated in response to the choices made by the user, as will now be explained.

When the user has accepted the final image to be manufactured as a patterned substrate such as a rug or carpet (as indicated by exiting the process described in FIG. 2(*d*)), the process proceeds to step 170 of FIG. 2(*b*), where the user is given the option to purchase the rug or carpet by the common methods of on-line purchases. Particularly, step 170, FIG. 2(*b*), represents the process for creating and submitting orders. The order generation process invokes customary and conventional techniques (not shown) such as providing a web page for entry of user order information such as name, address, telephone numbers, delivery method, delivery address, etc. It is understood that the associated Product Specification Template and any accompanying user input information has been previously associated with a user/customer identifier and a price for the item has already been determined, based on the rug size specified in the template and, optionally, other criteria. Billing for the product may be handled through readily-available third party credit card billing software such as indicated at step 172. For example, the user may be prompted to authorize payment by conventional on-line credit means, typically by entering a credit card number and invoking the third party billing services according to customary and conventional techniques such as depicted at 45 in FIG. 1.

Next, as shown in FIG. 2(*b*), step 175, the order information is transmitted by electronic or other means to the manufacturing facility where the final customized patterned substrate is to be manufactured according to the generated order. Upon receipt of the order information, the orders are logged and made available to a planning function (step 180, which is preferably, but not necessarily, automated) that addresses issues such as raw material and patterning device availability, and that identifies and stores Product Template data for use in step 185 (discussed below). At about the same time, an electronic message may be sent to the user or customer at the customer's terminal confirming receipt of the order (step 182). Optionally, other information such as manufacturing and shipping dates or the extent of possible delays in manufacturing generated by the planning function, may also be sent with the order confirmation. If desired, a "hard copy" of such confirmation or other, optional information can be sent to the address on the order.

To facilitate manufacturing efficiency, on a periodic basis the orders are scanned, sorted, and consolidated (step 185) so that all orders requiring a given set of process colorants and a given substrate or "Base" can be manufactured in the same production run, and a common RUNLIST with all such orders may be sent to the patterning device control system, as discussed below. Following this step, the software of FIG. 2(*b*) defines alternative routes for custom and non-custom designs (step 187). Non-custom designs rely upon pregenerated target product specifications and colorant applicator actuation instructions (requiring few changes to the Product Specification Template), and may be manufactured with a minimum of additional processing. Custom designs are routed through process steps 190 through 194 prior to actual manufacture. In step 190, a Temporary Target Product Specification Template is generated by the combination of the non-customizable portions of the Product Specification Template, as embodied in the Source SKU, and the customizable portions of the Product Specification Template (i.e., the Custom Product Specification), as respectively depicted in FIG. 2(*c*).

The mechanism for creating this Template and corresponding "temporary SKU" containing the customized data may be described as follows. If the Product Specification Template contains customizable data fields, it includes a flag and pointer to a Design File that includes all of the information that has been entered by the user about the properties of the various design elements. This Design File portion of the Product Specification Template defines various fields for receiving information that may be added to the design (e.g., the user's selection for the subject image and any optional text, border elements, substrate type, pattern and border, colors, desired chemical finishes, etc.), and may have been generated in accordance with the process of FIG. 2(*a*). The non-customizable information from the "Product Specification Template" (see FIG. 2(*c*)) is then merged with the information that has been customized by the user to create a "Temporary Product Specification Template" or Target SKU as indicated at step 190.

In step 194, the user selections and manufacturer default values that relate to the target image to be reproduced (e.g., relating to the subject image, the selected background, any text to be added, and the selected decorative surround) are combined to generate a data file specifying the target image as an arrangement of pixels, with each pixel being assigned on of the colors of the dither palette (i.e., one of the colors that is capable of being reproduced by the patterning device and chosen set of process colors). This "Target Image File" is essentially a two-dimensional, M % N array, each cell of which contains a numerical value that identifies a specific address in the "Version File" that corresponds to one of the colors in the dither palette. The Version File, in turn, is in the form of a J % K array that relates each of the colors in the dither palette to specific colorant applicator actuation times, as well as the RGB values for each of the colors in the target image (so that the dither palette color closest to the specified RGB value can be selected).

As part of 194, the Target Image File and the Version File are used to generate patterning instructions for the selected patterning device. As discussed in more detail below, lookup tables found in the appropriate Version File, discussed above (or similar means for associating two sets of data), may be used to associate colorant applicator actuation times with a desired dithering palette color. By specifying the relative quantity of colorant(s) (as defined, for example, by colorant application times) necessary to reproduce a specified palette color (assuming the availability of in situ blending and the formation of metapixels) in a given pixel-scale region of the substrate, the patterning information defining the target image generated by the above-defined design process can be sent to a textile patterning device (such as is described herein), and the desired target image (in this case, Van Gogh's "Starry Night" and the decorative surround specified by the user, as depicted in FIG. 16) can be used accordingly to pattern the selected substrate. As soon as manufacturing is complete, the rug may be packaged and shipped in accordance with shipping instructions received with the order.

At this point, the customized product, carrying the target design, is manufactured as indicated at step 195. It should be understood that the Target SKU is used once in manufacturing in lieu of the Source SKU and is later discarded; for this reason, it may be thought of as a "temporary" SKU. Multiple customized Target or "temporary" SKUs stand as proxy to the Source SKU only during the manufacturing process. For cost tracking, pricing, etc., each item represented by a Target SKU remains a member of the Source SKU (in fact, each unique item is represented by a unique Product Specification Template).

With respect to step 194, a process is employed for translating from pixel-wise specification of colors to patterning instructions for the patterning device. Preferably, this is achieved by creating in appropriate software a Version File comprised of a look-up table that associates a given color or color combination with a set of dye applicator-specific actuation instructions. Preferably, this look-up table may then be accessed by the electronic control system of the patterning device to "translate" a desired color at a given pixel location in the pattern with the dye delivery quantities and sequences necessary to generate that desired color on the substrate at that specific pixel location. It may be necessary to store the results of the table look-up to assure that the appropriate instructions for each colorant applicator on each color bar reach the proper applicator at the proper time—when the location on the substrate to be colored by that applicator is passing under that applicator. Details of one such process of the kind described above is set forth in commonly assigned U.S. Pat. Nos. 4,984,169 and 5,195,043, the whole contents and disclosures of each are incorporated herein by reference, and the relevant teachings of which are described in greater detail hereinbelow.

For exemplary purposes, the following assumptions, conventions, and definitions are used herein. Skilled artisans will appreciate that production specifications as set forth herein may vary from machine to machine, and further that various modifications may be made depending upon the application. The term "dye jet" or "jet" refers to the applicator apparatus individually associated with the formation of each dye stream in the various arrays. It is assumed that the substrate will be printed with a pattern having a resolution or print gauge of, for example, one-tenth inch, as measured along the path under the arrays, i.e., the arrays will direct (or interrupt the flow of) dye onto the substrate in accordance with instructions given each time the substrate moves one-tenth inch along its path. This implies that a pattern line, as defined earlier (i.e., a continuous line of single pattern elements extending across the substrate), has a width or thickness of one-tenth inch. Of course, other print gauges can be used.

Substrate speed along the conveyor is assumed to be one linear inch per second, or five linear feet per minute. This implies that, during each time period in which the substrate moves one-tenth inch (i.e., each one-tenth second), which hereinafter may be referred to as a pattern cycle, each and every valve controlling the individual dye jets in the various arrays will receive an electronically encoded instruction which effectively specifies the following: (a) whether the valve should interrupt the flow of diverting air intersecting its respective dye jet and, if so, (b) the duration of such interruption. This time, during which the stream of dye is undeflected and contacts the substrate, may be referred to as "firing time" or the time during which a dye jet "fires" or is actuated. For purposes herein, firing time, actuation time, and dye contact time are synonymous.

Array sequence numbering, i.e., first, second, etc., refers to the order in which the substrate passes under or opposite the respective arrays. Similarly, "downstream" and "upstream" refer to the conveyor direction and opposite that direction, respectively. For purposes of discussion, a total of eight arrays are assumed, each having four hundred eight individual dye jets, although the apparatus is by no means limited to such numbers and may easily adapted to support thousands of individual dye jets per array, and/or a greater number of individual arrays. Array-to-array spacing along the direction of substrate travel is assumed to be uniform at ten inches, i.e., one hundred pattern line widths, although other spacings, or non-uniform spacings, can be accommodated by suitable adjustments to the control system; all that is required is the selective, array-specific delay of applicator actuation instructions in a way that compensates for the time (or distance) separating the various arrays from the perspective of the moving substrate. Details relating to implementing such delays are discussed below. Note that one hundred pattern lines implies the processing of pattern data for one hundred pattern cycles. Because each of the arrays is supplied with a separate process colorant (i.e., eight arrays implies a maximum of eight process colors), the term "color bar" may be used in place of the term "array."

For purposes of discussion, the electronic control system will be described in conjunction with the metered jet patterning apparatus discussed below and depicted in the FIGS. 17 through 30, to which this control system is particularly well suited. It should be understood, however, that this electronic control system may be used, perhaps with obvious modifications, in other devices where similar quantities of digitized data are rapidly distributed to a large number of individual elements.

FIG. 17 shows a jet dyeing apparatus 418 comprised of a set of eight individual color bars 436 positioned within frame 432. Each color bar or array 436 is comprised of a plurality of dye jets, perhaps several hundred in number, arranged in spaced alignment along the length of the color bar, which color bar extends across the width of substrate 415. Substrate 415, such as a textile fabric, is supplied from roll 434 as transported through frame 432 and thereby under each color bar 436 by conveyor 440 driven by a motor indicated generally at 438. After being transported under color bars 436, substrate 415 may be passed through other dyeing-related colors steps such as drying, fixing, etc.

Referring to FIG. 18, there is shown in schematic form a side elevation of one color bar 436 comprising the jet dyeing apparatus 418 of FIG. 17. For each such color bar 436, a separate dye reservoir tank 433 supplies liquid dye under pressure by means of pump 435 and dye supply conduit means 437, to a primary dye manifold assembly 439 or the color bar 436. Primary manifold assembly 439 communicates with and supplies dye to dye sub-manifold assembly 441 at suitable locations along their respective lengths. Both manifold assembly 439 and sub-manifold assembly 441 extend across the width of conveyor 440 on which the substrate to be dyed is transported. Sub-manifold assembly 441 is provided with a plurality of spaced, generally downwardly directed dye passage outlets positioned across the width of conveyor 440 which produce a plurality of parallel dye streams which are directed onto the substrate surface to be patterned.

Positioned in alignment with, and approximately perpendicular to, each dye passage outlet (not shown) in sub-manifold assembly 441 is the outlet of an air deflection tube 462. Each tube 462 communicates by way of an air deflection conduit 464 with an individual electro-pneumatic valve, illustrated collectively at "V," which valve selectively interrupts the flow of air-to-air tube 462 in accordance with the pattern information supplied by pattern control system 416. Each valve is, in turn, connected by an air supply conduit to a pressurized air supply manifold 474 which is provided with pressurized air-by-air compressor 476. Each of the valves V, which may be, for example, of the electromagnetic solenoid type, are individually controlled by electrical signals received over bus 426 from the electronic pattern control system 416. The outlets of deflection tubes 462 direct streams of air which are aligned with and impinge against the downwardly directed dye passages within sub-manifold 441 and deflect such streams into a primary collection chamber or trough 480, form which liquid dye is removed, by means of a suitable dye collection conduit 482, to dye reservoir tank 433 for re-circulation.

The pattern control system 416 receives pattern data over bus 422 from the multiprocessor system described herein with respect to FIG. 21. Desired pattern information from control system 416 is transmitted to the solenoid valves of each color bar 436 at appropriate times in response to movement of the substrate under the color bars by conveyor 440, which movement is detected by suitable rotary motion sensor or transducer means 419 operatively associated with the conveyor 440 and connected to control system 416. The pattern control system 416 will be discussed in detail herein below, in conjunction with reference to FIGS. 26 through 30.

For purposes of comparison, another control system is now described in detail with respect to FIG. 19. For purposes of explanation, the format of the patterning data or patterning instructions for this control system, as indicated in FIG. 19, is schematically depicted in FIG. 20. As shown, the pattern element data (in Data Format A1) is first converted to "on/off" firing instructions (referring to the de-actuation or actuation, respectively, of the diverting air associated with the individual dye streams) by electronically associating the "raw" pattern data with pre-generated firing instruction data from a computer generated look-up table ("LUT"). This firing instruction data merely specifies, using a single logical bit for each jet, which jets in a given array shall fire during a given pattern cycle, and is represented by Data Format A2 of FIG. 20.

In generating such look-up tables, the raw pattern data must first be converted to "on/off" firing instructions. The control system accepts the raw source pattern data in the form of a series of pixel codes. The pixel codes define those distinct areas of the pattern which may be assigned a distinguishing color. Each code specifies, for each pattern line, the dye jet response for a given dye jet position on each and every array. In a system having eight color bars, for example, each pixel code therefore controls the response of eight separate dye jets (one per color bar) with respect to a single pattern line. The term "pattern line," as used herein, is intended to describe a continuous line of single pattern elements extending across the substrate parallel to the patterning color bars. Such pattern lines have a thickness, measured in the direction of substrate travel, equal to the maximum permitted amount of substrate travel under the patterning color bars between color bar pattern data updates. The term "patterning element," as used herein, is intended to be interchangeable with the term "pixel" as that term is used herein with respect to the generation of the pattern.

An operator's interface, such as a workstation terminal, may be coupled to the host computer in the multiprocessor system. The workstation serves as the operator's interface for providing the input parameters to the host computer for each job of patterns to be generated on the substrate of the textile dyeing apparatus.

The operator enters the input parameters as a "RUN LIST" file name. The RUN LIST file designates the type of substrate (i.e., the "Base") to be dyed, as well as the process colors and the types of patterns to be printed for each job. The RUN LIST entry also specifies, for each distinct type of substrate, the firing time for each of the color bars in the dyeing apparatus—equivalent to the quantity of the process colorant associated with that color bar that must be delivered to a specified pixel in order to reproduce a given color comprising the dither palette. The RUN LIST entry, for the type of pattern, accesses the Target SKU file. The Target SKU file designates, for each pixel code used in the pattern, the respective color bar associated therewith. With this information, the multiprocessor and control systems generate the individual firing instructions for each colorant applicator or jet in each color bar. Alternatively, the substrate information can be stored in a separate Base file, thereby making unnecessary the repetitive storage of substrate information if many SKUs will use the same substrate.

The system described below produces the look-up tables from the operator's RUN LIST in a four-phase operation.

First, the type of RUN LIST entry is determined and an appropriate table generated to store its information. If an entry is a Base entry, then a firing time table is generated for the particular substrate associated with the Base entry. If the entry is determined to be a Color entry, the second phase of operation generates a machine color table for the color loading configuration. If the entry is an SKU entry, then the third phase generates a pattern color table including the information from the respective SKU file identified by the SKU entry. The pattern color table associates each pixel code with a particular color name rather than a fixed color bar in the jet dying apparatus as previously was done. Thus, for example the pixel code A is associated with a color name such as "red" rather than a particular color bar.

The fourth phase of operation generates the look-up tables from the data provided in the firing time table, machine color table and pattern color table. In this system, the operator only needs to input the color entries for the machine color loading configuration to correctly generate the proper look-up tables for the requested pattern and substrate.

It is an advantage to reduce the amount of storage space necessary by eliminating the need for storing converted firing instructions. Further, a series of jobs can be continuously printed without requiring machine "down" time previously necessary to clean and reload a particular color bar. The operator may randomly load the colors into the machine's color bars irrespective of the patterns to be run. The system software automatically generates the correct look-up tables for the particular machine configuration.

Referring to FIG. 21, the multiprocessor patterning system 65 is shown having a host computer 62 coupled via a bus 61 to a real-time computer 60. Optional pattern computer 64 is further coupled to the host computer 62 and real-time computer 60 by the bus 61. It is readily apparent that the coupling of the pattern computer 64, host computer 62 and real-time computer 60 may be by any means for coupling a local area network (LAN), such as an Ethernet bus. A pattern control system 416 is coupled via bus 426 to a jet dyeing apparatus 418. The pattern control system 416 receives input data over bus 422 from the real-time computer 60. Optional pattern computer 64 may be provided to allow a user of the system to quickly create their own pattern design. Alternatively, pattern designs may be pre-loaded onto magnetic or optical media for reading into the system.

As will be described in further detail, each design has an associated stock keeping unit (SKU) file for providing the set-up parameters for the system for each pattern. An SKU file includes the pattern name for the pattern to be printed, the associated color names for each pixel code in the pattern, and a base reference ID identifying the substrate on which the pattern is to be printed.

The base reference ID accesses a base file containing the firing times for each color bar in the jet dyeing apparatus 418 for that particular substrate. A simplified example of an SKU file for several patterns and a Base file are given below in Tables A and B.

TABLE A

| SKU FILE | |
|---|---|
| SKU | ABC |
| Pixel Code A = | Red |
| Pixel Code B = | Blue |
| Base Reference = | WXYZ |
| SKU | ADE |
| Pixel Code A = | 50% Red |
| | 50% Blue |
| Pixel Code C = | Green |
| SKU | CDF |
| Pixel Code A = | Green |
| Pixel Code B = | Blue |
| Pixel Code C = | 25% Yellow |
| | 50% Red |
| | 25% Blue |

TABLE B

| BASE FILE | |
|---|---|
| BASE | WXYZ |
| Color Bar 1 = | 10 ms |
| Color Bar 2 = | 10 ms |
| Color Bar 3 = | 20 ms |
| Color Bar 4 = | 15 ms |

Referring to FIG. 21, a computer terminal 63 may be coupled via a suitable connection 67, e.g., a standard RS232 cable, to the host computer 62. The terminal 63 then serves as the operator's interface for providing input parameters in the form of a RUN LIST to the host computer 62 for each job or series of jobs to be generated on the substrate by jet dyeing apparatus 418. The RUN LIST is simply a series of instructions provided to the host computer 62 for retrieving the SKU file and base file for printing a requested pattern. The RUN LIST further includes the machine set-up or "color loading" for each of the color bars in the jet dyeing apparatus 418. An example of a typical RUN LIST is given below in Table C wherein the SKU files are identified by a three-character code and the Base file is identified by a four-character code.

TABLE C

OPERATOR'S RUN LIST

| | |
|---|---|
| Base = | WXYZ |
| Color Bar 1 = | Red |
| Color Bar 2 = | Blue |
| Color Bar 3 = | Green |
| Color Bar 4 = | Yellow |
| SKU | ABC |
| SKU | ADE |
| SKU | CDF |

The host computer 62 fetches the pattern data contained in the Target SKU from the scheduling computer 64 or other storage source (not shown) and sets it up for processing by the real-time computer 60. The real-time computer 60 functions to ensure that the raw source pattern data is properly output to the pattern control system 416 and hence provided to the individual jets in the jet dyeing apparatus 418.

FIG. 22 shows a flow chart illustrating the software operation for automatically generating the look-up tables associated with each color bar for each requested pattern. The system makes use of the RUN LIST generated by the operator at terminal 63 (FIG. 21) for producing the look-up tables for the requested pattern in the requested color combination. As discussed above, the system operates in four phases, the first three phases retrieve the file information and the machine color loading configuration necessary to produce the look-up tables for the requested pattern and the fourth phase actually generates the look-up tables to be used.

The machine operator need only input in his RUN LIST (1) which color bars contain which color, i.e., the color bar machine configuration loading, (2) what carpet base is being run, e.g., Base WXYZ, Base HIJK, etc. and (3) the requested pattern, e.g., SKU=ABC, ADE, CDF, etc. As shown in FIG. 22, the software system starts (at 42) by obtaining a RUN LIST entry 444 from the operator's RUN LIST. Next, the system determines the type of RUN LIST entry, i.e., base entry, color entry, or SKU entry as indicated by steps 446, 452 and 458. If the RUN LIST entry is a Base entry, then the system retrieves the Base file for that entry and obtains the firing times for each color bar for the respective substrate base as shown in step 448. From the firing times, the system generates a firing time table for each color bar in the jet dyeing apparatus at step 450. Once the firing time table has been generated, the system loops back to retrieve the next RUN LIST entry.

If the RUN LIST entry is a color entry, then the system obtains the color loading indicated by the RUN LIST (step 454). The machine configuration color loading is determined by the operator depending upon which colors are loaded into the respective dye tanks 433 (FIG. 18) for each color bar 436 in the jet dyeing apparatus 418 (FIG. 17). From the color loading, a table of machine colors for the color bars is generated, as indicated by step 456, and the system then loops to obtain the next RUN LIST entry.

If the RUN LIST entry is an SKU entry, then the system obtains the data from the SKU file at step 460, stored elsewhere in the system, such as in the pattern computer 64 (FIG. 21) or optical disk storage (not shown). From the SKU file, a pattern color table is generated, step 461, containing the colors associated with each pixel code in the pattern. Once the firing time table, machine color table, and pattern color table have been generated for a respective job, then the final phase of actually generating the look-up table ("LUT") is performed as shown in the flow chart of FIG. 23.

The system automatically generates the look-up tables for each color bar for the respective pattern, step 466, by first obtaining a first pixel code from the pattern color table, as indicated at step 468. Next, at step 470, using the pixel code previously obtained, the first color and percent of color from the pattern color table are obtained. Using the color, the system next gets the color bar number associated with that color from the machine color table, step 472. From the color bar number, the system obtains the firing time for the respective color bar from the firing time table as indicated by step 478. At step 484, a modified firing time is obtained by multiplying the percent of color, obtained in step 470, and the firing time obtained in step 478. The modified firing time is then stored in the look-up table for the given pixel code and color bar number as indicated by step 486.

The system then determines whether all colors for the particular pixel code have been found, step 488. If not, the system loops back to step 470 wherein the next color and percent of color are obtained from the pattern color table for the particular pixel code. This loop, steps 470–488, continues to repeat until all of the colors for the particular pixel code have been found.

At step 490, the system determines whether all pixel codes have been loaded into the look-up table. If not, the system reverts to step 468 wherein the next pixel code is obtained from the pattern color table. The steps 468–490 then continue to loop until all pixel codes have been loaded into the look-up table. At this point, the entire look-up table for the requested pattern has been generated and is sent to the jet dyeing apparatus (step 492) before completing (step 494).

The system software depicted by the flow charts shown in FIGS. 22 and 23 repeats itself each time new look-up tables are required. This may occur due to a change in the pattern to be printed, a change in the substrate or base upon which the pattern is to be printed or when the machine is configured differently. In this respect, it may be necessary to reconfigure the machine due to a malfunction of one or more of the color bars. For example, if the apparatus includes eight color bars, and only two colors are necessary for the pattern, if one of the color bars malfunctions, then that color can be loaded into one of the remaining six color bars and new look-up tables can be generated to print the desired pattern.

A simplified series of examples are described below to illustrate the operation of the present invention. For purposes of illustration in these examples, a jet dyeing apparatus 418 is assumed to contain only four color bars. Further, the SKU files and Base files are as given above in Tables A and B. The exemplary operator's RUN LIST, given in Table C above, will be used to process the jobs for SKU files ABC, ADE and CDF.

In operation, the first RUN LIST entry "Base=WXYZ" is obtained (step 444). The system determines that the entry is a Base entry and obtains the firing times for Base WXYZ from the Base file (step 448). The system then generates the firing time table for each color bar as shown in FIG. 24A wherein the firing times are given in milliseconds (ms).

The next RUN LIST entry, "Color Bar 1=red," is obtained and it is determined that it is for a color entry (step 452). The system obtains the color loading from the RUN LIST and generates the table of machine colors for the color bars as shown in FIG. 24B. Each of the color entries in the RUN LIST is obtained to complete the machine color table.

The system then obtains the next RUN LIST entry, "SKU=ABC," and obtains the corresponding data from the respective SKU file (step 460). From the SKU data, the pattern color table shown in FIG. 24C is obtained.

At this point, the system begins generating the actual look-up table for the requested pattern identified by SKU ABC. The first pixel code A and its associated color, red, are obtained from the pattern color table. Next, the system identifies the color red with color bar 1 from the machine color table. Finally, the firing time for color bar 1 is obtained from the firing time table. Thus, in our example, a firing time of 10 ms, associated with color bar 1, is stored in the look-up table shown in FIG. 24D for the respective pixel code A.

The system then repeats itself for pixel code B resulting in the storage of a 10 ms firing time for color bar 2 in the look-up table. Any look-up entry not filled by the system is assumed to contain a zero firing time or "null" firing time. Thus, the system generates the look-up tables shown in FIG. 24D for the requested pattern ABC.

Continuing the example, the next RUN LIST entry: SKU=ADE: is obtained from the operator's RUN LIST. This indicates a new pattern is requested and, in all likelihood, new look-up tables would need to be generated. Tables 25–25C indicated the firing time table, machine color table and pattern color table, respectively, associated with SKU ADE.

For this example, the firing time table shown in FIG. 25A is identical to the previous example as the same Base WXYZ is being run through the apparatus. Similarly, the machine color table remains the same as none of the color bar color loadings have been changed. The pattern color table, however, differs from the preceding example because a new pattern, SKU ADE, is being run. As shown in FIG. 25C and the SKU file associated with the pattern ADE, for pixel code A, the associated colors include 50% red and 50% blue—signifying an in situ blend of these two colors. Thus, when generating the look-up table entries, steps 470–488 of FIG. 23 would loop twice, i.e., once for 50% red and a second time for the next color, 50% blue.

In this example, the look-up tables shown in FIG. 25D are generated by the system. Pixel code a is first obtained from the pattern color table and its first color and percent of color, 50% red, are obtained (step 470). Next, the system associates the color red with color bar number 1 and then obtains the firing time of 10 milliseconds for that color bar from the firing time table. This firing time, 10 milliseconds, is multiplied by the percent of the color to obtain the modified firing time. Thus, 10 milliseconds times 50% equals 5 milliseconds which is then stored in the look-up table for the given pixel code and color bar.

Because all colors for this pixel code have not yet been found, the system loops back to step 470 (FIG. 23) and obtains the next color, i.e., 50% blue. This sequence of steps, 470–488, are repeated and the modified firing time stored in the look-up table (FIG. 25D). The operation then repeats for the remaining pixel codes in the pattern color table until the look-up tables are completed. It is apparent that by using percentages of colors, the colors can be shaded or blended within a given pixel to form other colors which are not loaded in the jet dying apparatus.

Returning to the operator's RUN LIST, the next entry "SKU=CDF" is obtained and the look-up tables of FIG. 25E are generated in accordance with the examples set forth above.

As shown above, the system automatically generates the look-up tables in response to the operator's RUN LIST. The operator only needs to input the type of base to be run, the SKU pattern requested, and the machine configuration. The system then generates the look-up tables without any costly time delays for reloading colors in the color bars. Further, if one of the color bars malfunctions, the operator can still possibly finish the RUN LIST without any delays. For example, assume a five color bar machine wherein only four of the color bars have been previously loaded as in the above examples. If, while preparing to run the pattern given by SKU ABC, the machine malfunctions and color bar 1 is no longer operative, then the operator can quickly load color bar 5 with the red color dye and the system will automatically generate new look-up tables in response thereto. (It is assumed the Base ID specifies a 10 ms firing time for color bar 5.) In this example, the look-up tables shown in FIG. 25F would be generated as opposed to the look-up tables shown in FIG. 24D for a non-malfunctioning system. In either event, the correct pattern having the correct colors would be printed.

Following the generation of the appropriate look-up tables, the individual "on/off" firing instructions must be directed to the appropriate dye jets in a way that accommodates the physical arrangement of the arrays on the machine. The proper firing instruction data corresponding to a given area of the substrate to be patterned must arrive at the initial array and at each downstream array at the exact time at which that given substrate area passes under the proper array. This is accomplished by interleaving the array data and inserting synthetic "off" data for downstream arrays at pattern start and for upstream arrays at pattern end, to effectively sequence and delay the arrival of pattern data to the downstream arrays until the substrate has had the opportunity to move into position under the downstream arrays. The data exiting this interleaving operation is in the form of a serial bit stream comprising, for a given pattern cycle, one bit per jet (indicating whether the jet should fire during this cycle) for each respective jet in each array, as indicated in Data Format A3 of FIG. 20.

This serial bit stream is then fed to a data distributor which, for each "start pattern cycle" pulse received from the registration control system (indicating a new pattern line is to begin), simply counts the proper number of bits corresponding to the number of jets in a given array, in the sequence such bits are received from the interleaving operation. When the proper number of bits necessary to comprise firing instructions for that entire array has been counted, that set of bits is sent, in serial form, to the proper array for further processing, as described below, and the counting procedure is begun again for the next array involved in the patterning operation. Each array, in a rotating sequence, is sent data in similar fashion for a given pattern line, and the process is repeated at each "start patterning cycle" pulse until the patterning of the substrate is completed.

Associated with each array is an electronically encoded value for the actual firing time to be used by that array for all patterning cycles associated with a given pattern. It is important to note that this "duration" value may vary from array to array and can vary from jet to jet or from patterning cycle to patterning cycle. This "duration" value is superimposed upon the "fire/don't fire" single-bit data received from the pattern data distribution operation and is temporarily stored in one or more shift registers individually associated with each array. After a predetermined delay to allow time for the shift registers to fill, the data is sent simultaneously to the respective valves associated with the diverting streams of air at each dye jet position along the array.

The control system depicted in FIGS. 26 through 29 may be most easily described by considering the system as essentially comprising three separate data storage and allocation systems (a firing time converter, which incorporates a memory, a "stagger" memory and a "gatling" memory)

operating in a serial sequence. These systems are schematically depicted in FIG. 26, which represents an overview of the control system of the present invention as applied to a patterning device disclosed above. FIG. 29 schematically depicts representative data formats at the process stages indicated in FIG. 26. Each array is associated with a respective firing time converter and "stagger" memory, followed by a separate "gatling" memory, arranged in tandem. Each of these major elements will be discussed in turn.

The raw pattern data is sent as prompted by the "start pattern cycle" pulse received from the substrate motion sensor (FIG. 26). This sensor merely generates a pulse each time the substrate conveyor moves the substrate a predetermined linear distance (e.g., one-tenth inch) along the path under the patterning arrays. (Note that, in the system of the prior art, the "start pattern cycle" pulse was received form the registration control system; in the novel system described herein, a separate registration control system is not needed.) The same "start pattern cycle" pulse is simultaneously sent to each array, for reasons which will be explained below.

The raw patterning data is in the form of a sequence of pixel codes, with one such code specifying, for each pattern line, the dye jet response for a given dye jet position on each and every array, i.e., each pixel code controls the response of eight separate dye jets (one per array) with respect to a single pattern line. As discussed above, the pixel codes merely define those distinct areas of the pattern which may be assigned a different color. The data is preferably arranged in strict sequence, with data for applicators 1–480 (assuming 480 applicators per color bar) for the first pattern line being first in the series, followed by data for applicators 1–480 for the second pattern line, etc., as depicted by Data Format B1 of FIG. 29.

The complete serial stream of such pixel codes is sent, in identical form and without any array-specific allocation, to a firing time converter/memory associated with each respective array for conversion of the pixel codes into firing times. This stream of pixel codes preferably comprises a sufficient number of codes to provide an individual code for each dye jet position across the substrate for each pattern line in the overall pattern. Assuming eight arrays of 480 applicators each, a pattern line of 0.1 inch in width (measured along the substrate path), and an overall pattern which is 60 inches in length (i.e., measured along the substrate path), this would require a raw pattern data stream comprised of 288,000 separate codes.

Comprising each firing time converter is a look-up table having a sufficient number of addresses so that each possible address code forming the serial stream of pattern data may be assigned a unique address in the look-up table. At each address within the look-up table is a byte representing a relative firing time or dye contact time, which, assuming an eight bit address code is used to form the raw pattern data, can be zero or one of 255 different discrete time values corresponding to the relative amount of time the dye jet in question is to remain "on." (More accurately, in the patterning apparatus disclosed, these time values represent the relative amount of time the valve associated with the respective diverting air jet shall remain closed, thereby interrupting the diverting air stream and allowing the stream of dye to strike the substrate.) Accordingly, for each eight-bit byte of pixel data, one of 256 different firing times (including a firing time of zero) is defined for each specific jet location on each and every array.

Jet identity is determined by the relative position of the address code within the serial stream of pattern data and by the information pre-loaded into the look-up table, which information specifies in which arrays a given jet position fires, and for what length of time. (If desirable, data individually comprised of two or more bytes, specifying, e.g., one of 65,536 different firing times or other patterning parameter levels may be used in accordance with the teachings herein, with appropriate modifications to the hardware.) The result is sent, in Data Format B2 (see FIG. 29), to the "stagger" memory associated with the given array. At this point, no attempt has been made to compensate for the physical spacing between arrays or to group and hold the data for sending to the actual air valves associated with each dye jet.

Compensation for the physical spacing between arrays may be best explained with reference to FIGS. 27A and 27B, which functionally describe the individual stagger memories for various arrays in greater detail. The "stagger" memory operates on the firing time data produced by the look-up tables and performs two principal functions: (1) the serial data stream from the look-up table, representing firing times, is grouped and allocated to the appropriate arrays on the patterning machine and (2) "non-operative" data is added to the respective pattern data for each array to inhibit, at start-up and for a pre-determined interval which is specific to that particular array, the reading of the pattern data in order to compensate for the elapsed time during which the specific portion of the substrate to be patterned with that pattern data is moving from array to array.

The "stagger" memory operates as follows. The firing time data is sent to an individual random access memory (RAM) associated with each of the eight arrays. Although either static or dynamic RAMs may be used, static RAMs have been found to be preferred because of increased speed. At each array, the data is written to the RAM in the order in which it was sent from the look-up table, thereby preserving the jet and array identity of the individual firing times. Each RAM preferably has sufficient capacity to hold firing time information for the total number of pattern lines extending from the first to the eighth array (assumed to be seven hundred for purposes of discussion) for each jet in its respective array. In the discussion which follows, it may be helpful to consider the seven hundred pattern lines as being arranged in seven groups of one hundred pattern lines each (to correspond with the assumed inter-array spacing).

The RAMs are both written to and read from in a unidirectional repeating cycle, with all "read" pointer being collectively initialized and "lock-stepped" so that corresponding address locations in all RAMs for all arrays are read simultaneously. Associated with each RAM is a pre-determined offset value which represents the number of sequential memory address values separating the "write" pointer used to insert the data into the memory addresses and the "read" pointer used to read the data from the RAM addresses, thereby "staggering" in time the respective read and write operations for a given memory address.

As depicted on the left hand side of FIG. 27A, the RAM offset value for the first array is zero, i.e., the "read pattern data" operation is initiated at the same memory address as the "write pattern data" operation, with no offset. The offset for the second array, however, is shown as being one hundred, which number is equal to the number of pattern lines or pattern cycles (as well as the corresponding number of read or write cycles) needed to span the distance physically separating the first array from the second array, as measured along the path of the substrate in units of pattern lines.

As depicted, the "read pattern" pointer, initialized at the first memory address location, is found one hundred address locations "above" or "earlier" than the "write" pointer. Accordingly, beginning the "read" operation at a memory address location which lags the "write" operation by one hundred consecutive locations effectively delays the reading of the written data by one hundred pattern cycles to correspond to—and compensate for—the physical spacing between the firs and second array. To avoid using "dummy" data for the "read" operation until the "read" pointer catches up with the first address written to by the "write" pointer, a "read inhibit" procedure may be used. Such procedure would only be necessary at the beginning and end of a pattern. Alternatively, data representing zero firing time can be loaded into the RAMs in the appropriate address locations so that the "read" operation, although enabled, reads data which disables the jets during such times.

The right hand side of FIGS. 27A and 27B depicts the stagger memory for the eighth array. As with all other arrays, the "read" pointer has been initialized to the first memory address in the RAM. The "write" pointer, shown at its initialized memory address location, leads the "read" pointer by an address difference equivalent to seven hundred pattern lines (assuming seven intervening arrays and a uniform inter-array spacing of one hundred pattern lines).

FIG. 27B depicts the stagger memories of FIG. 27A exactly one hundred pattern cycles later, i.e., after the data for one hundred pattern lines have been read. The "read" and "write" pointer associated with Array 1 are still together, but have moved "down" one hundred memory address locations and are now reading and writing the firing time data associated with the first line of the second group of one hundred pattern lines in the RAM.

The "read" and "write" pointers associated with Array 2 are still separated by an offset corresponding to the physical spacing between Array 1 and Array 2, as measured in units of pattern lines. Looking at the pointers associated with Array 8, the "read" pointer is positioned to read the first line of firing time data from the second group of one hundred pattern lines, while the "write" pointer is positioned to write new firing time data into RAM addresses which will be read only after the existing seven hundred pattern lines in the RAM are read. It is therefore apparent the "read" pointer is specifying firing time data which was written seven hundred pattern cycles previously.

The storage registers associated with each array's stagger memory store the firing time data for the pattern line to be dyed by that respective array in that pattern cycle until prompted by a pulse from the substrate transducer indicating the substrate has traveled a distance equal to the width of one pattern line. At that time, the firing time data, in Data Format B3 (see FIG. 29), is sent to the "gatling" memory for processing as indicated below, and firing time data for the next pattern line is forwarded to the stagger memory for processing as described above.

FIG. 28 depicts a "gatling" memory module for one array. For the patterning device depicted in FIG. 17, eight configurations of the type shown in FIG. 28 would be necessary, one for each array. In a preferred embodiment, all would be driven by a common clock and counter. The gatling memory performs two principal functions: (1) the serial stream of encoded firing times is converted to individual strings of logical (i.e., "on" or "off") firing commands, the length of each respective "on" string reflecting the value of the corresponding encoded firing time, and (2) these commands are quickly and efficiently allocated to the appropriate applicators.

As depicted in FIG. 28, associated with each array is a set of dedicated first in-first out memory modules (each of which will be hereinafter referred to as a "FIFO"). An essential characteristic of the FIFO is that data is read out of the FIFO in precisely the same order or sequence in which the data was written into the FIFO. In the exemplary embodiment described herein, the set of FIFO modules must have a collective capacity sufficient to store one byte (i.e., eight bits, equal to the size of the address codes comprising the original pattern data) of data for each of the four hundred eighty diverting air valves in the array. For purposes of explanation, it will be assumed that each of the two FIFOs shown can accommodate two hundred forty bytes of data.

Each FIFO has its input connected to the sequential loader and its output connected to an individual comparator. A counter is configured to send an eight bit incrementing count to each of the comparators in response to a pulse from a "gatling" clock. The "gatling" clock is also connected to each FIFO, and can thus synchronize the initiation of operations involving both the FIFOs and the respective comparators associated with each FIFO. If the smallest increment of time on which "firing time" is based is to be different from array to array, independent clocks and counters may be associated with each such array. Preferably, the output from each comparator may be operably connected to a respective shift register/latch combination, which serves to store temporarily the comparator output data before it is sent to the respective array, as described in more detail below. Each comparator output is also directed to a common detector, the function of which shall be discussed below. As indicated in FIG. 28, a reset pulse from the detector is sent to both the "gatling" clock and the counter at the conclusion of each pattern cycle, as will be explained below.

In response to the transducer pulse, the respective stagger memories for each array are read in sequence and the data is fed to an array-specific sequential loader, as depicted in FIG. 28. The sequential loader sends the first group of two hundred forty bytes of data received to a first FIFO and the second group of two hundred forty bytes of data to a second FIFO. Similar operations are performed- simultaneously at other sequential loaders associated with other arrays. Each byte represents a relative firing time or dye contact time (or, more accurately, an elapsed diverting air stream interruption time) for an individual jet in the array.

After each of the FIFOs for each array are loaded, they are simultaneously sent a series of pulses from the "gatling" clock, each pulse prompting each FIFO to send a byte of data (comprised in eight bits), in the same sequence in which the bytes were sent to the FIFO by the sequential loader, to its respective individual comparator. This FIFO "firing time" data byte is one of two separate inputs received by the comparator, the second input being a byte sent from a single counter common to all FIFOs associated with every array. This common counter byte is sent in response to the same gatling clock pulse which prompted the FIFO data, and serves as a clock for measuring elapsed time from the onset of the dye stream striking the substrate for this pattern cycle. At each pulse from the gatling clock, a new byte of data is released from each FIFO and sent to its respective comparator.

At each comparator, the eight bit "elapsed time" counter value is compared with the value of the eight bit "firing time" byte sent by the FIFO. The result of this comparison is a single "fire/no fire command" bit sent to the shift register as well as the director. If the FIFO value is greater than the counter value, indicating the desired firing time as specified by the pattern data is greater than the elapsed firing time as specified by the counter, the comparator output bit is a logical "one" (interpreted by the array applicators as a "fire"

command). Otherwise, the comparator output bit is a logical "zero" (interpreted by the array applicators as a "no fire" or "cease fire" command). At the next gatling clock pulse, the next byte of firing time data in each FIFO (corresponding to the next individual jet along the array) is sent to the respective comparator, where it is compared with the same counter value. Each comparator compares the value of the firing time data forwarded by its respective FIFO to the value of the counter and generates a "fire/no fire" command in the form of a logical one or logical zero, as appropriate, for transmission to the shift register and the detector.

This process is repeated until all two hundred forty "firing time" bytes have been read from the FIFOs and have been compared with the "elapsed firing time" value indicated by the counter. At this time the shift register, which now contains a serial string of two hundred forty logical ones and zeros corresponding to individual firing commands, forwards these firing commands in parallel format to a latch. The latch serves to transfer, in parallel, the firing commands from the shift register to the individual air valves associated with the array dye applicators at the same time the shift register accepts a fresh set of two hundred forty firing commands for subsequent forwarding to the latch. Each time the shift register forwards its contents to the latch (in response to a clock pulse), the counter value is incremented.

Following this transfer, the counter value is incremented by one time unit and the process is repeated, with all two hundred forty bytes of "firing time" data in each FIFO being reexamined and transformed into two hundred forty single bit "fire/no fire" commands, in sequence, by the comparator using the newly incremented value of "elapsed time" supplied by the counter. While, in a preferred embodiment, the serial firing commands may be converted to, and stored in, a parallel format by the shift register/latch combination disclosed herein, it is foreseen that various alternative techniques for directing the serial stream of firing commands to the appropriate applicators may be employed, perhaps without converting said commands to a true parallel format.

The above process, involving the sequential comparison of each FIFO's entire capacity of firing time data with each incremented "elapsed time" value generated by the counter, is repeated until the detector determines that all comparator outputs for that array are a logical "zero." This indicates that, for all jets in the array, no desired firing time (represented by the FIFO values) for any jet in the array exceeds the elapsed time indicated by the counter. When this condition is sensed by the comparator, it indicates that, for that pattern line and that array, all required patterning has occurred. Accordingly, the detector sends "reset" pulses to both the counter and to the gatling clock. The gatling module then waits for the next substrate transducer pulse to prompt the transmission and loading of firing time data for the next pattern line by the sequential loader into the FIFOs, and the reiterative reading/comparing process is repeated as described above.

In a preferred embodiment, the gatling memory for each array may actually consist of two separate and identical FIFOs which may alternately be connected to the array valves. In this way, while data are being read out and compared in one gatling memory, the data for the next pattern line may be loaded into the FIFOs associated with the alternate gatling memory, thereby eliminating any data loading delays which might otherwise be present if only one gatling memory per array were used. It should be apparent that the number of individual FIFOs may be appropriately modified to accommodate a grater or lesser number of dye jets in an array.

FIG. 30 depicts an optional memory, to be associated with each array, which may be used when maximum pattern definition is desired. This memory, which may take the form of a static RAM, functions in a "tuning" or "trimming" capacity to compensate, in precise fashion, for small variations in the response time or dye flow characteristics of the individual applicators. This is achieved by means of a look-up table embodied in the RAM which associates, for each applicator in a given array, and, if desired, for each possible firing time associated with each such applicator, an individual factor which increases or decreases the firing time dictated by the pattern data by an amount necessary to cause all applicators in a given array to deliver substantially the same quantity of dye onto the substrate in response to the same pattern data firing instructions.

Returning now to FIG. 2(e), after manufacture of the customized patterned substrate at steps 195 or 189, it is no longer necessary to retain the temporary product specification, temporary design, and temporary firing time instructions as generated at steps 192, 194. Accordingly, this temporary information is now deleted at step 197. Subsequently, at step 199, the personalized or customized rug is shipped to the customer, retailer, dealer, or the like, however, it is preferred to direct ship the end product or products to the customer.

It should be understood that the process according to the preferred embodiment of the invention provides for cost effective manufacture of one of a kind, personalized, unique, custom rugs, mats, carpet tiles, etc., with mass production economics. Carpets may be custom matched carpet to any room or decor by selecting the image, border and/or frame colors to match a particular room or coordinate with furnishings, with custom rugs or carpets, e.g., shipped in a matter of a few days. Furthermore, no inventory needs to be maintained (other than a few pile substrates, such as white tufted cut and/or loop pile carpet, bonded carpet, woven carpet, non-woven carpet, and the like). It is understood that the present invention provides enhanced international business as customers may access the system from virtually anywhere in the world, etc., via the Internet. Mass production economics are further enhanced by dyeing or printing the rugs or tiles in broadloom form one after another or nestled together and then cutting or stamping out the particular rugs or tiles. Additionally, individual tiles, rugs or mats may be dyed or printed one at a time on blanks or substrates.

Many applications for the automated customization process disclosed herein are contemplated. An incomplete exemplary list of possible applications is set forth below.

1. A pet owner who desires a rug or wall hanging carrying the image of his/her pet brings a snapshot of the pet to a pet store. Image processing and order submission equipment, in the form of a user-friendly computer terminal connected to a remote textile manufacturer, is used to (1) scan the snapshot, (2) provide image editing capabilities (red eye reduction, cropping, and perhaps color adjustment, background or backdrop removal, etc.), (3) allow customer-selected frames, borders, backdrops, etc. in customer-selected colors to be appropriately superimposed on or around the edited snapshot, for customer approval of a WYSIWYG ("what-you-see-is-what-you-get") image on the terminal monitor, and (4) provide for customer re-iterations in the overall photo-editing/backdrop selection process. Upon final customer approval, the system is used to enter customer order information (name and address, rug style and size, etc.), collect payment data (credit card number, etc.), and generate an order tracking SKU number, perhaps with an estimated ship date. The desired product (e.g., a rug or wall hanging) is manufactured and delivered to the customer's home within a matter of a few days. It is contemplated that the pet owner may also use a different source to generate a digitized subject image, such as the output from a digital camera, a video frame grabber device, or other source.

2. A museum visitor or art student wishes to have a rug or a textile wall hanging showing an uncopyrighted painting (or other work of art appropriate for authorized copying) on display at the museum. A user-friendly computer terminal in the museum store, connected to a remote textile manufacturer, can be used to (1) select the painting, (2) perhaps modify the colors in the painting to allow the painting to be more harmoniously integrated into an existing or proposed interior design color scheme, (3) select the size and aspect ratio of the selected painting, (4) select the number, size, color and other aesthetic characteristics of the various borders and frames desired, (5) display the resulting combination of painting and frame/border for customer assessment and approval, and (6) provide a means by which the customer can modify all earlier choices and selections. Upon final approval of the painting with backdrop, customer order and payment information is gathered, a customized SKU is issued for order tracking purposes, and the selected, individually designed product is processed for manufacture and shipment.

3. A parent wishes to send a rug or wall hanging displaying a child's artwork to the child's grandparent. Using a home computer with a scanner, the parent contacts the website of a textile manufacturer. On that website is available image-editing and order entry software that allow the parent to send a scanned image of the artwork to the website, manipulate the image using the image-editing software on the website (thereby providing the ability to change colors, crop the image, eliminate or edit the background or backdrop, and otherwise enhance the scanned image), make appropriate backdrop/border/frame selections (in any of many available colors to match or complement a given décor), iterate through the various available aesthetic choices until the parent gives final approval of the rug, based on a computer-generated image of the final product, enter the customer order and payment information, and receive a unique SKU number and perhaps an estimated shipping date for the final product. The textile manufacturer manufactures the rug or wall hanging and ships the product to the grandparent within a matter of a few days with no further input from the parent.

4. A family genealogist has uncovered a family crest and wishes to send copies to relatives, perhaps as a decorative textile item. The genealogist takes a copy of the crest to a computer terminal (either at home or at a commercial establishment such as a carpet dealer) and uses a scanner to input a digitized version of the family crest into commercial image processing software. With appropriate prompting by the software, the genealogist selects a backdrop, border, and frame for the family crest, as well as the size and type of textile product, the colors to be used, and the size, color, and placement of any text to be associated with the crest. The genealogist selects a textile wall hanging, using a lightweight rug-type substrate. Upon submitting payment information, an order for the product is generated, and, in due course, the product is manufactured and shipped, either to the genealogist or to the relatives, as the genealogist had directed at the time the order was placed. During the order and manufacturing process, the genealogist is able to check on the status of the order through a unique SKU number that was generated along with the order.

5. An avid golfer wishes to have a keepsake, in the form of a dust control mat for placement outside the front door of his/her home, of a particularly good round of golf. The pro shop has available a computer terminal-equipped kiosk having a database on which the golfer can select a photograph of any of the 18 holes of the course. The golfer selects a photograph, or perhaps a series of photographs to be arranged in a montage, and inputs the date and his/her score. The computer terminal allows the golfer to review the photograph, with the text, for approval or modification. The golfer may add borders, frames, or other artistic enhancements. With appropriate prompting by the software, the genealogist selects the size and type of mat, the colors to be used, and the size, color, and placement of the text. Upon submitting payment information, an order for the product is generated, and, in due course, the product is manufactured and shipped. During the order and manufacturing process, the golfer is able to check on the status of the order through a unique SKU number that was generated along with the order.

While the invention has been described in connection with the embodiments discussed above, it is not intended to limit the scope of the invention to the particular form set forth, but on the contrary, it is intended to cover such alternatives, modifications, and equivalents as may be included within the spirit and scope of the invention as defined by the appended claims.

Having thus described our invention, what we claim as new and desire to secure by Letters Patent, is:

1. A process by which a target design may be assembled on a computer terminal and used to pattern, on a pixel-by-pixel basis, the surface of a selected substrate, said process comprising the steps of:

a. assembling on said terminal a desired subject image and any desired artistic enhancements into a digitally-defined target design suitable for patterning a specified area on said substrate;

b. transmitting, using an electronic communications link, said digitally-defined target design to a remotely-located patterning device comprising an array of individually-addressable liquid colorant applicators;

c. transforming electronically said digitally-defined target design into a series of actuation commands to be sent to said array of individually-addressable colorant applicators; and d. actuating selected individually-addressable colorant applicators in accordance with said actuation commands and dispensing, on a pixel-by-pixel basis onto said specified area of said substrate surface, controlled quantities of liquid colorant, thereby forming said digitally-defined target design on said defined area.

2. The process of claim 1 wherein said electronic communications link comprises the Internet.

3. The process of claim 1 wherein said substrate is an absorbent substrate having a pile surface.

4. The process of claim 1 wherein said substrate is a decorative textile substrate selected from the group consisting of carpets, rugs, carpet tiles, and wall hangings.

5. The process of claim 7 wherein said subject image is selected from a database, accessible from said terminal, containing a collection of images.

6. The process of claim 1 wherein said desired artistic enhancements are selected from a database accessible from said terminal.

7. The process of claim 1 wherein said subject image is selected from a group consisting of images of pets, sports designs, heraldry, nature scenes, outdoor scenes, landscapes, famous works of art, famous works of architecture, modes of transportation, famous personalities, holiday motifs, collectible articles, and maps.

8. The process of claim 7, wherein said subject image originates as a photograph.

9. The process of claim 7, wherein said subject image is accessed by a scanning device.

10. The process of claim 1 wherein said computer terminal is located in a residence.

11. The process of claim 1, wherein said computer terminal is located in a commercial establishment in which most revenue is derived from the sale of carpets, rugs, carpet tiles, and wall hangings.

12. The process of claim 1, wherein said computer terminal is located in a commercial establishment other than an establishment in which most revenue is derived from the sale of carpets, rugs, carpet tiles, and wall hangings.

13. The process of claim 12 wherein said computer terminal is located in a commercial establishment selected from the group consisting of museum shops, sports shops, pet stores, and bookstores.

14. The process of claim 1 wherein said computer terminal is located at a satellite location situated in a retail shopping environment.

15. The process of claim 1 wherein said subject image is an original image that is digitized at said terminal, wherein said digitally-defined target design contains presentation enhancements, and wherein said presentation enhancements are selected from a collection of presentation enhancements accessible from said terminal.

16. The process of claim 15 wherein said presentation enhancements may have a color and texture selectable at the time of said assembly.

17. The process of claim 15 wherein said presentation enhancements are comprised of at least one enhancement selected from the group consisting of a background, a border, and a frame.

18. The process of claim 1 wherein said step of assembling a digitally-defined target design includes a step which provides for the modification of color and texture of said presentation enhancements to be used as part of said digitally-defined target design.

19. The process of claim 18, wherein said process makes available appropriate choices for subject images and presentation enhancements that comprise target images to allow a user to generate, on said selected substrate, a target image that coordinates with a specific set of independent interior design objectives to provide an aesthetically pleasing embellishment.

20. The process of claim 19 wherein said independent interior design objectives are comprised of pre-existing interior furnishings that form the environment within which said target image on said selected substrate will be placed.

21. The process of claim 1 wherein said step of assembling on said terminal a subject image and any associated artistic enhancements into a digitally-defined target design includes the step of electronically superimposing said subject image onto a selected backdrop whereby said backdrop extends beyond the edges of said subject image, thereby forming a border surrounding said subject image.

22. The process of claim 21 wherein said backdrop forms a border of uniform width.

23. The process of claim 21 wherein said backdrop is selected from a database, accessible through said terminal, comprised of a group of available backdrops.

24. The process of claim 23 wherein said backdrop may be augmented by additional selections of color and texture.

25. The process of claim 21 wherein said target design includes a colored area surrounding said border and comprising a frame.

26. The process of claim 1 wherein said step of assembling said digitally defined target design includes a sequence of steps in which artistic selections may be made and images responsive to such selections are generated for review until a satisfactory target design has been assembled.

27. The process of claim 1 wherein said step of assembling said digitally-defined target design includes a step in which a dithered representation of said desired subject image and any desired artistic enhancements is generated and displayed on said terminal.

28. The process of claim 27 wherein said step of assembling said digitally-defined target design includes a step in which said dithered representation of said desired subject image and any desired artistic enhancements may be geometrically adjusted to provide an aesthetically pleasing image that is suitable for the specified area of said substrate surface on which said digitally-defined target design is to be placed.

29. The process of claim 1 wherein said step of assembling said digitally-defined target design includes a step in which adjustments to at least one display-related attribute may be made.

30. The process of claim 1 wherein the quantity of liquid colorant dispensed within said given pixel is insufficient to oversaturate said given pixel.

31. The process of claim 1 wherein the quantity of liquid colorant dispensed within said given pixel is sufficient to oversaturate said given pixel.

32. The process of claim 31 wherein said oversaturation of said given pixel is the result of the dispensing of at least two different colorants in said given pixel.

33. The product of the process of claim 32.

34. The product of the process of claim 32, wherein said subject image comprises a scanned image of an original artistic work.

35. The process of claim 1 wherein said dispensing of controlled quantities of liquid colorant, on a pixel-by-pixel basis onto said specified area of said substrate surface, results in the application of liquid colorant in a first pixel and the migration of said colorant from said first pixel to a second, contiguous pixel.

36. The process of claim 35 wherein said dispensing additionally results in the application of liquid colorant in said second, contiguous pixel, wherein said quantity applied in said second pixel is insufficient to saturate fully said second pixel.

37. The process of claim 1 wherein said dispensing, on a pixel-by-pixel basis onto said specified area of said substrate surface, of controlled quantities of liquid colorant, results in the dispensing, within a given pixel in said specified area, of a first colorant and a second colorant, thereby forming a mixture of said first colorant and said second colorant within said given pixel.

38. An Internet-based system for enabling a user at a design terminal to access a digitally-defined subject image and customize said subject image to form a digitally-defined target design for decorating a textile substrate on a remotely-located automated patterning apparatus, said automated patterning apparatus comprising a plurality of individually-actuated colorant applicators through which corresponding respective liquid colorants may be selectively applied, in pixel-wise fashion, to the surface of said substrate in accordance with said digitally-defined pattern, said system comprising:

a) a software interlace for enabling remote access, by said user at said design terminal, to an image manipulation design tool over a public communications network;

b) an access device by which said digitally-defined subject image selected by said user may be functionally acquired by said image manipulation design tool, said tool enabling said user to customize said digitally-defined subject image wit the addition of artistic enhancements to form said digitally-defined target design;

c) a dithering algorithm by which a dithered image may be generated from said digitally-defined target design using a dithering palette of colors, said palette being comprised of colors that can be generated at specified pixel locations on said substrate by the pixel-wise application of selected of said liquid colorants, individually and, alternatively, in various combinations, to said substrate; and d) a patterning device control system for transforming said dithered image into appropriate instructions for the actuation of each of said colorant applicators, by which a respective liquid colorant from each actuated color applicator may be selectively applied to said substrate in accordance with said instructions, thereby reproducing said digitally-defined target design on said substrate.

39. The system of claim 38 wherein said control system comprises a look-up table that associates the color of each pixel comprising said dithered image with a dispensing instruction for at least one colorant applicator.

40. The system of claim 38 wherein said dithering palette is comprised of colors that result from the in situ blending of at least two different liquid colorants within a given pixel.

41. The system of claim 38 wherein said dithering palette is comprised of colors that result from the blending of at least two different liquid colorants within a given area on the surface of said substrate, and wherein the application of at least one of said colorants oversaturates said substrate within a first portion of said given substrate area, and wherein the application of another of said colorants undersaturates said substrate within a second portion of said given substrate area, said second portion being contiguous with said first portion.

42. The Internet-based system of claim 38 wherein said user customization of said digitally-defined subject image to form said target image includes the addition of presentation enhancements.

43. The Internet-based system of claim 42 wherein said presentation enhancements include a desired decorative surround that, when said subject image is combined with said surround, forms a decorative border surrounding said subject image.

44. The Internet-based system of claim 42 wherein said image manipulation design tool electronically combines said subject image and said desired decorative surround to form a target design.

45. The Internet-based system of claim 38 wherein said image manipulation design tool provides the user with the ability to make adjustments to the texture and color of said target design and of said presentation enhancements.

46. The Internet-based system of claim 45 wherein a dithered representation of said adjustments is generated and displayed on said terminal.

47. The Internet-based system of claim 46 which further includes a step in which adjustments to at least one display-related attribute may be made.

48. The Internet-based system of claim 38 wherein said digitally-defined subject image is a scanned image of a photograph.

49. The Internet-based system of claim 38 wherein said digitally-defined subject image is in the form of a digital file from a digital camera.

50. The Internet-based system of claim 38 wherein said digitally-defined subject image is in the form of an output from a video frame grabber device.

51. The Internet-based system of claim 38 wherein said digitally-defined subject image comprises an archived image from an electronic data base.

52. The Internet-based system of claim 38 wherein said digitally-defined subject image comprises an image downloaded from the Internet.

53. The Internet-based system of claim 38 wherein said digitally-defined subject image comprises one or more lines of text.

54. The Internet-based system of claim 38 wherein said dithered image is stored on appropriate media and is made available to said patterning control system via said media.

55. The Internet-based system of claim 38 further comprising the step of generating a Source SKU and a Target SKU, wherein said Source SKU comprises a plurality of data fields adapted to accommodate data necessary for billing, manufacturing, and shipping of said textile substrate bearing said target design, and wherein selected of said plurality of data fields comprising said Source SKU are adapted to accommodate data necessary for the specification of said target image as customized by said user.

56. The Internet-based system of claim 55 wherein said Source SKU is comprised of a Product Specification Template that includes data that is customizable by said user and data that is non-customizable by said user.

57. The Internet-based system of claim 55 wherein said Target SKU is comprised of customizable data and non-customizable data, and wherein said Target SKU is used to specifically identity said substrate bearing said target design during the manufacturing process.

58. The Internet-based system of claim 57 wherein, following the manufacturing process, the Target SKU is discarded.

59. An interactive method for generating a decorative textile substrate on an automated patterning apparatus that directs pre-determined quantities of liquid colorants through a set of individually-addressable colorant applicators, said liquid colorants being selectively applied by said applicators to individual pixels on the substrate in accordance with digitally-encoded pattern data, said method comprising:

a) providing a user with remote access to an image manipulation design tool over a public communications network;

b) importing a digitized image selected by said user into said image manipulation design tool;

c) enabling said user to customize said digitized image via said image manipulation design tool to form a desired target design to be transferred to said textile substrate;

d) generating an order comprising pattern data corresponding to said desired target design:

e) communicating said pattern data to said automated patterning apparatus; and f) generating appropriate actuation instructions for each of said color applicators associated with said patterning apparatus necessary to reproduce said target image on said decorative textile substrate in accordance with said pattern data.

60. The interactive method of claim 59 said step (c) further includes the step of generating a dithered image from said desired target image using a dithering palette of colors, said palette being comprised of colors that can be generated at specified pixel locations on said textile substrate using said selectively applied liquid colorants.

61. The interactive method of claim 59 wherein said step (e) comprises communicating said pattern data electronically over said public communications network.

62. The interactive method of claim 59 wherein said step (e) comprises communicating said pattern data via physical transfer of computer media.

63. The interactive method of claim 59 wherein said step (f) comprises use of a look-up table in which said digitally-encoded pattern data may be transformed into a set of individual colorant applicator actuation instructions for each colorant necessary to reproduce said given color on said substrate.

64. The interactive method of claim 59 further comprising the step of generating a Target SKU comprising a temporary instruction file containing instructions for creating said decorative textile substrate, said temporary instruction file being associated with a pre-defined Source SKU maintained for pricing purposes.

65. The interactive method of claim 64 further comprising the step of discarding said Target SKU comprising said temporary instruction file, including instructions for creating said decorative textile substrate, following manufacture of said decorative textile substrate.

66. A system allowing a user to generate a customized design and pattern a decorative textile substrate therewith through the use of an automated patterning apparatus, said automated patterning apparatus comprising a plurality of individual colorant applicators through which pre-determined quantities of respective individual colorants may be directed onto said substrate in accordance with pattern data corresponding to said customized design, said system comprising:
  a) a computer software interface device providing access to a remotely-located image manipulation design tool over a public communications network;
  b) a database for storing a plurality of digitized images capable of being incorporated into said customized design through use of said design tool;
  c) an Internet-based communication presented to said computer software interface device for enabling user selection of a digitized image and initiating input of a selected image as a desired target image to said image manipulation design tool;
  d) a dithering mechanism for generating a dithered image from said desired target image using a dithering palette of colors, said palette being comprised of colors that can be generated at specified locations on said substrate using said individual colorants; and,
  e) an Internet-based communication presented to said computer software interface device for enabling user generation of an order comprising pattern data corresponding to said dithered target image for download to said apparatus; and
  f) a mechanism receiving said generated order over said public communications network and generating appropriate dispensing instructions for each of said color applicators necessary to reproduce the dithered image on said substrate.

67. The system of claim 66 wherein said plurality of digitized images stored in said database includes a plurality of user selectable decorative backdrops upon which said dithered image may be superposed.

68. The system of claim 66 wherein said plurality of digitized images stored in said database includes a plurality of user selectable decorative surrounds for surrounding said dithered image, said dithered image and said decorative surround collectively defining a target image from which said pattern data are derived.

69. The system of claim 66 wherein said computer software interface device providing interface for enabling remote access to an image manipulation design tool is located remotely from said automated patterning apparatus.

70. An interactive method to allow a user, from a remote location, to generate a custom design and to provide for the patterning of a decorative textile substrate with said custom design using an automated patterning apparatus, said apparatus comprising a plurality of process colorants that can be individually directed onto said substrate in accordance with pattern data derived from said custom design, said method comprising:
  a) providing said user with access to an image manipulation design tool over a public communications network;
  b) providing said user with access to a database containing a plurality of pre-defined candidate artistic elements, which may include subject images and artistic enhancements, capable of being incorporated into said custom design;
  c) providing a review and selection process by which said user can review and incorporate into said custom design, on a trial basis, a plurality of said candidate artistic elements prior to making a final selection of at least one of said elements;
  d) allowing said user to utilize said image manipulation design tool to modify, as desired, said final selection of said elements incorporated into said custom design to provide customization of said elements by said user to form, from said custom design, a custom target image to be transferred to said textile substrate; and
  e) communicating said target image to said automated patterning apparatus.

71. The method of claim 70 wherein said target image is communicated over said public communication network.

72. The method of claim 70 which further comprises the step of generating dispensing instructions whereby said process colorants associated with said patterning apparatus may be individually directed on said decorative textile substrate in accordance with said custom target image.

73. The method of claim 70 wherein at least one of said artistic elements is a user-supplied image comprising a subject image, and wherein said image is digitized and imported into said image manipulation design tool for incorporation into said custom design.

74. The interactive method of claim 70 wherein said decorative textile substrate bearing said target image is associated with a Product Specification Template, said method further including the step of forming an SKU based on data contained in said Product Specification Template.

75. The interactive method of claim 74 wherein said Product Specification Template is comprised of data that is customizable by said user and data that is non-customizable by said user.

76. The interactive method of claim 74, further comprising the step of generating a Target SKU comprising a temporary instruction file containing instructions for creating said decorative textile substrate, said temporary instruction file further containing data from said Product Specification Template.

77. The interactive method of claim 76, further comprising the step of deleting said Target SKU comprising said temporary instruction file, including instructions for creating said decorative textile substrate, following manufacture of said decorative textile substrate.

78. The interactive method of claim 70 wherein said step c) further includes the step of dithering said desired target image using a dithering palette of colors comprised of colors that can be generated at specified pixel locations on said textile substrate by the selective application of said process colorants by said automated patterning apparatus.

79. The method of claim 78 wherein said step c) further includes the step of developing a desired backdrop that, when said dithered image is superimposed thereon, will form an appropriately proportioned decorative border surrounding said dithered image, and electronically superimposing said dithered image onto said desired backdrop, thereby forming a dithered image having an appropriately proportioned decorative border comprised of said desired backdrop.

80. A computer-readable medium containing instructions data for patterning a textile substrate by the selective application of a plurality of colorants to the surface of said substrate through a set of individually-addressable colorant applicators, wherein said pattern data is generated by steps a) through d) of the method of claim 70.

81. A computer-readable data transmission medium containing a data structure comprising instructions for patterning a textile substrate by the selective application of a plurality of colorants to the surface of said substrate through a set of individually-addressable colorant applicators, wherein said data structure comprises specification, in computer-readable form, of values for a Product Specification Template, wherein said instructions are generated by the method of claim 70.

82. The medium of claim 81 wherein said data structure contains data specifying a Target SKU.

83. The medium of claim 81 wherein said data structure contains data specifying only user-specified elements of said Product Specification Template.

* * * * *